US012754409B2

(12) United States Patent
Dabellani et al.

(10) Patent No.: US 12,754,409 B2
(45) Date of Patent: Oct. 6, 2026

(54) DEVICE AND METHOD FOR ACQUIRING IMAGES OF BIOLOGICAL SAMPLES

(71) Applicant: COPAN ITALIA S.p.A., Brescia (IT)

(72) Inventors: Davide Dabellani, Brescia (IT); Stefano Gretter, Brescia (IT); Stefano Oliani, Brescia (IT); Mirco Bressanelli, Brescia (IT); Andrea Mazzolari, Brescia (IT)

(73) Assignee: Copan Italia S.p.A., Brescia (IT)

( * ) Notice: Subject to any disclaimer, the term of this patent is extended or adjusted under 35 U.S.C. 154(b) by 0 days.

(21) Appl. No.: 18/849,450

(22) PCT Filed: Mar. 21, 2023

(86) PCT No.: PCT/IB2023/052751
§ 371 (c)(1),
(2) Date: Sep. 20, 2024

(87) PCT Pub. No.: WO2023/180917
PCT Pub. Date: Sep. 28, 2023

(65) Prior Publication Data

US 2025/0208400 A1 Jun. 26, 2025

(30) Foreign Application Priority Data

Mar. 22, 2022 (IT) ........................ 102022000005669

(51) Int. Cl.
*G02B 21/36* (2006.01)
*G02B 21/06* (2006.01)

(52) U.S. Cl.
CPC ........... *G02B 21/362* (2013.01); *G02B 21/06* (2013.01)

(58) Field of Classification Search
CPC .... G02B 21/362; G02B 21/06; G02B 21/367; G02B 21/361
See application file for complete search history.

(56) References Cited

U.S. PATENT DOCUMENTS 9,028,752 B2 5/2015 Malin
9,726,602 B2 8/2017 Dupoy et al.
(Continued)

FOREIGN PATENT DOCUMENTS

CN 204556368 U * 8/2015
CN 104268543 B * 7/2017 ........... G06T 7/0004
(Continued)

OTHER PUBLICATIONS

International Search Report and Written Opinion in International Appln. No. PCT/IB2023/052751, mailed on Jun. 26, 2023, 11 pages.
(Continued)

*Primary Examiner* — Michael Lee
(74) *Attorney, Agent, or Firm* — Fish & Richardson P.C.

(57) ABSTRACT

Device (1) for observing and for acquiring images of biological samples comprising: a supporting element (2, 2*a*, 2*b*) configured for housing a support (3) for biological samples and a first camera (6) oriented toward the supporting element (2, 2*a*, 2*b*) and configured for framing a portion of the supporting element (2, 2*a*, 2*b*) from a first observation point. The device comprises a first source of optical radiation (10) irradiating said portion of the support (3) from a first direction of radiation. The device comprises an actuator rotating the supporting element (2, 2*a*, 2*b*) and the support (3) therein housed around a rotation axis (Y), and/or for rotating said first camera (6) with respect to said supporting element (2, 2*a*, 2*b*). The device is configured for activating the first camera (6) and the actuator for generating a first plurality or first set of N images of N predefined portions of the support (3).

17 Claims, 10 Drawing Sheets

(56) References Cited

U.S. PATENT DOCUMENTS

| | | | | |
|---|---|---|---|---|
| 10,407,708 | B2 | 9/2019 | Lagarrigue-Charbonnier et al. | |
| 2009/0195775 | A1 | 8/2009 | Nakao et al. | |
| 2012/0140230 | A1* | 6/2012 | Miller | G01N 15/042 356/432 |
| 2017/0004617 | A1* | 1/2017 | Lee | G01N 21/8806 |
| 2022/0412877 | A1* | 12/2022 | Wuu | G02B 6/06 |
| 2025/0209613 | A1* | 6/2025 | Dabellani | G06T 7/0012 |

FOREIGN PATENT DOCUMENTS

| | | | | | |
|---|---|---|---|---|---|
| CN | 108020509 | A | * | 5/2018 | G01N 21/84 |
| CN | 110415332 | A | * | 11/2019 | G06T 15/04 |
| DE | 102015111426 | | | 10/2016 | |
| EP | 2184346 | | | 5/2010 | |
| EP | 2497832 | | | 9/2012 | |
| EP | 2998776 | | | 3/2016 | |
| EP | 3134848 | | | 3/2017 | |
| EP | 3779555 | | | 2/2021 | |
| GB | 2540616 | | | 1/2017 | |
| JP | H05-021569 | | | 1/1993 | |
| JP | 2006226995 | A | * | 8/2006 | |
| WO | WO 2012/122027 | | | 9/2012 | |
| WO | WO 2014/174455 | | | 10/2014 | |
| WO | WO 2017/198875 | | | 11/2017 | |

OTHER PUBLICATIONS

Office Action in Italian Appln. No. 102022000005669, mailed on Oct. 11, 2022, 22 pages (with English translation).

* cited by examiner

DEVICE AND METHOD FOR ACQUIRING IMAGES OF BIOLOGICAL SAMPLES

CROSS-REFERENCE TO RELATED APPLICATIONS

This application is a U.S. National Phase Application under 35 U.S.C. § 371 and claims the benefit of priority to International Application No. PCT/IB2023/052751, filed on Mar. 21, 2023, which claims the benefit of priority to Italian Application No. 102022000005669, filed on Mar. 22, 2022, the contents of both applications are hereby incorporated by reference.

FIELD OF THE ART

The present disclosure refers to the optical and electronic devices for acquiring images of biological samples. The present disclosure refers also to a method for acquiring images of biological samples.

KNOWN ART

There are known devices for viewing biological samples comprising a camera and a supporting element destined to support containers of biological samples, in particular Petri dishes partially filled with a culture medium. These devices are destined to carry out images of at least a portion of said container in order to detect the presence of bacterial or viral colonies in the culture medium. These devices can be actuated in a completely manual way or in a more or less automated way. Last generation substantially automated devices, at the moment of writing of the present document, are produced for example by Interscience (Scanstation) and by Rapid Microbiosystem (Growth Direct).

Some devices of known type comprise linear cameras, whereas other frame one or more images of the entire container and then of the entire portion of the culture medium.

EP 2 184 346 B1 discloses a device for viewing biological samples destined to detect micro colonies of dimension lower than 50 μm in at least two orthogonal dimensions, and to quantify the number of micro colonies in a detection area. EP 2 184 346 B1 discloses an angulated lighting system with single camera, conceived for optimizing the efficiency of the collection and for avoiding the obstruction of the radius incident through the collection objective.

U.S. Pat. No. 9,726,602 B2 and EP 2 912 436 B1 show a device and a method of observation of biological samples on a culture medium. The method provides for directing a beam of light on a portion of a translucid face of a container for biological samples in order to detect an illuminated region and a not illuminated region. The method provides for acquiring an image of a portion of the culture medium, where said portion is illuminated by the beam of light; the acquisition takes place in correspondence of a not illuminated area of said translucid band, and takes place according to a not zero angle with respect to the direction of light beam propagation. In particular the face of the container for biological samples is made translucid by means of a deposit of matter diffusing the optical radiation, in particular condensation droplets.

US 2017/0044588 A1 discloses a method and an apparatus for detecting micro colonies growing on a culture medium. A sample is irradiated with a light beam, which impacts on the sample at an angle β with respect to the normal line of the culture medium. An optical receiver receives a reflected, scattered and/or diffused light beam with an angle α different with respect to the angle β.

Known devices allow the acquisition of images of perfectible quality, and are often not sufficiently accurate in identifying, or allowing the operator to identify, small viral and/or bacterial colonies. In some cases the limitations of the possibility to identify viral and/or bacterial colonies, in particular if small, emerge especially in correspondence of the support and/or in correspondence of the edges of the image. The above-described limitations lead to the risk of false positives, i.e. detection and/or counting of colonies that are actually not present, or false negatives, i.e. failure to identify and/or count colonies that are actually present.

The purpose of the present disclosure is to describe a device and a method which are capable of solving the above-described drawbacks.

SUMMARY

The object of the present disclosure will be now described in some of its main aspects, which can be combined among them or with portions of the detailed description and/or of the attached claims.

According to the present disclosure it is described a device (1) for observing and for acquiring images of biological samples comprising:

- a supporting element (2, 2*a*, 2*b*) configured for housing a support (3) for biological samples;
- at least a first camera (6) and a second camera (7), both oriented toward the supporting element (2, 2*a*, 2*b*), wherein:
  - said first camera (6) is configured for framing at least a portion of the supporting element (2, 2*a*, 2*b*) and/or, in use, at least a predefined portion of the support (3) when housed on the supporting element (2, 2*a*, 2*b*), from a first observation point (P1);
  - said second camera (7) is configured for framing at least a portion of the supporting element (2, 2*a*, 2*b*) and/or, in use, at least said predefined portion of the support (3) when housed on the supporting element (2, 2*a*, 2*b*), from a second observation point (P2) different from the first observation point (P1);
  - and wherein the at least a predefined portion of the support (3) comprises, in use, a biological sample;
- at least a first optical radiation source (10) configured for irradiating at least said predefined portion of the support (3) from a first irradiation direction, in such a way that, in use, at least a portion of the biological sample is irradiated through the optical radiation of the first optical radiation source (10);
- the device (1) being configured for activating the first camera (6) and the second camera (7) for generating:
- at least a first image of at least part of said portion of biological sample and/or of said predefined portion of the support (3) through the first camera (6), and
- at least a second image of at least part of said portion of biological sample and/or of said predefined portion of the support (3) through the second camera (7).

According to the present disclosure it is also described a device (1) for observing and for acquiring images of biological samples comprising:

- a supporting element (2, 2*a*, 2*b*) configured for housing a support (3) for biological samples;
- at least a first camera (6) oriented toward the supporting element (2, 2*a*, 2*b*), wherein said first camera (6) is configured for framing at least a portion of the supporting element (2, 2*a*, 2*b*) and/or, in use, at least a predefined portion of the support (3) when housed on the supporting element (2, 2*a*, 2*b*), from a first observation point (P1), wherein the at least a predefined portion of the support (3) comprises, in use, a biological sample;

at least a first optical radiation source (10) configured for irradiating at least said predefined portion of the support (3) from a first irradiation direction, in such a way that, in use, at least a portion of the biological sample is irradiated through the optical radiation of the first optical radiation source (10);

the device (1) being configured for activating the first camera (6) for generating at least a first and a second image of at least part of said portion of the biological sample and/or of said predefined portion of the support (3) through the first camera (6), the first camera (6) being inclined with respect to a direction orthogonal to said support (3) and/or with respect to at least an upper surface of the biological sample contained in the support (3).

According to another non-limiting aspect, the device comprises a second camera (7) oriented toward the supporting element (2, 2*a*, 2*b*).

According to another non-limiting aspect, said second camera (7) is configured for framing at least a portion of the supporting element (2, 2*a*, 2*b*) and/or, in use, at least said predefined portion of the support (3) when housed on the supporting element (2, 2*a*, 2*b*), from a second observation point (P2) different from the first observation point (P1).

According to another non-limiting aspect, the device (1) is configured for activating the second camera (7) for generating at least another image of at least part of said portion of the biological sample and/or of said predefined portion of the support (3) through the second camera (7).

According to the present disclosure is described a device (1) for observing and for acquiring images of biological samples comprising:

a supporting element (2, 2*a*, 2*b*) configured for housing a support (3) for biological samples;

at least a first camera (6) and a second camera (7), both oriented toward the supporting element (2, 2*a*, 2*b*), wherein:

said first camera (6) is configured for framing at least a portion of the supporting element (2, 2*a*, 2*b*) and/or, in use, at least a first portion of the support (3) when housed on the supporting element (2, 2*a*, 2*b*), from a first observation point (P1);

said second camera (7) is configured for framing at least a portion of the supporting element (2, 2*a*, 2*b*) and/or, in use, at least a second portion of the support (3) when housed on the supporting element (2, 2*a*, 2*b*), from a second observation point (P2) different from the first observation point (P1);

and wherein the at least a predefined portion of the support (3) comprises, in use, a biological sample;

at least a first optical radiation source (10) configured for irradiating at least one between said first portion of the support (3) and said second portion of the support (3) from a first irradiation direction, in such a way that, in use, at least a portion of the biological sample is irradiated through the optical radiation of the first optical radiation source (10);

the device (1) being configured for activating the first camera (6) and the second camera (7) for generating:

at least a first image of at least part of said portion of the biological sample and/or of said first portion of the support (3) through the first camera (6), and at least a second image of at least part of said portion of the biological sample and/or of said second portion of the support (3) through the second camera (7).

According to another non-limiting aspect, said first portion of the support (3) and said second portion of the support (3) are at least partially coinciding and/or superimposed.

According to another non-limiting aspect, the device comprises at least a second optical radiation source (11), configured for irradiating at least said predefined portion of the support (3) from a second irradiation direction, different with respect to said first irradiation direction, in such a way that, in use, at least said portion of the biological sample is irradiated through optical radiation of the second optical radiation source (11).

According to another non-limiting aspect, the device comprises at least a second optical radiation source (11), configured for irradiating at least one between said first portion of the support (3) and said second portion of the support (3) from a second irradiation direction, different with respect to said first irradiation direction, in such a way that, in use, at least said portion of the biological sample is irradiated through optical radiation of the second optical radiation source (11).

According to another non-limiting aspect, the device (1) is configured for activating at least a combination between the first optical radiation source (10) and/or the second optical radiation source (11) and the first camera (6) or the second camera (7), in order to generate said at least a first image and said at least a second image.

According to another non-limiting aspect, the device (1) is configured for activating the first optical radiation source (10) in association to the activation of the first camera (6) and of the second camera (7), and/or for activating the second optical radiation source (11) in association to the activation of the first camera (6) and of the second camera (7) and/or wherein said at least a first image is generated through an activation of the first camera (6) and of the first optical radiation source (10) and wherein said at least a second image is generated through an activation of the first optical radiation source (10) and of the second camera (7) or wherein said at least a first image is generated through an activation of the second optical radiation source (11) and of the first camera (6) and said at least a second image is generated through an activation of the second optical radiation source (11) and of the second camera (7), or the device (1) is configured for activating the first optical radiation source (10) in association to the activation of the first camera (6) and for activating the second optical radiation source (11) in association to the activation of the second camera (7) and/or wherein said at least a first image is generated through an activation of the first optical radiation source (10) and of the first camera (6) and wherein said at least a second image is generated through an activation of the second optical radiation source (11) and of the second camera (7).

According to another non-limiting aspect, the device comprises at least an actuator, in particular a motor, configured for moving the supporting element (2, 2*a*, 2*b*), in particular for rotating the supporting element (2, 2*a*, 2*b*) around a rotation axis (Y).

According to another non-limiting aspect, said rotation axis (Y) is substantially vertical.

According to another non-limiting aspect, said rotation axis (Y) protrudes substantially orthogonally with respect to at least a planar central portion of the supporting element (2, 2*a*, 2*b*).

According to another non-limiting aspect, the device is configured for generating a first plurality of images of at least part of the biological sample and/or of the support (3) through the first camera (6), and/or for generating a second plurality of images of at least part of said portion of the biological sample and/or of the support (3) through the second camera (7).

According to another non-limiting aspect, the actuator, in particular the motor, is configured for moving the supporting element (2, 2*a*, 2*b*) at a constant speed.

According to another non-limiting aspect, the actuator is configured for causing, in use, a rotation of the supporting element (2, 2*a*, 2*b*) in a clockwise or counterclockwise direction and/or alternatively in clockwise or counterclockwise direction.

According to another non-limiting aspect, the rotation of the supporting element (2, 2*a*, 2*b*) is a rotation at constant angular speed.

According to another non-limiting aspect, the motor is configured for moving the supporting element (2, 2*a*, 2*b*) with a speed determined by a synchronization device configured for synchronizing a movement between the supporting element (2, 2*a*, 2*b*) and at least one between said first camera (6) and/or second camera (7).

According to another non-limiting aspect, said synchronization device comprises an encoder.

According to another non-limiting aspect, the device is configured for moving the supporting element (2, 2*a*, 2*b*), in particular for keeping the supporting element (2, 2*a*, 2*b*) in rotation during the acquisition of the at least a first image and a second image or during at least one between the generation of the first plurality of images of at least part of said portion of the biological sample and/or of the support (3) through the first camera (6) and the second plurality of images of at least part of the biological sample and/or of the support (3) through the second camera (7).

According to another non-limiting aspect, the first optical radiation source (10) is positioned in correspondence of a first side, upper or lower, of the supporting element (2, 2*a*, 2*b*), in particular at a height higher with respect to the height of the supporting element (2, 2*a*, 2*b*) and/or with respect to the height at which lies the support (3) housed on the supporting element (2, 2*a*, 2*b*).

According to another non-limiting aspect, at least one between the first camera (6) and the second camera (7) is positioned in correspondence of said first side of the supporting element (2, 2*a*, 2*b*), in particular at a height higher with respect to the height of the supporting element (2, 2*a*, 2*b*), and/or at least one between the first observation point (P1) and the second observation point (P2) lies in substantial correspondence of said first side of the supporting element (2, 2*a*, 2*b*), in particular at a height higher with respect to the height of the supporting element (2, 2*a*, 2*b*).

According to another non-limiting aspect, said second optical radiation source (11) is positioned in correspondence of a second side, lower or higher, of the supporting element (2, 2*a*, 2*b*), in particular at a height lower with respect to the height of the supporting element (2, 2*a*, 2*b*).

According to another non-limiting aspect, said second side is substantially opposed to said first side.

According to another non-limiting aspect, the device comprises at least a third camera (8) oriented toward the supporting element (2, 2*a*, 2*b*) and configured for framing at least said predefined portion of the supporting element (2, 2*a*, 2*b*) and/or, in use, at least said predefined portion of the support (3) when housed on the supporting element (2, 2*a*, 2*b*), from a third observation point (P3), different with respect to the first observation point and to the second observation point.

According to another non-limiting aspect, the device (1) comprises at least a third camera (8) configured for framing one between said first portion of the support (3) and said second portion of the support (3) and/or a third portion of the support (3) different from said first and said second portion of the support (3), from a third observation point (P3) different from the first observation point (P1) and from the second observation point (P2).

According to another non-limiting aspect, the third camera (8) is a linear camera, optionally trilinear.

According to another non-limiting aspect, the third camera (8) is a matrix camera.

According to another non-limiting aspect, the device (1) is configured for activating the third camera (8) for generating at least a third image of at least part of said portion of the biological sample and/or of the support (3) through the third camera (8).

According to another non-limiting aspect, the at least a third camera (8) is positioned in correspondence of said first side of the supporting element (2, 2*a*, 2*b*), in particular at a height higher with respect to the height of the supporting element (2, 2*a*, 2*b*), and/or the third observation point (P3) lies in substantial correspondence of said first side of the supporting element (2, 2*a*, 2*b*), in particular at a height higher with respect to the height of the supporting element (2, 2*a*, 2*b*).

According to another non-limiting aspect, the device is configured for generating a third plurality of images of at least part of said portion of the biological sample and/or of the support (3) through the third camera (8).

According to another non-limiting aspect, the device is configured for moving the supporting element (2, 2*a*, 2*b*), in particular for maintaining in rotation the supporting element (2, 2*a*, 2*b*) during the acquisition of the at least a third image or at least during the generation of the third plurality of images of at least part of said portion of the biological sample and/or of the support (3) through the third camera (8).

According to another non-limiting aspect, the device (1) comprises a third optical radiation source (9), configured for irradiating at least a portion of the support (3), optionally said predefined portion of the support (3), from a third irradiation direction, different with respect to said first irradiation direction and/or to said second irradiation direction, in such a way that, in use, at least said portion of the biological sample is irradiated through optical radiation of the third optical radiation source (9).

According to another non-limiting aspect, the device (1) comprises a third optical radiation source (9), configured for irradiating said first portion of the support (3) and/or said second portion of the support (3) and/or a third portion of the support (3) different from said first and/or said second portion of the support (3), from a third irradiation direction, different with respect to said first irradiation direction and/or to said second irradiation direction, in such a way that, in use, at least said portion of the biological sample is irradiated through optical radiation of the third optical radiation source (9).

According to another non-limiting aspect, the third optical radiation source (9) is a monochromatic and/or collimated optical radiation source, in particular a LASER source, and/or is a source emitting a substantially linear beam of optical radiation, in particular centered on a substantially diametric portion of the supporting element (2, 2*a*, 2*b*) and/or of the support (3).

According to another non-limiting aspect, the first optical radiation source (10) and/or the second optical radiation source (11) and/or the third optical radiation source (9) is configured for emitting an optical radiation comprised in at least one of the following fields: infrared, visible, ultraviolet.

According to another non-limiting aspect, at least one between the first optical radiation source (10), the second optical radiation source (11), the third optical radiation source (9) is a source tunable in wavelength.

According to another non-limiting aspect, at least one among the first camera (6), the second camera (7) and the third camera (8) is configured for generating an image containing electronic data indicative of a height variation of the biological sample, in particular of a culture medium and/or of at least a microorganism colony, in particular fungi, preferably molds and yeasts, and/or a bacterial and/or viral colony, with respect to a reference height and/or for generating an image containing electronic data indicative of a variation of intensity of reflection and/or diffusion of optical radiation, in particular of the biological sample, in particular of a culture medium and/or of at least a microorganism colony, in particular fungi, preferably molds and yeasts, and/or a bacterial and/or viral colony, and/or of at least part of the support (3) with respect to a reference intensity value of reflection and/or diffusion of the optical radiation.

According to another non-limiting aspect, at least one among said first image, said second image and said third image contains electronic data indicative of a height variation of the biological sample, in particular of a culture medium and/or of at least a microorganism colony, in particular fungi, preferably molds and yeasts, and/or a bacterial and/or viral colony, with respect to a reference height and/or contains electronic data indicative of a variation of intensity of reflection and/or diffusion of the optical radiation, in particular of the biological sample, in particular of a culture medium and/or of at least a microorganism colony, in particular fungi, preferably molds and yeasts, and/or a bacterial and/or viral colony, and/or of at least part of the support (3) with respect to a reference intensity value of reflection and/or diffusion of the optical radiation.

According to another non-limiting aspect, the device (1) is configured for activating the third optical radiation source (9) in association to the activation of the first camera (6), of the second camera (7) and of the third camera (8), and/or said at least a third image is generated through an activation of the third camera (8) and of the third optical radiation source (9).

According to another non-limiting aspect, said at least a second image is generated through an activation of the third optical radiation source (9) and of the second camera (7) and said first image is generated through an activation of the third optical radiation source (9) and of the first camera (6), or the device (1) is configured for activating the third optical radiation source (9) exclusively in association to the activation of the third camera (8) and/or said at least a third image is generated through an exclusive activation of the third optical radiation source (9) and of the third camera (8).

According to another non-limiting aspect, at least one between the first camera (6) and the second camera (7) is a linear camera, optionally a trilinear camera.

According to another non-limiting aspect, at least one between the first camera (6) and the second camera (7) is a matrix camera.

According to another non-limiting aspect, at least one between the first camera (6) and the second camera (7) is configured for framing, in use, a predetermined linear portion of the support (3) and/or of the biological sample.

According to another non-limiting aspect, at least one between the first observation point (P1) and the second observation point (P2) is an observation point forming an acute angle with respect to a plane upon which lies the supporting element (2, 2*a*, 2*b*).

According to another non-limiting aspect, at least one between said first camera (7) and said second camera (8) comprises an objective configured for correcting perspective and/or focusing distortions, said objective being optionally a decentrable and/or tilting objective.

According to another non-limiting aspect, said decentrable and/or tilting objective comprises an objective with lack of focus compensation operating through Scheimpflug's effect.

According to another non-limiting aspect, the device (1) is configured for allowing a decentering and/or tilting of said objective in a step of set-up and/or at least before the generation of the first and/or of the second image, and/or is configured for maintaining a predefined decentering and/or tilting of said objective at least during the generation of the first and/or of the second image and/or said third image, and/or said main image and/or said auxiliary image and/or during the activation of at least one among the first camera (6), the second camera (7) and the third camera (8).

According to another non-limiting aspect, at least one between the first camera (6) and the second camera (7), and optionally among the first camera (6), the second camera (7) and the third camera (8), presents an optics with focal different with respect to the other camera, optionally with respect to at least one of the other two cameras.

According to another non-limiting aspect, the device (1) comprises at least a device of temperature detection configured for detecting a temperature of the support (3) or of an outer environment portion and in proximity of the support (3).

According to another non-limiting aspect, the device (1) comprises at least a conditioner, operatively connected with the device of temperature detection and configured for causing a variation of the temperature of the support (3) and/or of said outer environment portion in proximity of the support (3), optionally at least when the support (3) lies on said supporting element (2, 2*a*, 2*b*).

According to another non-limiting aspect, the device (1) is configured for detecting the presence of humidity and/or condensation in correspondence of said support (3), optionally at least when the support (3) lies on said supporting element (2, 2*a*, 2*b*).

According to another non-limiting aspect, the device (1) is configured for interrupting the generation of images by means of at least one between the first camera (6) and/or the second camera (7) and/or the third camera (8) when it is detected an excessive presence of humidity and/or when it is detected condensation in correspondence of said support (3).

According to another non-limiting aspect, the device (1) is configured for detecting the presence of humidity and/or condensation in correspondence of said support (3) through at least one among the first camera (6), the second camera (7) or the third camera (8).

According to the present disclosure it is furthermore described a method for observing and acquiring images of biological samples comprising:

a step of observation of a support (3) containing a biological sample and housed on a supporting element (2, 2*a*, 2*b*), wherein, in the step of observation, a first camera (6) frames at least a predefined portion of the support (3) from a first observation point (P1) and wherein a second camera (7) frames at least said predefined portion of the support (3) from a second observation point (P2) different with respect to the first observation point (P1);

a step of irradiation of at least said predefined portion of the support (3), by means of a first optical radiation source (10), from a first irradiation direction, in such a way that, in use, at least a portion of the biological sample is irradiated through the optical radiation of the first optical radiation source (10);

a step of generation, through the activation of the first camera (6) and of the second camera (7) of:

at least a first image of at least part of said portion of the biological sample and/or of said predefined portion of the support (3), through the first camera (6), and at least a second image of at least part of said portion of the biological sample and/or of said predefined portion of the support (3), through the second camera (7).

According to the present disclosure it is furthermore described a method for observing and acquiring images of biological samples comprising:

a step of observation of a support (3) containing a biological sample and housed on a supporting element (2, 2*a*, 2*b*), wherein, in the step of observation, a first camera (6) frames at least a predefined portion of the support (3) from a first observation point (P1), wherein the first camera (6) is inclined with respect to a direction orthogonal to said support (3) and/or with respect to at least an upper surface of the biological sample contained in the support (3);

a step of irradiation of at least said predefined portion of the support (3), by means of a first optical radiation source (10), from a first irradiation direction, in such a way that, in use, at least a portion of the biological sample is irradiated through the optical radiation of the first optical radiation source (10);

a step of generation, through the activation of the first camera (6), of at least a first and a second image of at least part of said portion of the biological sample and/or of said predefined portion of the support (3).

According to another non-limiting aspect, in the step of observation, a second camera (7) frames at least said predefined portion of the support (3) from a second observation point (P2) different with respect to the first observation point (P1).

According to another non-limiting aspect, in the step of generation, through the activation of the second camera (7), is generated at least another image of at least part of said portion of the biological sample and/or of said predefined portion of the support (3), through the second camera (7).

According to the present disclosure it is furthermore described a method for observing and acquiring images of biological samples comprising:

a step of observation of a support (3) containing a biological sample and housed on a supporting element (2, 2*a*, 2*b*), wherein, in the step of observation, a first camera (6) frames at least a first portion of the support (3) from a first observation point (P1) and wherein a second camera (7) frames at least a second portion of the support (3) from a second observation point (P2) different with respect to the first observation point (P1);

a step of irradiation of at least one between said first and said second portion of the support (3), by means of a first optical radiation source (10), from a first irradiation direction, in such a way that, in use, at least a portion of the biological sample is irradiated through the optical radiation of the first optical radiation source (10);

a step of generation, through the activation of the first camera (6) and of the second camera (7) of:

at least a first image of at least part of said portion of the biological sample and/or of said first portion of the support (3), through the first camera (6), and at least a second image of at least part of said portion of the biological sample and/or of said second portion of the support (3), through the second camera (7).

According to another non-limiting aspect, in the step of irradiation at least a second optical radiation source (11) is activated and irradiates the at least a portion of the support (3) from a second irradiation direction, different with respect to said first irradiation direction, in such a way that, in use, at least said portion of the biological sample is irradiated through the optical radiation of the second optical radiation source (11).

According to another non-limiting aspect, the method comprises the activation of at least a combination between the first optical radiation source (10), and/or the second optical radiation source (11), and the first camera (6) and/or the second camera (7), in order to generate at least said first image and said second image.

According to another non-limiting aspect, the method comprises the activation of the first optical radiation source (10) in association to the activation of the first camera (6) and of the second camera (7), and/or comprises the activation of the second optical radiation source (11) in association to the activation of the first camera (6) and of the second camera (7) and/or, in said step of generation, said at least a first image is generated through an activation of the first camera (6) and of the first optical radiation source (10) and said at least a second image is generated through an activation of the first optical radiation source (10) and of the second camera (7) or, in said step of generation, said at least a first image is generated through an activation of the second optical radiation source (11) and of the first camera (6) and said at least a second image is generated through an activation of the second optical radiation source (11) and of the second camera (7), or the method comprises the activation of the first optical radiation source (10) in association to the activation of the first camera (6) and comprises the activation of the second optical radiation source (11) in association to the activation of the second camera (7) and/or, in said step of generation, said at least a first image is generated through an activation of the first optical radiation source (10) and of the first camera (6) and, in said step of generation, said at least a second image is generated through an activation of the second optical radiation source (11) and of the second camera (7).

According to another non-limiting aspect, the method comprises a step of activation of at least an actuator, in particular a motor, for moving the supporting element (2, 2*a*, 2*b*), in particular for rotating the supporting element (2, 2*a*, 2*b*) around a rotation axis (Y).

According to another non-limiting aspect, the step of generation comprises a generation of a first plurality of images of at least part of the biological sample and/or of the support (3) through the first camera (6), and/or a generation of a second plurality of images of at least part of said portion of the biological sample and/or of the support (3) through the second camera (7).

According to another non-limiting aspect, the step of activation of the actuator, in particular the step of activation of the motor, determines a movement of the supporting element (2, 2*a*, 2*b*) with a speed determined by a synchronization device configured for synchronizing a movement between the supporting element (2, 2*a*, 2*b*) and at least one among said first camera (6) and/or said second camera (7) and/or said third camera (8).

According to another non-limiting aspect, the method comprises a step of movement of the supporting element (2, 2*a*, 2*b*), in particular a step of keeping in rotation of the supporting element (2, 2*a*, 2*b*) during the acquisition of the at least a first image and a second image or during at least one between the generation of the first plurality of images of at least part of said portion of the biological sample and/or of the support (3) through the first camera (6) and the second plurality of images of at least part of the biological sample and/or of the support (3) through the second camera (7).

According to another non-limiting aspect, in the step of irradiation, the first optical radiation source (10) irradiates the support (3) and/or the biological sample from a first side, upper or lower, of the supporting element (2, 2*a*, 2*b*), in particular from a height higher with respect to the height of the supporting element (2, 2*a*, 2*b*) and/or of the support (3) housed on the supporting element (2, 2*a*, 2*b*).

According to another non-limiting aspect, the step of observation provides for the observation of the support (3) having at least one between the first camera (6) and the second camera (7) positioned in correspondence of said first side of the supporting element (2, 2*a*, 2*b*), in particular at a height higher with respect to the height of the supporting element (2, 2*a*, 2*b*).

According to another non-limiting aspect, at least one between the first observation point (P1) and the second observation point (P2) lies in substantial correspondence of a first side of the supporting element (2, 2*a*, 2*b*), in particular at a height higher with respect to the height of the supporting element (2, 2*a*, 2*b*).

According to another non-limiting aspect, the step of irradiation by means of the second optical radiation source (11) comprises an irradiation of the support from a second side, lower or higher, of the supporting element (2, 2*a*, 2*b*), in particular from a height lower with respect to the height of the supporting element (2, 2*a*, 2*b*).

According to another non-limiting aspect, in the step of observation at least a third camera (8) frames at least said predefined portion of the support (3) from a third observation point (P3) different with respect to the first observation point (P1) and to the second observation point (P2).

According to another non-limiting aspect, in the step of observation at least a third camera (8) frames at least one between said first portion of the support (3) and/or said second portion of the support (3) and optionally a third portion of the support (3) different from said first and/or from said second portion of support (3), from a third observation point (P3) different with respect to the first observation point (P1) and to the second observation point (P2).

According to another non-limiting aspect, in the step of generation, it is generated at least a third image of at least part of the biological sample and/or of the support (3), through the activation of the third camera (8).

According to another non-limiting aspect, the step of observation provides for the observation of the support (3) with the third camera (8) positioned in correspondence of said first side of the supporting element (2, 2*a*, 2*b*), in particular at a height higher with respect to the height of the supporting element (2, 2*a*, 2*b*), and/or the third observation point (P3) lies in substantial correspondence of said first side of the supporting element (2, 2*a*, 2*b*), in particular at a height higher with respect to the height of the supporting element (2, 2*a*, 2*b*).

According to another non-limiting aspect, the step of generation comprises a generation of a third plurality of images of at least part of said portion of the biological sample and/or of the support (3) through the third camera (8).

According to another non-limiting aspect, the method comprises a step of movement of the supporting element (2, 2*a*, 2*b*), in particular a step of maintaining in rotation the supporting element (2, 2*a*, 2*b*) during the acquisition of the at least a third image or during the generation of the third plurality of images of at least part of said portion of the biological sample and/or of the support (3) through the third camera (8).

According to another non-limiting aspect, in the step of irradiation of the support (3), a first optical radiation source (10) is activated and irradiates at least said predefined portion of the support (3) from a first irradiation direction, in such a way that, in use, at least said portion of the biological sample is irradiated through the optical radiation of the first optical radiation source (10).

According to another non-limiting aspect, in the step of irradiation of the support (3), a first optical radiation source (10) is activated and irradiates at least one between said first portion of the support (3) and said second portion of the support (3), optionally said third portion of the support (3), from a first irradiation direction, in such a way that, in use, at least said portion of the biological sample is irradiated through the optical radiation of the first optical radiation source (10).

According to another non-limiting aspect, the step of irradiation through the third optical radiation source (9) comprises the emission of a monochromatic and/or collimated optical radiation, in particular through a LASER source, and/or comprises the emission of a substantially linear beam of optical radiation, in particular centered on a substantially diametric portion of the supporting element (2, 2*a*, 2*b*) and/or of the support (3).

According to another non-limiting aspect, the step of irradiation comprises an irradiation of the at least a portion of the support (3) with at least one between the first optical radiation source (10) and/or the second optical radiation source (11) and/or the third optical radiation source (9) emitting an optical radiation comprised in at least one of the following fields: infrared, visible, ultraviolet.

According to another non-limiting aspect, the step of irradiation comprises a tuning of a wavelength of emission of at least one between the first optical radiation source (10), the second optical radiation source (11), the third optical radiation source (9) on a predetermined wavelength.

According to another non-limiting aspect, the step of generation comprises, through at least one among the first camera (6), the second camera (7) and the third camera (8) a generation of an image containing electronic data indicative of a height variation of the biological sample, in particular of a culture medium and/or of at least a microorganism colony, in particular fungi, preferably molds and yeasts, and/or a bacterial and/or viral colony, with respect to a reference height and/or the generation of at least an image containing electronic data indicative of a variation of intensity of reflection and/or diffusion of the optical radiation, in particular of the biological sample, in particular of a culture medium and/or of at least a microorganism colony, in particular fungi, preferably molds and yeasts, and/or a bacterial and/or viral colony, and/or of at least part of the support (3) with respect to an intensity value of reflection and/or diffusion of the reference optical radiation.

According to another non-limiting aspect, the generation of the image containing electronic data indicative of a height variation of the biological sample takes place by triangulation.

According to another non-limiting aspect, at least one among said first image, said second image and said third image generated in the step of generation contains electronic data indicative of a height variation of the biological sample, in particular of a culture medium and/or of at least a microorganism colony, in particular fungi, preferably molds and yeasts, and/or a bacterial and/or viral colony, with respect to a reference height and/or contains electronic data indicative of a variation of intensity of reflection and/or diffusion of the optical radiation, in particular of the biological sample, in particular of a culture medium and/or of at least a microorganism colony, in particular fungi, preferably molds and yeasts, and/or a bacterial and/or viral colony, and/or of at least part of the support (3) with respect to a reference intensity value of reflection and/or diffusion of the optical radiation.

According to another non-limiting aspect, the method comprises the activation of the third optical radiation source (9) in association to the activation of the first camera (6), of the second camera (7) and of the third camera (8) and/or, in said step of generation, said at least a third image is generated through an activation of the third camera (8) and of the third optical radiation source (9) and, in said step of generation, said at least a second image is generated through an activation of the third optical radiation source (9) and of the second camera (7) and said first image is generated through an activation of the third optical radiation source (9) and of the first camera (6), or

- the activation of the third optical radiation source (9) exclusively in association to the activation of the third camera (8) and/or, in said step of generation, said at least a third image is generated through an exclusive activation of the third optical radiation source (9) and of the third camera (8).

According to another non-limiting aspect, the step of observation comprises an observation of a predetermined linear portion of the support (3) and/or of the biological sample, and/or at least one between the first observation point (P1) and the second observation point (P2) is an observation point forming an acute angle with respect to a plane on which lies the supporting element (2, 2*a*, 2*b*).

According to another non-limiting aspect, the method comprises a step of correction of a perspective and/or focusing distortion of at least one between said first camera (6) and said second camera (7), in particular through a decentering and/or a tilting of the objective of the first camera (6) and/or of the second camera (7).

According to another non-limiting aspect, said step of correction of said perspective and/or focusing distortion occurs before the activation of said first camera (6) and/or of said second camera (7) and/or said third camera (8) and/or before the acquisition and/or the generation of at least one among said first image and said second image, and/or said main image and/or said auxiliary image and/or wherein the step of correction of the perspective distortion comprises:

- a step of setting of a predefined decentering and/or tilting of said objective;
- a maintaining of said predefined decentering and/or tilting of said objective during the activation of the at least a first camera (6) and/or second camera (7) and/or third camera (8), and/or during the generation of at least one among said first image, said second image, said third image and/or said main image and/or said auxiliary image.

According to another non-limiting aspect, the method comprises a step of detection of a temperature of the support (3) or of an outer environment portion and in proximity of the support (3) by means of a device of temperature detection.

According to another non-limiting aspect, the method comprises a step of variation of a temperature of said support (3) or of said outer environment portion and in proximity of the support (3), the step of variation of temperature being carried out through a conditioner operatively connected with the device of temperature detection, and optionally occurring at least when the support (3) lies on said supporting element (2, 2*a*, 2*b*).

According to another non-limiting aspect, the method comprises a step of detection of presence of humidity and/or condensation in correspondence of said support (3), optionally occurring at least when the support (3) lies on said supporting element (2, 2*a*, 2*b*).

According to another non-limiting aspect, the method comprises an interruption of the step of generation of images through at least one among the first camera (6) and/or the second camera (7) and/or the third camera (8) when it is detected an excessive presence of humidity and/or when it is detected condensation in correspondence of said support (3).

According to another non-limiting aspect, the step of detection of presence of humidity and/or condensation in correspondence of said support (3) occurs through at least one among the first camera (6), the second camera (7) or the third camera (8).

According to the present disclosure it is furthermore described a device (1) for observing and for acquiring images of biological samples comprising:

- a supporting element (2, 2*a*, 2*b*) configured for housing a support (3) for biological samples;
- at least a first camera (6) oriented toward the supporting element (2, 2*a*, 2*b*) and configured for framing at least a portion of the supporting element (2, 2*a*, 2*b*) and/or, in use, at least a predefined portion of the support (3) when housed on the supporting element (2, 2*a*, 2*b*), from a first observation point (P1), wherein said predefined portion of the support (3) comprises, in use, a biological sample;
- at least a first optical radiation source (10) configured for irradiating at least said predefined portion of the support (3) from a first irradiation direction, in such a way that, in use, at least a predefined portion of the biological sample is irradiated through the optical radiation of the first optical radiation source (10);
- an actuator, in particular a motor, configured for rotating the supporting element (2, 2*a*, 2*b*) and the support (3) therein housed in use, around a rotation axis (Y), preferably centered on the supporting element (2, 2*a*, 2*b*) and/or on the support (3), and/or for rotating at least said first camera (6) with respect to said supporting element (2, 2*a*, 2*b*) and to said support (3) therein housed;
- the device (1) being configured for activating at least the first camera (6) and the actuator for generating, preferably during the actuation in rotation of the supporting element (2, 2*a*, 2*b*) and of the support (3), and/or of the first camera (6) carried out by the actuator:
- at least a first plurality or first set (Img(1,*i*), i=1 . . . N) of N images(Img(1,1) . . . Img(1,N) of N predefined portions of the support (3), wherein each image of the first plurality or first set (Img(1,*i*), i=1 . . . N) of N images (Img(1,1) . . . Img(1,N)) is acquired in correspondence of at least a predetermined angular detection position, optionally fixed, and of a respective and proper angle of rotation of the supporting element (2, 2*a*, 2*b*) and of the support (3) with respect to an angular starting position.

According to another non-limiting aspect, the device comprises at least a second camera (7) oriented toward the supporting element (2, 2*a*, 2*b*) and configured for framing at least said predefined portion of the supporting element (2, 2*a*, 2*b*) and/or, in use, at least said predefined portion of the support (3) when housed on the supporting element (2, 2*a*, 2*b*), from a second observation point (P2), different with respect to the first observation point.

According to another non-limiting aspect, the device comprises at least a second camera (7) oriented toward the supporting element (2, 2*a*, 2*b*) and configured for framing at least said predefined portion of the supporting element (2, 2*a*, 2*b*) and/or, in use, at least a further portion of the support (3), different from said predefined portion of the support (3), when housed on the supporting element (2, 2*a*, 2*b*), from a second observation point (P2), different with respect to the first observation point.

According to another non-limiting aspect, the device is configured for activating the second camera (7) and the actuator, for generating, preferably during the actuation in rotation of the supporting element (2, 2*a*, 2*b*) and of the support (3), and/or of the second camera (7) carried out by the actuator, at least a second plurality or second set (Img (2,*i*), i=1 . . . M) of M images (Img(2,1) . . . Img(2,M)) of M predefined portions of the support (3), wherein each image of the second plurality or second set (Img(2,*i*), i=1 . . . M) of M images (Img(2,1) . . . Img(2,M)) is acquired in correspondence of at least a predetermined, optionally fixed, angular detection position and a respective and proper angle of rotation of the supporting element (2, 2*a*, 2*b*) and of the support (3) with respect to a starting angular position.

According to another non-limiting aspect, the device is configured for activating the third camera (8) and the actuator, for generating, preferably during the actuation in rotation of the supporting element (2, 2*a*, 2*b*) and of the support (3), and/or of the third camera (8) carried out by the actuator, at least a third plurality or third set (Img(3,*i*), i=1 . . . W) of W images (Img(3,1) . . . Img(3,W)) of W predefined portions of the support (3), wherein each image of the third plurality or third set (Img(3,*i*), i=1 . . . W) of W images (Img(3,1) . . . Img(3,W) is acquired in correspondence of at least a predetermined, optionally fixed, angular detection position and a respective and proper angle of rotation of the supporting element (2, 2*a*, 2*b*) and of the support (3) with respect to a starting angular position.

According to another non-limiting aspect, the device (1) is configured for generating at least a first intermediate image obtained by juxtaposing at least part of the N images (Img(1,1) . . . Img(1,N)) of the first set (Img(1,*i*), i=1 . . . N) of N images (Img(1,1) . . . Img(1,N).

According to another non-limiting aspect, the predetermined detection angular position is a substantially linear portion and/or corresponds to at least a portion of a radius or of a diameter of the support (3) or to a radius or to a diameter of the support (3) and/or each of said N predefined portions of the support (3) correspond each to at least a portion of a radius or of a diameter of the support (3) or to a radius or to a diameter of the support (3) and/or the predefined portion of the support (3) is a substantially central portion of the support (3) and/or the first camera (6) is configured for framing a substantially central portion of the supporting element (2, 2*a*, 2*b*), said substantially central portion of the support (3) being a substantially radial or diametric portion and/or said central portion of the supporting element (2, 2*a*, 2*b*) is a substantially radial or diametric portion.

According to another non-limiting aspect, the predetermined detection angular position is a substantially linear portion and/or corresponds to at least a portion of a radius or of a diameter of the support (3) or to a radius or to a diameter of the support (3) and/or each of said N predefined portions of the support (3) correspond each to at least a portion of a radius or of a diameter of the support (3) or to a radius or to a diameter of the support (3) and/or the first and/or the second and/or the third and/or said further portion of the support (3) is a substantially central portion of the support (3) and/or the first camera (6) is configured for framing a substantially central portion of the supporting element (2, 2*a*, 2*b*), said substantially central portion of the support (3) being a substantially radial or diametric portion and/or said central portion of the supporting element (2, 2*a*, 2*b*) is a substantially radial or diametric portion.

According to another non-limiting aspect, the device is configured for generating at least a second intermediate image obtained by juxtaposing at least part of the M images (Img(2,1) . . . Img(2,M) of the second set (Img(2,*i*), i=1 . . . M) of M images (Img(2,1) . . . Img(2,M)).

According to another non-limiting aspect, the device is configured for generating at least a third intermediate image obtained by juxtaposing at least part of the W images (Img(3,1) . . . Img(3,W)) of the third set (Img(3,*i*), i=1 . . . W) of W images (Img(3,1) . . . Img(3,W)).

According to another non-limiting aspect, the at least a first camera (6) is a linear camera, optionally a trilinear camera, wherein the first set (Img(1,*i*), i=1 . . . N) of N images (Img(1,1) . . . Img(1,N) comprises N linear images, and preferably wherein the first intermediate image is obtained by juxtaposing at least part of the N images (Img(1,1) . . . Img(1,N)) of the first set (Img(1,*i*), i=1 . . . N) of N images (Img(1,1) . . . Img(1,N)) along a direction substantially orthogonal with respect to a direction of maximum extension of each of the N linear images.

According to another non-limiting aspect, at least one between the second camera (7) and the third camera (8) is a linear camera, optionally a trilinear camera, wherein the second set (Img(2,*i*), i=1 . . . M) of M images (Img(2,1) . . . Img(2,M) and/or the third set of images (Img(3,*i*), i=1 . . . W) of W images (Img(3,1) . . . Img(3,W)) comprises M or W linear images, and preferably wherein, respectively, the second and/or the third intermediate image is obtained by juxtaposing at least part of the M or W images (Img(2,1) . . . Img(2,M), Img(3,1) . . . Img(3,W)) of the second set (Img(2,*i*), i=1 . . . M) of M images (Img(2,1) . . . Img(2,M) and/or of the third set (Img(3,*i*), i=1 . . . W) of W images (Img(3,1) . . . Img(3,W)) along a direction substantially orthogonal with respect to a direction of maximum extension of each of the M or W linear images.

According to another non-limiting aspect, at least one among said first camera (6), said second camera (7) and said third camera (8), when trilinear, comprises a triad of sensors of optical radiation each configured for receiving optical radiations having frequency or wavelength lying in a receiving window substantially different with respect to the receiving window of the other sensors of said triad.

According to another non-limiting aspect, at least one among said first camera (6), said second camera (7) and said third camera (8) comprises a sensor of optical radiation and a device of active cooling for said sensor, configured and specifically destined to reduce the electrical noise generated by said sensor during the framing of images.

According to another non-limiting aspect, the device (1) is configured for generating at least a first reconstructed image (Img(C1)), said first reconstructed image (Img(C1) being obtained, in use, by combining in rotation at least part of the N images (Img(1,1) . . . Img(1, N)) of the at least a first set (Img(1,*i*), i=1 . . . N) of N images (Img(1,1) . . . Img(1,N)).

According to another non-limiting aspect, the reconstructed image (Img(C1) is obtained from a combination in rotation of the N images on a round angle.

According to another non-limiting aspect, the device is configured for generating at least a second reconstructed image (Img(C2)), said second reconstructed image (Img(C2) being obtained, in use, by combining in rotation at least part of the M images (Img(2,1) . . . Img(2,M) of the at least a second set (Img(2,*i*), i=1 . . . M) of M images (Img(2,1) . . . Img(2,M).

According to another non-limiting aspect, the second reconstructed image (Img(C2) is obtained from a combination in rotation of the M images of the second set of M images on a round angle.

According to another non-limiting aspect, the device is configured for generating at least a third reconstructed image (Img(C3)), said third reconstructed image (Img(C3) being obtained, in use, by combining in rotation at least part of the W images (Img(3,1) . . . Img(3,W) of the at least a third set (Img(2,*i*), i=1 . . . W) of W images (Img(3,1) . . . Img(3,W)).

According to another non-limiting aspect, the third reconstructed image (Img(C3) is obtained from a combination in rotation of the W images of the third set of W images on a round angle.

According to another non-limiting aspect, the number of images of at least a pair comprises the first set (Img(1,*i*), i=1 . . . N) of N images (Img(1,1) . . . Img(1,N)) and the second set (Img(2,*i*), i=1 . . . M) of M images (Img(2,1). Img(2,M)) or comprising the second set (Img(2,*i*), i=1 . . . M) of M images (Img(2,1) . . . Img(2,M)) and the third set (Img(3,*i*), i=1 . . . W) of W images (Img(3,1) . . . Img(3,W)) or comprising the third set (Img(3,*i*), i=1 . . . W) of W images (Img(3,1) . . . Img(3,W)) and the first set (Img(1,*i*), i=1 . . . N) of N images (Img(1,1) . . . Img(1,N)) is equal, optionally the number of images composing the first set (Img(1,*i*), i=1 . . . N) of N images (Img(1,1) . . . Img(1,N)), the second set (Img(2,*i*), i=1 . . . M) of M images (Img(2,1) . . . Img(2,M)) and the third set (Img(3,*i*), i=1 . . . W) of W images (Img(3,1) . . . Img(3,W) being equal.

According to another non-limiting aspect, the first reconstructed image (Img(C1) is obtained by transforming, preferably by rolling up, the first intermediate image around a rotation point arranged in a predefined portion of the intermediate image, in particular at the center of the intermediate image itself and/or at the center of the support (3) and/or in correspondence of a substantially central portion of the biological sample of said support (3) or at a side or end portion of a first sub-image of said intermediate image and corresponding to an end point or an intermediate point, optionally a mid-point, of one of the N images of the first set (Img(1,*i*), i=1 . . . N) of N images (Img(1,1) . . . Img(1,N)), optionally wherein said end point is an end point along the direction of maximum extension of one of said N images of the first set of N images.

According to another non-limiting aspect, the second reconstructed image (Img(C2) is obtained by transforming, preferably by rolling up, the second intermediate image around a rotation point arranged in a predefined portion of the intermediate image, in particular at the center of the intermediate image itself and/or at the center of the support (3) and/or in correspondence of a substantially central portion of the biological sample of said support (3) or at a side or end portion of a first sub-image of said intermediate image and corresponding to an end point or an intermediate point, optionally a mid-point, of one of the M images of the second set (Img(2,*i*), i=1 . . . M) of M images (Img(2,1) . . . Img(2,M)), optionally wherein said end point is an end point along the direction of maximum extension of one of said M images of the second set of M images.

According to another non-limiting aspect, the third reconstructed image (Img(C3) is obtained by transforming, preferably by rolling up, the third intermediate image around a rotation point arranged in a predefined portion of the intermediate image, in particular at the center of the intermediate image itself and/or at the center of the support (3) and/or in correspondence of a substantially central portion of the biological sample of said support (3) or at a side or end portion of a first sub-image of said intermediate image and corresponding to an end point or an intermediate point, optionally a mid-point, of one of the W images of the third set (Img(3,*i*), i=1 . . . W) of W images (Img(3,1) . . . Img(3,W)), optionally wherein said end point is an end point along the direction of maximum extension of one of said W images of the third set of W images.

According to another non-limiting aspect, the device (1) comprises a synchronization device configured for synchronizing a rotation between the supporting element (2, 2*a*, 2*b*) and at least said a first camera (6), in such a way that for each image of the first set (Img(1,*i*), i=1 . . . N) of N images (Img(1,1) . . . Img(1,N)) corresponds a respective predefined rotation angle of the supporting element (2, 2*a*, 2*b*) and/or of the support (3) with respect to a reference position, in particular a reference azimuthal angular position.

According to another non-limiting aspect, the synchronization device is configured for synchronizing the rotation between the supporting element (2, 2*a*, 2*b*) and at least said second camera (7) and/or said third camera (8), in such a way that for each image of the second set (Img(2,*i*), i=1 . . . M) of M images (Img(2,1) . . . Img(2,M)) and/or of the third set (Img(3,*i*), i=1 . . . W) of W images (Img(3,1) . . . Img(3,W) corresponds a respective predefined rotation angle of the supporting element (2, 2*a*, 2*b*) and/or of the support (3) with respect to a reference position, in particular a reference azimuthal angular position.

According to another non-limiting aspect, the device (1) comprises a motion device (15, 5) configured for moving, optionally at least in uplifting, at least a support (3) between a position collection (Pp), optionally in correspondence of a magazine for supports (3), and an observation position (Po) predetermined on the supporting element (2, 2*a*, 2*b*).

According to another non-limiting aspect, the motion device (15, 5) comprises a centering device, configured for determining a movement of the support (3) on the supporting element (2, 2*a*, 2*b*) in order to determine the reaching of the observation position (P2) predetermined by the support (3) and/or for retaining said support (3) in the observation position (P2) predetermined on the supporting element (2, 2*a*, 2*b*).

According to another non-limiting aspect, the centering device comprises at least a pusher (5) movable between at least a first and a second position and comprises, preferably at least a first pair of pushers (5) reciprocally opposite with respect to the observation position and movable preferably along a same first direction, respectively according to a first and a second way opposite to each other.

According to another non-limiting aspect, the centering device comprises at least a first releasing configuration wherein the at least a pusher (5), optionally each pusher of the first pair of pushers (5) and/or of the second pair of pushers (5), is spaced with respect to the support (3) and a second retaining configuration wherein the at least one pusher (5), optionally each pusher of the at least one first pair of pushers (5) and/or a second pair of pushers (5), touches the support (3) and retains the support (3) in said observation position (Po).

According to the present disclosure is furthermore described a method for observing and for acquiring images of biological samples comprising:

- a step of observation of a support (3) containing a biological sample wherein the support (3) is positioned on a supporting element (2, 2*a*, 2*b*) configured for housing a support (3), wherein, in the step of observation, a first camera (6), oriented toward the supporting element (2, 2*a*, 2*b*), frames at least a portion of the supporting element (2, 2*a*, 2*b*) and/or at least a predefined portion of the support (3), when housed on the supporting element (2, 2*a*, 2*b*), from a first observation point (P1);
- a step of irradiation of the support (3), wherein at least a first optical radiation source (10) is activated and irradiates at least said predefined portion of the support (3) from a first irradiation direction, in such a way that, in use, at least a predefined portion of the biological sample is irradiated through the optical radiation of the first optical radiation source (10);
- a step of activation of at least an actuator, in particular a motor, connected to the supporting element (2, 2*a*, 2*b*), said step of activation determining a rotation of the supporting element (2, 2*a*, 2*b*) and the support (3) therein housed in use, around a rotation axis (Y), preferably centered on the supporting element (2, 2*a*, 2*b*) and/or on the support (3) and/or a step of activation of at least an actuator, in particular a motor, connected to the first camera (6), said step of activation determining a rotation of said first camera (6) with respect to said supporting element (2, 2*a*, 2*b*) and to said support (3) therein housed;
- a step of generation, after the activation of the at least a first camera (6) and of the actuator, of at least a first plurality or first set (Img(1,*i*), i=1 . . . N) of N images (Img(1,1) . . . Img(1,N)) of N predefined portions of the support (3), wherein each image of the first plurality or first set (Img(1,*i*), i=1 . . . N) of N images (Img(1,1) . . . Img(1,N) is acquired in correspondence of at least a predetermined detection angular position, optionally fixed, and of a respective and rotation angle thereof of the supporting element (2, 2*a*, 2*b*) and of the support (3) with respect to a starting angular position, said step of generation preferably occurring during the step of activation of said actuator determining the rotation of the supporting element (2, 2*a*, 2*b*) and of the support (3), and/or of the first camera (6).

According to another non-limiting aspect, in the step of observation a second camera (7), oriented toward the supporting element (2, 2*a*, 2*b*), frames the at least a portion of the supporting element (2, 2*a*, 2*b*) and/or the at least a predefined portion of the support (3), when housed on the supporting element (2, 2*a*, 2*b*), from a second observation point (P2) different with respect to the first observation point (P1).

According to another non-limiting aspect, in the step of observation, a third camera (8) oriented toward the supporting element (2, 2*a*, 2*b*), frames the at least a portion of the supporting element (2, 2*a*, 2*b*), and/or the at least a predefined portion of the support (3), when housed on the supporting element (2, 2*a*, 2*b*), from a third observation point (P3) different with respect to the first observation point (P1) and different with respect to the second observation point (P2).

According to another non-limiting aspect, the method comprises a step of activation of at least an actuator, in particular a motor, connected to the second camera (7), said step of activation determining a rotation of said second camera (7) with respect to said supporting element (2, 2*a*, 2*b*) and to said support (3) therein housed.

According to another non-limiting aspect, the method comprises a step of activation of at least an actuator, in particular a motor, connected to the third camera (8), said step of activation determining a rotation of said third camera (8) with respect to said supporting element (2, 2*a*, 2*b*) and to said support (3) therein housed.

According to another non-limiting aspect, the method comprises a step of generation, after the activation of the at least a second camera (7) and of the actuator, of at least a second plurality or second set (Img(2,*i*), i=1 . . . M) of M images (Img(2,1) . . . Img(2,M) of M predefined portions of the support (3), wherein each image of the second plurality or second set (Img(2,*i*), i=1 . . . M) of M images (Img(2,1) . . . Img(2,M)) is acquired in correspondence of at least a predetermined detection angular position, optionally fixed, and of a respective and own rotation angle of the supporting element (2, 2*a*, 2*b*) and of the support (3) with respect to a starting angular position, said step of generation preferably occurring during the step of activation of said actuator determining the rotation of the supporting element (2, 2*a*, 2*b*) and of the support (3), and/or of the second camera (7).

According to another non-limiting aspect, the method comprises a step of generation, after the activation of the at least a third camera (8) and of the actuator, of at least a third plurality or third set (Img(3,*i*), i=1 . . . W) of W images (Img(3,1) . . . Img(3,W)) of W predefined portions of the support (3), wherein each image of the third plurality or third set (Img(3,*i*), i=1 . . . W) of W images (Img(3,1) . . . Img(3,W)) is acquired in correspondence of at least a predetermined detection angular position, optionally fixed, and of a respective and own rotation angle of the supporting element (2, 2*a*, 2*b*) and of the support (3) with respect to a starting angular position, said step of generation preferably occurring during the step of activation of said actuator determining the rotation of the supporting element (2, 2*a*, 2*b*) and of the support (3), and/or of the third camera (8).

According to another non-limiting aspect, the method comprises a step of generation of at least a first intermediate image comprising a juxtaposition of at least part of the N images (Img(1,1) . . . Img(1,N)) of the first set (Img(1,*i*), i=1 . . . N) of N images (Img(1,1) . . . Img(1,N)).

According to another non-limiting aspect, the predetermined detection angular position is a substantially linear portion and/or corresponds to at least a portion of a radius or a diameter of the support (3) or to a radius or a diameter of the support (3) and/or each of said N predefined portions of the support (3) corresponds each to at least a portion of a radius or a diameter of the support (3) or to a radius or to a diameter of the support (3) and/or the predefined portion of the support (3) is a substantially central portion of the support (3) and/or the first camera (6) is configured for framing a substantially central portion of the supporting element (2, 2*a*, 2*b*), said substantially central portion of the support (3) being a substantially radial or diametric portion and/or said central portion of the supporting element (2, 2*a*, 2*b*) is a substantially radial or diametric portion.

According to another non-limiting aspect, the method comprises a step of generation of a second intermediate image comprising a juxtaposition of at least part of the M images (Img(2,1) . . . Img(2,M)) of the second set (Img(2,*i*), i=1 . . . M) of M images (Img(2,1) . . . Img(2,M)).

According to another non-limiting aspect, the method comprises a step of generation of a third intermediate image comprising a juxtaposition of at least part of the W images (Img(3,1) . . . Img(3,W) of the third set (Img(3,*i*), i=1 . . . W) of W images (Img(3,1) . . . Img(3,W).

According to another non-limiting aspect, the at least a first camera (6) is a linear camera, optionally a trilinear camera, wherein the first set (Img(1,*i*), i=1 . . . N) of N images (Img(1,1) . . . Img(1,N) comprises N linear images, and, preferably, wherein the step of generation of the intermediate image comprises a juxtaposition of at least part of the N images (Img(1,1) . . . Img(1,N)) of the first set (Img(1,*i*), i=1 . . . N) of N images (Img(1,1) . . . Img(1,N)) along a direction substantially orthogonal with respect to a direction of maximum extension of each of the N linear images.

According to another non-limiting aspect, at least one between the second camera (7) and the third camera (8) is a linear camera, optionally a trilinear camera.

According to another non-limiting aspect, the second set (Img(2,*i*), i=1 . . . M) of M images (Img(2,1) . . . Img(2,M) and/or the third set of images (Img(3,*i*), i=1 . . . W) of W images (Img(3,1) . . . Img(3,W) comprises M or W linear images, and the step of generation of the second intermediate image and/or of the third intermediate image comprises a juxtaposition of at least part of the M or W images (Img(2,1) . . . Img(2,M), Img(3,1) . . . Img(3,W)) of the second set (Img(2,*i*), i=1 . . . M) of M images (Img(2,1) . . . Img(2,M)) and/or of the third set of images (Img(3,*i*), i=1 . . . W) of W images (Img(3,1) . . . Img(3,W)) along a direction substantially orthogonal with respect to a direction of maximum extension of each of the M or W linear images.

According to another non-limiting aspect, the method comprises a step of generation of at least a first reconstructed image (Img(C1)), obtained combining in rotation at least part of the N images (Img(1,1) . . . Img(1,N)) of the at least a first set (Img(1,*i*), i=1 . . . N) of N images (Img(1,1) . . . Img(1,N)).

According to another non-limiting aspect, the reconstructed image (Img(C1)) is obtained from a combination in rotation of the N images of the first set (Img(1,*i*), i=1 . . . N) of N images (Img(1,1) . . . Img(1,N) on a round angle.

According to another non-limiting aspect, the method comprises a step of generation of at least a second reconstructed image (Img(C2), obtained combining in rotation at least part of the M images (Img(2,1) Img(2,M) of the second set (Img(2,*i*), i=1 . . . M) of M images (Img(2,1) . . . Img(2,M)).

According to another non-limiting aspect, the second reconstructed image (Img(C2) is obtained from a combination in rotation of the M images of the second set (Img(2,*i*), i=1 . . . M) of M images (Img(2,1) . . . Img(2,M)) on a round angle.

According to another non-limiting aspect, the method comprises a step of generation of at least a third reconstructed image (Img(C3), obtained combining in rotation at least part of the W images (Img(3,1) . . . Img(3,W)) of the third set (Img(3,*i*), i=1 . . . W) of W images (Img(3,1) . . . Img(3,W)).

According to another non-limiting aspect, the third reconstructed image (Img(C3)) is obtained from a combination in rotation of the W images of the third set (Img(3,*i*), i=1 . . . W) of W images (Img(3,1) . . . Img(3,W)) on a round angle.

According to another non-limiting aspect, the step of generation of the at least a first reconstructed image (Img (C1) comprises a transformation, preferably a rolling up, of the intermediate image with transformation from a polar reference system to a Cartesian reference system, preferably a rolling up of the intermediate image around a rotation point arranged in a predefined portion of the intermediate image, in particular at the center of the intermediate image itself and corresponding to an end point or to an intermediate point, optionally a midpoint, of one of the N images of the first set (Img(1,*i*), i=1 . . . N) of N images (Img(1,1) . . . Img(1,N)), optionally wherein said end point is an end point along the direction of maximum extension of one of said N images of the first set of N images.

According to another non-limiting aspect, the step of generation of the at least a first reconstructed image (Img (C1)) comprises:

a subdivision of the intermediate image in a first sub-image and in a second sub-image taking place along a juxtaposition axis (B) of images detected in the intermediate image;

one transformation, preferably a rolling up, of at least one between said first sub-image and said second sub-image with transformation from a polar reference system to a Cartesian reference system, preferably one transformation, preferably a rolling up, of at least one between said first sub-image and said second sub-image around a rotation point arranged on a side of said first sub-image and/or of said second sub-image, said side being parallel to the juxtaposition axis (B), optionally corresponding to a substantially central point of the N images of the first set (Img(1,*i*), i=1 . . . N) of N images (Img(1,1) . . . Img(1,N)).

According to another non-limiting aspect, the subdivision comprises a step of preventive calibration comprising an electronic detection of a number (Δpix) of pixel which differentiate half of the intermediate image along an axis (A) substantially orthogonal to said juxtaposition axis (B).

According to another non-limiting aspect, said first sub-image and said second sub-image present an extension along said axis (A) substantially orthogonal to said juxtaposition axis (B) equal to half of the extension of the intermediate image along said axis (A) substantially orthogonal to said juxtaposition axis (B), compensated by said number (Δpix) of pixel.

According to another non-limiting aspect, the step of generation of the at least a second reconstructed image (Img(C2)) comprises one transformation, preferably a rolling up, of the second image around a rotation point arranged on a predefined portion of the intermediate image, in particular at the center of the intermediate image itself and/or at the center of the support (3) and/or in correspondence of a substantially central portion of the biological sample of said support (3) or to an end point side or portion of a first sub-image of said intermediate image, and corresponding to an end point or to an intermediate point, optionally a midpoint, of one of the M images of the second set (Img(2,*i*), i=1 . . . M) of M images (Img(2,1) . . . Img(2,M), optionally wherein said end point is an end point along the direction of maximum extension of one of said M images of the second set of M images.

According to another non-limiting aspect, the step of generation of the at least a second reconstructed image (Img(C2)) comprises:

- a subdivision of the intermediate image in a first sub-image and in a second sub-image taking place along a juxtaposition axis (B) of images detected in the intermediate image;
- one transformation, preferably a rolling up, of at least one between said first sub-image and said second sub-image with transformation from a polar reference system to a Cartesian reference system, preferably one transformation, preferably a rolling up, of at least one between said first sub-image and said second sub-image around a rotation point arranged on a side of said first sub-image and/or of said second sub-image, said side being parallel to the juxtaposition axis (B), optionally corresponding to a substantially central point of the M images of the second set (Img(1,*i*), i=1 . . . M) of M images (Img(1,1) . . . Img(1,M)).

According to another non-limiting aspect, the step of generation of the at least a third reconstructed image (Img (C3)) comprises one transformation, preferably a rolling up, of the third image around a rotation point arranged on a predefined portion of the intermediate image, in particular at the center of the intermediate image itself and/or at the center of the support (3) and/or in correspondence of a substantially central portion of the biological sample of said support (3) or with an end side or portion of a first sub-image of said intermediate image, and corresponding to an end point or to an intermediate point, optionally a half point, of one of the W images of the third set (Img(3,*i*), i=1 . . . W) of W images (Img(3,1) . . . Img(3,W)), optionally wherein said end point is an end point along the direction of maximum extension of one of said W images of the third set of W images.

According to another non-limiting aspect, the step of generation of the at least a third reconstructed image (Img (C3) comprises:

- a subdivision of the intermediate image in a first sub-image and in a second sub-image taking place along a juxtaposition axis (B) of images detected in the intermediate image;
- one transformation, preferably a rolling up, of at least one between said first sub-image and said second sub-image with transformation from a polar reference system to a Cartesian reference system, preferably one transformation, preferably a rolling up, of at least one between said first sub-image and said second sub-image around a rotation point arranged on a side of said first sub-image and/or of said second sub-image, said side being parallel to the juxtaposition axis (B), optionally corresponding to a substantially central point of the W images of the second set (Img(3,*i*), i=1 . . . W) of W images (Img(3,1) . . . Img(3,W).

According to another non-limiting aspect, the method comprises a step of synchronization of the rotation of the supporting element (2, 2*a*, 2*b*) with at least the first camera (6), wherein in the step of generation of the first set (Img(1,*i*), i=1 . . . N) of N images (Img(1,1) . . . Img(1,N)), each image of the first set of N images is generated in correspondence of a respective predefined rotation angle of the supporting element (2, 2*a*, 2*b*) and/or of the support (3) with respect to a reference position, in particular a reference azimuthal angular position.

According to another non-limiting aspect, the method comprises a step of synchronization of the rotation of the supporting element (2, 2*a*, 2*b*) with at least one between the second camera (7) and the third camera (8), wherein in the step of generation of the second set (Img(2,*i*), i=1 . . . M) of M images (Img(2,1) . . . Img(2,M) and/or of the third set (Img(3,*i*), i=1 . . . W) of W images (Img(3,1) . . . Img(3,W), each image respectively of the second set of M images and/or of the third set of W images is generated in correspondence of a respective predefined rotation angle of the supporting element (2, 2*a*, 2*b*) and/or of the support (3) with respect to a reference position, in particular a reference azimuthal angular position.

According to another non-limiting aspect, the method comprises a step of movement of at least a support (3) for biological samples by means of a motion device (15, 5), the step of movement comprising a movement of the at least a support (3), optionally at least in lifting, between a pick-up position (Pp), optionally in correspondence of a magazine (11) for supports (3), and an observation position (P2) on the supporting element (2, 2*a*, 2*b*).

According to another non-limiting aspect, the method comprises a step of actuation of a centering device of the motion device (15, 5), said step of actuation of the centering device determining a retaining of the support (3) in said observation position (Po) on the supporting element (2, 2*a*, 2*b*) and/or determining a movement of the support (3) on the supporting element (2, 2*a*, 2*b*) in order to determine the achievement of the observation position (Po) by the support (3).

According to another non-limiting aspect, the step of actuation of the centering device comprises the actuation of at least a pusher (5) movable between at least a first and a second position, optionally wherein the first position is a backward position, and the second position is a forward position, optionally wherein said first position is a position in use spaced with respect to said support (3) and/or wherein said second position is a position in use substantially in contact with said support (3).

According to another non-limiting aspect, the step of actuation of the centering device comprises the actuation of a first pair of pushers (5) reciprocally opposite with respect to the observation position and movable preferably along a first direction itself, respectively according to a first and a second way opposite to each other.

According to another non-limiting aspect, the step of actuation of the centering device comprises a step of movement of the at least a pusher (5) between a first releasing configuration wherein said at least a pusher (5), optionally the at least a first pair of pushers (5) and/or the second pair of pushers (5), is spaced with respect to the support (3) and a second retaining configuration wherein the at least a pusher (5), optionally the first pair of pushers (5) and/or the second pair of pushers touches the support (3) and retains the support (3) in said observation position (Po).

According to another non-limiting aspect, the supporting element (2, 2*a*, 2*b*) is substantially discoidal shaped.

According to another non-limiting aspect, the rotation axis (Y) is substantially vertical and/or the supporting element (2, 2*a*, 2*b*) is configured for rotating on a substantially horizontal plane.

According to another non-limiting aspect, the step of activation of the actuator determines a rotation of the supporting element (2, 2*a*, 2*b*) around a rotation axis (Y) substantially vertical and/or on a substantially horizontal plane.

According to another non-limiting aspect, said third camera (8) is a matrix camera.

According to another non-limiting aspect, the synchronization device is configured such that the rotation of the supporting element (2, 2*a*, 2*b*) between two images of the first set (Img(1,*i*), i=1 . . . N) of N images (Img(1,1) . . . Img(1,N) corresponds to a first and same angular value, in particular a first angular value constant for all the images of the first set (Img(1,*i*), i=1 . . . N) of N images (Img(1,1) . . . Img(1,N)).

According to another non-limiting aspect, the synchronization device is configured such that the rotation of the supporting element (2, 2*a*, 2*b*) between two images of the second set (Img(2,*i*), i=1 . . . M) of M images (Img(2,1) . . . Img(2,M)) corresponds to a second and same angular value, in particular a second angular value constant for all the images of the second set (Img(2,*i*), i=1 . . . M) of M images (Img(2,1) . . . Img(2,M).

According to another non-limiting aspect, the synchronization device is configured such that the rotation of the supporting element (2, 2*a*, 2*b*) between two images of the third set (Img(3,*i*), i=1 . . . W) of W images (Img(3,1) . . . Img(3,W)) corresponds to a third and same angular value, in particular a third angular value constant for all the images of the third set (Img(3,*i*), i=1 . . . W) of W images (Img(3,1) . . . Img(3,W)).

According to another non-limiting aspect, the first and the second angular value, or the second and the third angular value, or the third and the first angular value, or the first, the second and the third angular value, are equal.

According to another non-limiting aspect, at least a pair of angular values between the first angular value, the second angular value and the third angular value comprises different angular values.

According to another non-limiting aspect, the first pair of pushers (5) comprises two pushers which move on a same plane.

According to another non-limiting aspect, the second pair of pushers (5) comprises two pushers which move on a same plane.

According to the present disclosure it is described a device (1) for observing and for acquiring images of biological samples comprising:

- a supporting element (2, 2*a*, 2*b*) configured for housing a support (3) for biological samples;
- at least a first camera (6) oriented toward the supporting element (2, 2*a*, 2*b*) and configured for framing at least a portion of the supporting element (2, 2*a*, 2*b*) and/or, in use, at least a predefined portion of the support (3) when housed on the supporting element (2, 2*a*, 2*b*), from a first observation point (P1) and at least along a first inclined main direction of observation, wherein said predefined portion of the support (3) comprises, in use, a biological sample;
- at least a first optical radiation source (10) configured for irradiating at least said predefined portion of the support (3) from a first irradiation direction, in such a way that, in use, at least a predefined portion of the biological sample is irradiated through the optical radiation of the first optical radiation source (10);
- an actuator, in particular a motor, configured for moving the supporting element (2, 2*a*, 2*b*) and the support (3) therein housed with respect to at least the first camera (6) and/or for moving the first camera with respect to the supporting element (2, 2*a*, 2*b*) and to the support (3) when therein housed;
- the device (1) being configured for activating at least the first camera (6) and the actuator for generating, preferably during the movement of the supporting element (2, 2*a*, 2*b*) and of the support (3) and/or of the first camera (6) by the actuator, at least a first main image and at least a first auxiliary image relative to a same first predefined portion of said support (3) or of said biological sample, said first main image being acquired at least by said first camera (6) along said first main direction of observation and said first auxiliary image being acquired by an auxiliary direction of observation coplanar to said first direction of observation and arranged symmetrically with respect to a vertical axis perpendicular to a horizontal plane of said supporting element (2, 2*a*, 2*b*) and/or of said support (3) for biological samples.

According to another non-limiting aspect, the device (1) comprises an actuator, in particular a motor, configured for moving the first optical radiation source (10), optionally in synchrony with said first camera (6) and/or with said support (2, 2*a*, 2*b*).

According to another non-limiting aspect, the first main direction of observation is inclined with respect to a zenithal plane of said supporting element (2, 2*a*, 2*b*) and is inclined with respect to an azimuthal plane of said supporting element (2, 2*a*, 2*b*) and/or is inclined with respect to a plane on which lies said supporting element (2, 2*a*, 2*b*) and is inclined with respect to a plane orthogonal with respect to the plane upon which lies said supporting element (2, 2*a*, 2*b*).

According to another non-limiting aspect, the device is configured for generating the first auxiliary image in a time instant different from a time instant wherein the first main image is generated.

According to another non-limiting aspect:

- the device (1) is configured for generating the first main image and the first auxiliary image through the first camera (6), and the first auxiliary image is generated after a movement of the first camera (6) or of the support (3) such as to make said first camera (6) assume said auxiliary direction of observation with respect to the support (3); or
- the device (1) comprises a second camera (7) oriented toward the supporting element (2, 2*a*, 2*b*) and configured for framing at least said portion of the supporting element (2, 2*a*, 2*b*) and/or, in use, at least said predefined portion of the support (3) when housed on the supporting element (2, 2*a*, 2*b*), from a second observation point (P2) and at least along said inclined auxiliary direction of observation, and the device (1) is configured for generating the first main image through the first camera (6) and the first auxiliary image through the second camera (7), preferably wherein the first main image and the first auxiliary image are generated in a substantially same time instant.

According to another non-limiting aspect, the actuator is configured for rotating the supporting element (2, 2*a*, 2*b*) and the support (3) when therein housed, around a rotation axis (Y) preferably centered on said supporting element (2, 2*a*, 2*b*) and/or on said support (3), and wherein the device (1) is configured for activating the first camera (6) and the actuator, for generating said at least a first main image, during the rotation of the supporting element (2, 2*a*, 2*b*) and of the support (3) by the actuator, or the actuator is configured for translating the supporting element (2, 2*a*, 2*b*) and of the support (3) when housed therein, along a direction of movement, and wherein the device (1) is configured for activating the first camera (6) and the actuator, in order to generate said at least one first main image, during the translation of the supporting element (2, 2*a*, 2*b*) and of the support (3) by the actuator.

According to another non-limiting aspect, the device is configured for activating the first camera (6) and the actuator, for generating, preferably during the movement of the supporting element (2, 2*a*, 2*b*) and of the support (3) by the actuator, at least the first image related to a first predefined portion of said support (3) and at least a second image related to a second predefined portion of said support (3), wherein said first predefined portion and said second predefined portion of said support (3) are reciprocally counterposed and symmetrical with respect to an axis of symmetry or to a plane of symmetry of the support (3).

According to another non-limiting aspect, said first portion and said second portion of said support (3) are symmetrical with respect to the center of the support (3) and/or are substantially linear portions, reciprocally aligned and preferably substantially corresponding each to a radius of the support (3), in such a way that the union of said first and said second portion of said support (3) substantially constitutes a diameter of the support (3).

According to another non-limiting aspect, the device (1) is configured for generating:

- at least a first plurality or first set (Img(1,*i*), i=1 . . . N) of N images (Img(1,1) . . . Img(1,N) of N predefined portions of the support (3), wherein each image of the first plurality or first set (Img(1,*i*), i=1 . . . N) of N images (Img(1,1) . . . Img(1,N)) is acquired in correspondence of at least a predetermined detection angular position, optionally fixed, and of a respective and rotation angle thereof of the supporting element (2, 2*a*, 2*b*) and of the support (3) with respect to a starting angular position;
- at least a second plurality or second set (Img(2,*i*), i=1 . . . M) of M images (Img(2,1) . . . Img(2,M)) of M predefined portions of the support (3), wherein each image of the second plurality or second set (Img(2,*i*), i=1 . . . M) of M images (Img(2,1) . . . Img(2,M)) is acquired in correspondence of at least a predetermined detection angular position, optionally fixed, and of a respective and own rotation angle of the supporting element (2, 2*a*, 2*b*) and of the support (3) with respect to a starting angular position.

According to another non-limiting aspect, at least an image of the first plurality or first set of N images constitutes said main image.

According to another non-limiting aspect, at least an image of the second plurality or second set of M images constitutes said auxiliary image.

According to another non-limiting aspect, each image of the first set (Img(1,*i*), i=1 . . . N) of N images (Img(1,1) . . . Img(1,N)) is related to said first predefined portion of said support (3) and each image of the second set (Img(2,*i*), i=1 . . . M) of M images (Img(2,1) . . . Img(2,M)) is related to said second predefined portion of said support (3).

According to another non-limiting aspect, said first and said second portion are opposite each other, aligned and juxtaposed and/or comprise a center of the support (3).

According to another non-limiting aspect, said rotation axis (Y) is substantially vertical.

According to another non-limiting aspect, said at least a first camera (6) is configured for framing the supporting element (2, 2*a*, 2*b*) and/or, in use, said predefined portion of the support (3) when on the supporting element (2, 2*a*, 2*b*), with at least a predefined first angle of framing (a) with respect to a plane on which lies the supporting element (2, 2*a*, 2*b*).

According to another non-limiting aspect, said at least a predefined first angle of framing (a) is kept fixed at least during the acquisition of the at least a first image and/or is comprised in the range [10°-80°], preferably in the range [20°-70°].

According to another non-limiting aspect, the device (1) is configured for generating at least a first intermediate image obtained by juxtaposing at least part of the N images (Img(1,1) . . . Img(1,N) of the first set (Img(1,*i*), i=1 . . . N) of N images (Img(1,1) . . . Img(1,N)).

According to another non-limiting aspect, the at least a first camera (6) is a linear camera, optionally a trilinear camera, wherein the first set (Img(1,*i*), i=1 . . . N) of N images (Img(1,1) . . . Img(1,N)) comprises N linear images, and wherein the intermediate image is obtained by juxtaposing at least part of the N images (Img(1,1) . . . Img(1,N) of the first set (Img(1,*i*), i=1 . . . N) of N images (Img(1,1) . . . Img(1,N) along a direction substantially orthogonal with respect to a direction of maximum extension of each of the N linear images.

According to another non-limiting aspect, the device is configured for generating at least a second intermediate image obtained by juxtaposing at least part of the M images (Img(2,1) . . . Img(2,M) of the second set (Img(2,*i*), i=1 . . . M) of M images (Img(2,1) . . . Img(2,M).

According to another non-limiting aspect, the second set (Img(2,*i*), i=1 . . . M) of M images (Img(2,1) . . . Img(2,M) comprises M linear images.

According to another non-limiting aspect, the second intermediate image is obtained by juxtaposing at least part of the M (Img(2,1) . . . Img(2,M), of the second set (Img(2,*i*), i=1 . . . M) of M images (Img(2,1) . . . Img(2,M)) along a direction substantially orthogonal with respect to a direction of maximum extension of each of the M linear images.

According to another non-limiting aspect, the device (1) is configured for generating at least a first reconstructed image (Img(C1)), said first reconstructed image (Img(C1)) being obtained, in use, by combining in rotation at least part of the N images (Img(1, 1) . . . Img(1, N)) of the at least a first set (Img(1,*i*), i=1 . . . N) of N images (Img(1,1) . . . Img(1,N).

According to another non-limiting aspect, the reconstructed image (Img(C1)) is obtained from a combination in rotation of the N images on a round angle.

According to another non-limiting aspect, the first reconstructed image (Img(C1) is obtained transforming, preferably by rolling up, the first intermediate image around a rotation point arranged in a predefined portion of the intermediate image, in particular at the center of the intermediate image itself and/or at the center of the support (3) and/or in correspondence of a substantially central portion of the biological sample of said support (3) and corresponding to an end point or to an intermediate point, optionally a half point, of one of the N images of the first set (Img(1,*i*), i=1 . . . N) of N images (Img(1,1) . . . Img(1,N)), optionally wherein said end point is an end point along the direction of maximum extension of one of said N images of the first set of N images.

According to another non-limiting aspect, the first reconstructed image (Img(C1)) is obtained:

- by carrying out an electronic subdivision of the intermediate image in a first sub-image and in a second sub-image taking place along a juxtaposition axis (B) of images detected in the intermediate image;
- by transforming, preferably by rolling up, electronically at least one between said first sub-image and said second sub-image with transformation from a polar reference system to a Cartesian reference system, in particular by transforming, preferably by rolling up, at least one between said first sub-image and said second sub-image around a rotation point arranged on a side of said first sub-image and/or of said second sub-image, said side being parallel to the juxtaposition axis (B), optionally corresponding to a substantially central point of the N images of the first set (Img(1,*i*), i=1 . . . N) of N images (Img(1,1) . . . Img(1,N)).

According to another non-limiting aspect, the second reconstructed image (Img(C2)) is obtained by transforming, preferably by rolling up, the second intermediate image around a rotation point arranged on a predefined portion of the intermediate image, in particular at the center of the intermediate image itself and/or at the center of the support (3) and/or in correspondence of a substantially central portion of the biological sample of said support (3) and corresponding to an end point or to an intermediate point, optionally a midpoint, of one of the M images of the second set (Img(2,*i*), i=1 . . . M) of M images (Img(2,1) . . . Img(2,M), optionally wherein said end point is an end point along the direction of maximum extension of one of said M images of the second set of M images.

According to another non-limiting aspect, the first reconstructed image (Img(C1)) is obtained:

by carrying out an electronic subdivision of the intermediate image in a first sub-image and in a second sub-image taking place along a juxtaposition axis (B) of images detected in the intermediate image;

by transforming, preferably by rolling up, electronically at least one between said first sub-image and said second sub-image with transformation from a polar reference system to a Cartesian reference system, in particular by transforming, preferably by rolling up, at least one between said first sub-image and said second sub-image around a rotation point arranged on a side of said first sub-image and/or of said second sub-image, said side being parallel to the juxtaposition axis (B), optionally corresponding to a substantially central point of the N images of the first set (Img(1,*i*), i=1 . . . N) of N images (Img(1,1) . . . Img(1,N).

According to another non-limiting aspect, the third reconstructed image (Img(C3) is obtained by transforming, preferably by rolling up, the third intermediate image around a rotation point arranged on a predefined portion of the intermediate image, in particular at the center of the intermediate image itself and/or at the center of the support (3) and/or in correspondence of a substantially central portion of the biological sample of said support (3) and corresponding to an end point or to an intermediate point, optionally a midpoint, of one of the W images of the third set (Img(3,*i*), i=1 . . . W) of W images (Img(3,1) . . . Img(3,W), optionally wherein said end point is an end point along the direction of maximum extension of one of said W images of the third set of W images.

According to another non-limiting aspect, the third reconstructed image (Img(C3) is obtained:

by carrying out an electronic subdivision of the intermediate image in a first sub-image and in a second sub-image taking place along a juxtaposition axis (B) of images detected in the intermediate image;

by transforming, preferably by rolling up, electronically at least one between said first sub-image and said second sub-image with transformation from a polar reference system to a Cartesian reference system, in particular by transforming, preferably by rolling up, at least one between said first sub-image and said second sub-image around a rotation point arranged on a side of said first sub-image and/or of said second sub-image, said side being parallel to the juxtaposition axis (B), optionally corresponding to a substantially central point of the W images of the third set (Img(3,*i*), i=1 . . . W) of W images (Img(3,1) . . . Img(3,W).

According to another non-limiting aspect, the electronic subdivision comprises a preventive calibration comprising an electronic detection of a number (Δpix) of pixel which differentiate half of the intermediate image along an axis (A) substantially orthogonal to said juxtaposition axis (B).

According to another non-limiting aspect, the device is configured for carrying out a differential analysis between two distinct images of said biological sample, preferably between two distinct images of said biological sample acquired by means of a single camera selected among said first camera (6), said second camera (7) or said third camera (8), and/or between said at least a first intermediate image and a further intermediate image and/or between said at least a first reconstructed image (Img(C1)) and a further reconstructed image, said differential analysis being an electronic analysis and generating an electronic data indicative of a presence and/or development and/or growth and/or numerosity of one or more bacterial and/or viral colonies.

According to another non-limiting aspect, said differential analysis comprises differential electronic processing of the two distinct images of said biological sample, preferably of the two distinct images of said biological sample acquired by means of a single camera selected among said first camera (6), said second camera (7) or said third camera (8), and/or of the first intermediate image and of the further intermediate image and/or of the at least a first reconstructed image (Img(C1) and of the further reconstructed image by means of a neural network, preferably of a feed-forward or u-net type, preferably by means of a convolutional type neural network.

According to the present disclosure is further described a method for observing and for acquiring images of biological samples comprising:

a step of observation of a support (3) for a biological sample, wherein the support (3) is positioned on a supporting element (2, 2*a*, 2*b*) configured for housing a support (3), wherein, in the step of observation, at least a first camera (6) frames at least a portion of the supporting element (2, 2*a*, 2*b*) and/or, in use, at least a predefined portion of the support (3) from a first observation point (P1) and at least along a first inclined main direction of observation;

a step of irradiation of the support (3), wherein at least a first optical radiation source (10) is activated and irradiates at least said predefined portion of the support (3) from a first irradiation direction, in such a way that, in use, at least a portion of the biological sample is irradiated through the optical radiation of the first optical radiation source (10);

a step of activation of at least an actuator, in particular a motor, connected to the supporting element (2, 2*a*, 2*b*), said step of activation determining a movement of the supporting element (2, 2*a*, 2*b*), and of the support (3) when therein housed, with respect to the at least a first camera (6) and/or determining a movement of the at least a first camera (6) with respect to the supporting element (2, 2*a*, 2*b*) and to the support (3) when therein housed;

a step of generation of images, taking place after of the activation of the at least a first camera (6) and of the actuator, and preferably during the movement of the supporting element (2, 2*a*, 2*b*) and of the support (3) when therein housed and/or of the first camera (6), comprising the generation of at least a first main image and at least a first auxiliary image relative to a same first predefined portion of said support (3) or of said biological sample, said first main image being acquired at least da said first camera (6) along said first main direction of observation and said first auxiliary image being acquired by an auxiliary direction of observation coplanar to said first direction of observation and arranged symmetrically with respect to a vertical axis perpendicular to a horizontal plane of said supporting element (2, 2*a*, 2*b*) and/or of said support (3) for biological samples.

According to another non-limiting aspect, the method comprises a step of activation of at least an actuator, in particular a motor, connected to the first optical radiation source (10), said step of activation determining a movement of the first optical radiation source (10), optionally in synchrony with said first camera (6) and/or with said support (2, 2*a*, 2*b*).

According to another non-limiting aspect, in the step of generation of images, the first auxiliary image is generated in a time instant different from a time instant wherein the first main image is generated, and/or:

in the step of generation of images the first main image and the first auxiliary image are generated through the first camera (6), and the movement of the first camera (6) or of the support (3) is such that the first auxiliary image is generated by making said first camera (6) assume said auxiliary direction of observation with respect to the support (3); or in the step of observation, at least a second camera (7) frames at least a portion of the supporting element (2, 2*a*, 2*b*) and/or, in use, at least a predefined portion of the support (3) from a second observation point (P2) and at least along said inclined auxiliary direction of observation, and wherein, in the step of generation of images, the first main image is generated by the first camera (6) and the first auxiliary image is generated through the second camera (7).

According to another non-limiting aspect, the first main image and the first auxiliary image are generated in a substantially same time instant.

According to another non-limiting aspect, the step of activation of the at least an actuator determines rotating the supporting element (2, 2*a*, 2*b*) and the support (3) when therein housed, around a rotation axis (Y) preferably centered on said supporting element (2, 2*a*, 2*b*) and/or on said support (3), and wherein the step of activation of the at least an actuator, the step of activation of the at least a first camera occur at least partially together with the step of generation of images in such a way that said at least a first main image is generated during the rotation of the supporting element (2, 2*a*, 2*b*) and of the support (3) by the actuator, or the step of activation of the at least an actuator determines a translation the supporting element (2, 2*a*, 2*b*) and the support (3) when therein housed, along a direction of movement, and wherein the step of activation of the at least an actuator, the step of activation of the at least a first camera occur at least partially together with the step of generation of images in such a way that said at least a first main image is generated during the translation of the supporting element (2, 2*a*, 2*b*) and of the support (3) by the actuator.

According to another non-limiting aspect, the step of generation of images, preferably during the step of activation of the at least an actuator comprises the generation of the at least the first image related to a first predefined portion of said support (3) and a generation of at least a second image related to a second predefined portion of said support (3), wherein said first predefined portion and said second predefined portion of said support (3) are reciprocally opposed and symmetrical with respect to an axis of symmetry or a plane of symmetry of the support (3).

According to another non-limiting aspect, said first portion and said second portion of said support (3) are symmetrical with respect to the center of said support (3) and/or are substantially linear portions, reciprocally aligned and preferably substantially corresponding each to a radius of the support (3), in such a way that the union of said first and said second portions of said support (3) substantially constitutes a diameter of the support (3).

According to another non-limiting aspect, the step of generation of images comprises a step of generation, after the activation of the at least a first camera (6) and of the actuator, of at least a first plurality or first set (Img(1,*i*), i=1 . . . N) of N images (Img(1,1) . . . Img(1,N)) of N predefined portions of the support (3), wherein each image of the first plurality or first set (Img(1,*i*), i=1 . . . N) of N images (Img(1,1) . . . Img(1,N) is acquired in correspondence of at least a predetermined detection angular position, optionally fixed, and of a respective and rotation angle thereof of the supporting element (2, 2*a*, 2*b*) and of the support (3) with respect to a starting angular position.

According to another non-limiting aspect, the method comprises a step of generation, after the activation of the at least a first camera (6) and of the actuator, of at least a second plurality or second set (Img(2,*i*), i=1 . . . M) of M images (Img(2,1) . . . Img(2,M) of M predefined portions of the support (3), wherein each image of the second plurality or second set (Img(2,*i*), i=1 . . . M) of M images (Img(2,1) . . . Img(2,M)) is acquired in correspondence of at least a predetermined detection angular position, optionally fixed, and of a respective and rotation angle thereof of the supporting element (2, 2*a*, 2*b*) and of the support (3) with respect to a starting angular position.

According to another non-limiting aspect, each image of the set (Img(1,*i*), i=1 . . . N) of N images (Img(1,1) . . . Img(1,N)) is related to a first portion of said support (3) and each image of the second set (Img(2,*i*), i=1 . . . M) of M images (Img(2,1) . . . Img(2,M) is related to a second portion of said support (3), and said first and said second portion are opposite each other, aligned and juxtaposed and/or comprise a center of the support (3).

According to another non-limiting aspect, in the step of observation, the at least a first camera (6) frames said supporting element (2, 2*a*, 2*b*) and/or, in use, said predefined portion of the support (3) with a predefined first angle of framing (α) with respect to a plane on which lies the supporting element (2, 2*a*, 2*b*).

According to another non-limiting aspect, said first angle of framing (α) is kept fixed at least during the acquisition of the at least a first image and/or is comprised in the range [10°-80°], preferably in the range [20°-70°].

According to another non-limiting aspect, the method comprises a step of generation of at least a first intermediate image comprising a juxtaposition of at least part of the N images (Img(1,1) . . . Img(1,N)) of the first set (Img(1,*i*), i=1 . . . N) of N images (Img(1,1) . . . Img(1,N)).

According to another non-limiting aspect, the at least a first camera (6) is a linear camera, optionally a trilinear camera, wherein the first set (Img(1,*i*), i=1 . . . N) of N images (Img(1,1) . . . Img(1,N) comprises N linear images, and wherein the step of generation of the intermediate image comprises a juxtaposition of at least part of the N images (Img(1,1) . . . Img(1,N) of the first set (Img(1,*i*), i=1 . . . N) of N images (Img(1,1) . . . Img(1,N) along a direction substantially orthogonal with respect to a direction of maximum extension of each of the N linear images.

According to another non-limiting aspect, the method comprises a step of generation of a second intermediate image comprising a juxtaposition of at least part of the M images (Img(2,1) . . . Img(2,M)) of the second set (Img(2,*i*), i=1 . . . M) of M images (Img(2,1) . . . Img(2,M).

According to another non-limiting aspect, the second set (Img(2,*i*), i=1 . . . M) of M images (Img(2,1) . . . Img(2,M)) comprises M linear images.

According to another non-limiting aspect, the step of generation of the second intermediate image comprises a juxtaposition of at least part of the M images (Img(2,1) . . . Img(2,M), of the second set (Img(2,*i*), i=1 . . . M) of M images (Img(2,1) . . . Img(2,M)) along a direction substantially orthogonal with respect to a direction of maximum extension of each of the M linear images.

According to another non-limiting aspect, the method comprises a step of generation of at least a first reconstructed image (Img(C1), obtained combining in rotation at least part of the N images (Img(1,1) . . . Img(1,N)) of the at least a first set (Img(1,*i*), i=1 . . . N) of N images (Img(1,1) . . . Img(1,N).

According to another non-limiting aspect, in particular the first reconstructed image (Img(C1) is obtained from a combination in rotation of the N images of the first set (Img(1,*i*), i=1 . . . N) of N images (Img(1,1) . . . Img(1,N)) on a round angle.

According to another non-limiting aspect, the step of generation of the at least a first reconstructed image (Img (C1)) comprises a transformation, preferably a rolling up, of the intermediate image with transformation from a polar reference system to a Cartesian reference system, in particular one transformation, preferably a rolling up, of the intermediate image around a rotation point arranged on a predefined portion of the intermediate image, in in particular at the center of the intermediate image itself and/or at the center of the support (3) and/or in correspondence of a substantially central portion of the biological sample of said support (3) or at an end or side portion of a first sub-image of said intermediate image, and corresponding to an end point or to an intermediate point, optionally a midpoint, of one of the N images of the first set (Img(1,*i*), i=1 . . . N) of N images (Img(1,1) . . . Img(1,N)), optionally wherein said end point is an end point along the direction of maximum extension of one of said N images of the first set of N images.

According to another non-limiting aspect, the method comprises a step of carrying out of a differential analysis between two distinct images of said biological sample, preferably between two distinct images of said biological sample acquired by means of a single camera selected among said first camera (6), said second camera (7) or said third camera (8), and/or between said at least a first intermediate image and a further intermediate image and/or between said at least a first reconstructed image (Img(C1)) and a further reconstructed image, said differential analysis being an electronic analysis.

According to another non-limiting aspect, the method comprises a step of generation of an electronic data indicative of a presence and/or development and/or growth and/or numerosity of one or more bacterial and/or viral colonies.

According to another non-limiting aspect, said differential analysis comprises a differential electronic processing of the two distinct images of said biological sample, preferably of the two distinct images of said biological sample acquired by means of a single camera selected among said first camera (6), said second camera (7) or said third camera (8), and/or of the first intermediate image and of the further intermediate image and/or of the at least a first reconstructed image (Img(C1)) and of the further reconstructed image by means of a neural network, preferably of feed-forward or u-net type, in particular by means of a neural network of convolutional type.

According to the present disclosure it is further described a device (1) for observing and for acquiring images of biological samples comprising:

- a supporting element (2, 2*a*, 2*b*) configured for housing a support (3) for biological samples;
- at least a first camera (6) oriented toward the supporting element (2, 2*a*, 2*b*), wherein said first camera (6) is configured for framing at least a portion of the supporting element (2, 2*a*, 2*b*) and/or, in use, at least a predefined portion of the support (3) when housed on the supporting element (2, 2*a*, 2*b*), from a first observation point (P1);
- at least a first optical radiation source (10) configured for irradiating at least said predefined portion of the support (3) from a first irradiation direction, in such a way that, in use, at least a portion of the biological sample is irradiated through the optical radiation of the first optical radiation source (10);
- a focusing device, configured for causing, in use, a variation of a distance existing between said first camera (6) and the supporting element (2, 2*a*, 2*b*) and, when therein housed, the support (3), said variation of distance determining an optimization of the focusing of the biological sample contained in the support (3);
- the device (1) being configured for activating the first camera (6) for generating at least a first image of at least part of said portion of the biological sample and/or of said predefined portion of the support (3) through the first camera (6).

According to another non-limiting aspect, the device (1) comprises at least a second camera (7) oriented toward the supporting element (2, 2*a*, 2*b*).

According to another non-limiting aspect, said second camera (7) is configured for framing at least a portion of the supporting element (2, 2*a*, 2*b*) and/or, in use, at least said predefined portion of the support (3) when housed on the supporting element (2, 2*a*, 2*b*), from a second observation point (P2) different from the first observation point (P1), wherein the at least a predefined portion of the support (3) comprises, in use, a biological sample.

According to another non-limiting aspect, the device (1) is configured for activating the second camera (7) for generating at least a second image of at least part of said portion of the biological sample and/or of said predefined portion of the support (3) through the second camera (7).

According to another non-limiting aspect, the focusing device is configured for causing, in use, a variation of a distance existing between said second camera (7) and the supporting element (2, 2*a*, 2*b*) and, when therein housed, the support (3).

According to another non-limiting aspect, the focusing device is configured for causing, in use, a variation of a distance existing between said third camera (8) and the supporting element (2, 2*a*, 2*b*) and, when therein housed, the support (3).

According to another non-limiting aspect, the focusing device is configured for causing in use a movement, optionally one substantially linear translation, of the supporting element (2, 2*a*, 2*b*) and/or for causing, in use, a movement, optionally one substantially linear translation, of the at least a first camera (6) and/or of the at least a second camera (7) and/or of the at least a third camera (8).

According to another non-limiting aspect, the device (1) is configured for activating the focusing device before the generation of the at least a first image.

According to another non-limiting aspect, the device (1) is configured for activating the focusing device before the generation of the at least a second image and after the generation of the first image.

According to the present disclosure it is also described a method for observing and acquiring images of biological samples comprising:

- a step of observation of a support (3) containing a biological sample and housed on a supporting element (2, 2*a*, 2*b*), wherein, in the step of observation, a first camera (6) frames at least a predefined portion of the support (3) from a first observation point (P1);
- a step of irradiation of at least said predefined portion of the support (3), through a first optical radiation source (10), from a first irradiation direction, in such a way that, in use, at least a portion of the biological sample is irradiated through the optical radiation of the first optical radiation source (10);
- a step of generation, through the activation of the first camera (6) of at least a first image of at least part of said portion of the biological sample and/or of said predefined portion of the support (3), through the first camera (6),
- a step of activation of a focusing device, causing a variation of a distance existing between said first camera (6) and the supporting element (2, 2*a*, 2*b*) and, when therein housed, the support (3), said variation of the distance determining an optimization of the focusing of the biological sample contained in the support (3).

According to another non-limiting aspect, in the step of observation a second camera (7) frames at least said predefined portion of the support (3) from a second observation point (P2) different with respect to the first observation point (P1).

According to another non-limiting aspect, the method comprises a step of generation, through the activation of the second camera (7), of at least a second image of at least part of said portion of the biological sample and/or of said predefined portion of the support (3), through the second camera (7).

According to another non-limiting aspect, the step of activation of the focusing device causes a variation of a distance existing between said second camera (7) and the supporting element (2, 2*a*, 2*b*) and, when therein housed, the support (3).

According to another non-limiting aspect, the step of activation of the focusing device causes a variation of a distance existing between said third camera (8) and the supporting element (2, 2*a*, 2*b*) and, when therein housed, the support (3).

According to another non-limiting aspect, the step of activation of the focusing device determines a movement, optionally one substantially linear translation, of the supporting element (2, 2*a*, 2*b*) and/or determines a movement, optionally one substantially linear translation, of the at least a first camera (6) and/or of the at least a second camera (7).

According to another non-limiting aspect, the step of activation of the focusing device precedes at least the step of generation of the at least a first image.

According to another non-limiting aspect, the step of activation of the focusing device precedes at least the step of generation of the at least a second image and is carried out after the step of generation of the at least a first image.

According to another non-limiting aspect, at least one between the first observation point (P1), the second observation point (P2) and the third observation point (P3) is a fixed observation point, in particular a fixed observation point with respect to a frame of the device (1).

FIGURES

The object of the present disclosure will be now described in some of its preferred and non-limiting embodiments, referring to the attached figures. A short description of the figures is hereinafter provided.

FIGS. 1*a* and 1*b* show each one a sectional view of part of the device object of the present disclosure, wherein it is visible a plurality of cameras configured for framing at least a portion of a support for biological samples, in particular a portion of this support where it is visible said biological sample.

FIGS. 2*a* and 2*b* show each one a sectional view of part of the device object of the present disclosure, wherein it is represented a first combination of irradiation direction, in particular of lighting and of framing of said portion of the support.

FIGS. 3*a* and 3*b* show each one a sectional view of part of the device object of the present disclosure, wherein it is represented a second combination of irradiation direction, in particular of lighting and of framing of said portion of the support.

FIGS. 4*a* and 4*b* show each one a sectional view of part of the device object of the present disclosure, wherein it is represented a third combination of irradiation direction, in particular of lighting and of framing of said portion of the support.

FIGS. 5*a* and 5*b* show each one a sectional view of part of the device object of the present disclosure, wherein it is represented a fourth combination of irradiation direction, in particular of lighting and of framing of said portion of the support.

Figure 1A:
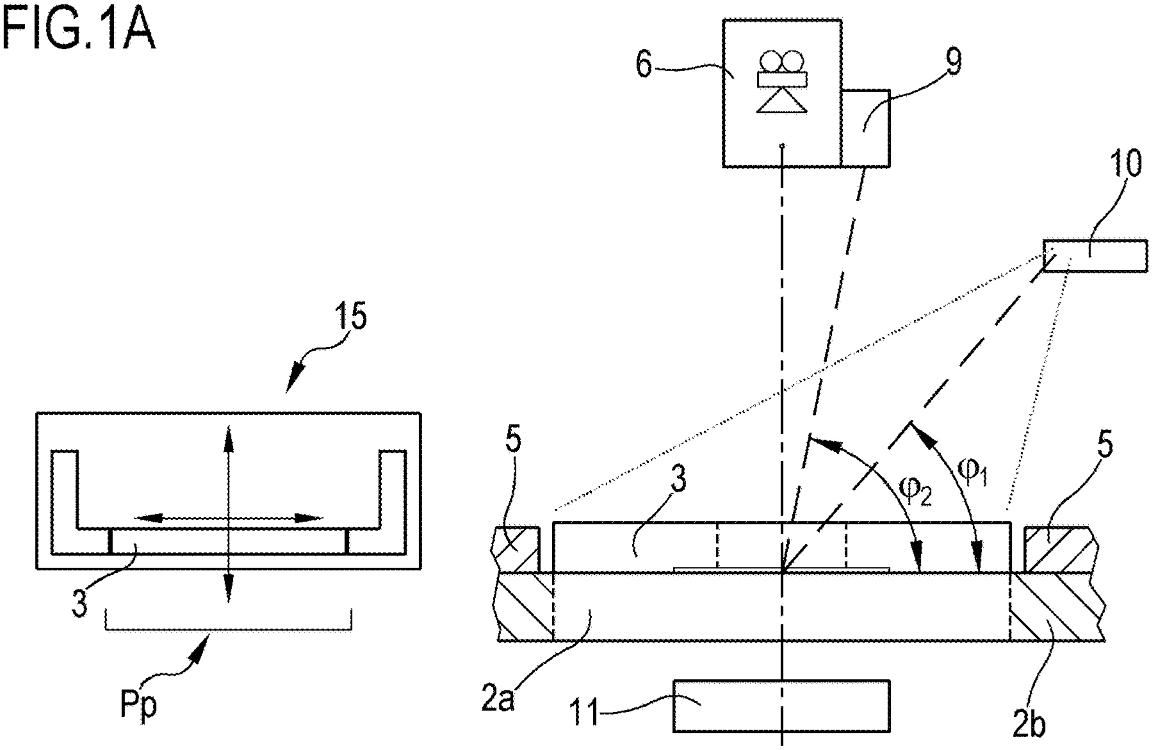
Figure 1B:
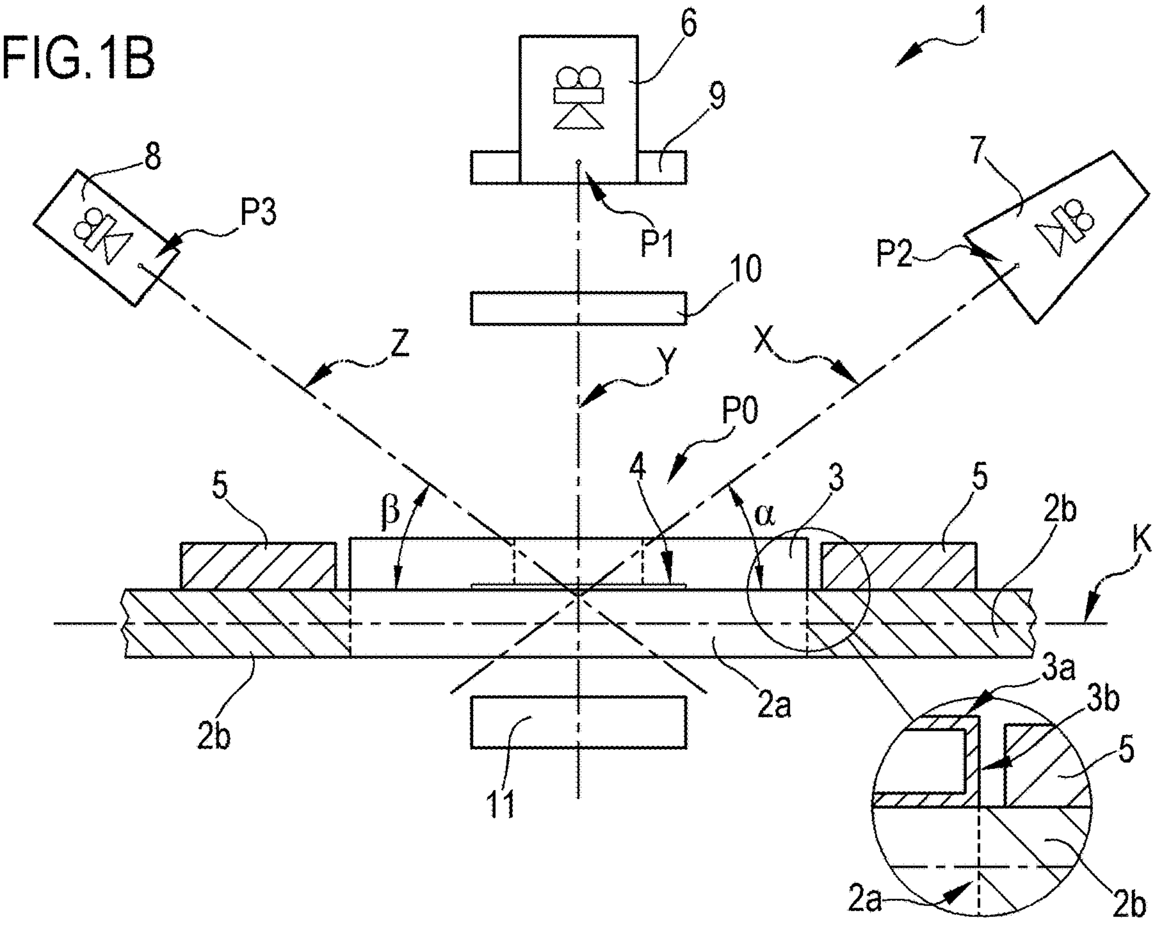

It is observed in particular that FIGS. 1*a* and 1*b*, and equivalently FIGS. 2*a* and 2*b*, 3*a* and 3*b*, 4*a* and 4*b*, 5*a* and 5*b*, represent sectional views along directions orthogonal to each other.

DETAILED DESCRIPTION

With reference number 1, it is indicated on the whole a device for observing and acquiring images of biological samples.

According to the present disclosure, for biological samples are intended samples containing any element of biological nature, non-limiting thereto secretions, organic fluids, one or more microorganism colonies, in particular fungi, preferably molds and yeasts, and/or viruses and/or bacteria colonies.

The following description will refer to particular configurations of use or steps of a method for observing biological samples. Where the description refers to a particular configuration of use, typically it will not be repeated the same description with specific reference to a step of a method, in order not to excessively increase the length of the following detailed description; in the same way, where the description refers to a step of a method, typically it will not be repeated the same description with specific reference to a configuration of use. It is then intended that determined steps can correspond to determined configurations of use and vice versa.

Supporting Element

The device for observing biological samples 1 comprises a supporting element 2, 2*a*, 2*b* that is destined and specifically configured for housing at least a support 3 for biological samples.

The supporting element 2, 2*a*, 2*b* is preferably provided with a substantially planar upper surface that, in use, lies on a substantially horizontal plane. The supporting element 2, 2*a*, 2*b* comprises a first portion 2*a* and a second portion 2*b*. The first portion 2*a* is an inner portion with respect to the second portion 2*b*, which is therefore an outer portion.

In a non-limiting embodiment, the supporting element 2, 2*a*, 2*b* assumes a substantially discoidal configuration, and has then a substantially circular transversal section; the first portion 2*a* is therefore a radially inner portion, whereas the second portion 2*b* is a radially outer portion.

In particular, in the attached figures it is represented a specific embodiment of the supporting element in a form of supporting plate. Where in the present description, it is made a generic reference to the supporting element 2, 2*a*, 2*b*, it shall be intended that what is described will be in particular valid for a supporting element in shape of a supporting plate.

In a non-limiting embodiment, the first portion 2*a* is optically transparent and is substantially hollow or provided with an appropriate transparent supporting element, for example a glass or a plastic material.

In an embodiment, the first portion 2*a* can be provided with an optical diffuser, configured for diffusing the optical radiation along a plurality of directions by reducing the power concentration of the optical radiation along a predefined direction or reduced angle of directions; preferably, this optical diffuser is translucent, or opaline. The optical diffuser can be realized with any material of known type, for example and non-limiting thereto, in glass or plastic material (for example, polycarbonate).

An axis Y departs from the supporting element 2 in a substantially orthogonal direction with respect to the latter.

The supporting element 2 is preferably conceived for rotating around a predetermined axis, and this axis is actually the axis Y. In some embodiments, however, this supporting element is configured and specifically destined for linearly translating along at least a direction. The translation along at least a direction takes place in operating association to the rotation or alternatively to the rotation.

In a preferred but non-limiting embodiment, the supporting element 2, 2*a*, 2*b* is realized at least partially in metallic material, for example aluminum.

It is observed that the upper surface comprises a first area being part of the first portion 2*a*, and a second area being part of the second portion 2*b*. Therefore, each one between the first and the second portion 2*a*, 2*b* shows an its own upper surface and these surfaces are substantially coplanar. Preferably, then, there are no steps between the first portion 2*a* and the second portion 2*b*.

According to the present disclosure are defined a first and a second side of the supporting element 2, 2*a*, 2*b*. In particular, the first side of the supporting element 2, 2*a*, 2*b* is the upper side whereas the second side is the lower side.

The device 1 object of the present disclosure comprises an actuator, in particular an actuator, in particular a motor, configured for moving, in particular for moving, the supporting element 2, 2*a*, 2*b*. In a non-limiting embodiment, the motor is an electric motor and in particular can be a step motor, controlled by the data processing unit of the device 1. The motor in use causes a movement, and in particular a rotation of the supporting element 2, 2*a*, 2*b* with direct or indirect transmission, for example through a toothed belt.

Said actuator can be in particular configured and specifically destined to allow a rotation always clockwise, or always counterclockwise or to allow a rotation alternatively clockwise and counterclockwise.

In a preferred but non-limiting embodiment, at least during the acquisition of the images, the device 1 object of the present disclosure is configured and specifically destined for activating the motor in such a way that a movement of the supporting element 2, 2*a*, 2*b* is carried out at constant speed. In particular, at least during the acquisition of the images, the device 1 object of the present disclosure is configured and specifically destined for activating the motor in such a way that the supporting element 2, 2*a*, 2*b* rotates with a constant angular speed. The Applicant observes that this is only one among the possible alternatives; in fact, in an alternative embodiment, it is provided a synchronization device (encoder) configured for synchronizing a movement between the supporting element 2, 2*a*, 2*b* and at least one among the cameras on board of the device 1.

Support for Biological Samples

In an embodiment, the support 3 for biological samples comprises a Petri dish.

As schematically shown in FIG. 1, in a non-limiting embodiment, the support 3 comprises a bottom portion, upon which in use is deposited a culture medium 4, at least a side wall 3*b*, which extends in substantially oblique direction with respect to the bottom portion, and a head portion 3*a*, which extends in substantially oblique direction with respect to the side wall 3*b*.

In an embodiment, the support 3 has a substantially circular section, and therefore the side wall 3*b* is unique and extends uninterruptedly; in FIG. 1, the side wall 3*b* is orthogonal with respect to the bottom portion of the support 3 and the head portion 3*a* lies on a plane substantially parallel to the plane upon which lies the bottom portion. The support 3 can for example and non-limiting thereto have a diameter substantially comprised between 30 mm and 170 mm, or between 40 mm and 160 mm, or between 50 mm and 150 mm.

In a non-limiting embodiment, the head portion 3*a* is removably connectible to the at least a side wall 3*b*, and therefore realizes a cover which if needed can be removed for gaining access to the culture medium 4. In an embodiment the head portion 3*a*, when connected to the side wall 3*b*, substantially seals a cavity of the support 3.

The culture medium 4 comprises one or more solid or liquid solutions containing nutritional substances on which it is possible to grow eukaryotic and prokaryotic cells. A specific and non-limiting embodiment of culture medium is the Agar.

In an alternative embodiment, the support 3 can be substantially planar and open.

The support 3 can be realized in different materials among which plastic materials and/or in glass.

The support 3, especially when shaped so as to define an inner cavity, is preferably realized in an optically substantially transparent material. An optically substantially transparent material is a material that allows the passage of an optical radiation, in particular in the visible domain, without appreciable scattering. A substantially transparent material is different from a substantially translucid material, wherein, instead, an optical radiation herein incident is capable of passing, but not necessarily following the Snell Law; the optical radiation, in a translucid material, can be scattered in correspondence of the two interfaces (of input and output of the radiation) or internally to the material itself. A particular expression of translucid materials are opaque materials. These materials cannot substantially be traversed by an optical radiation, which is substantially integrally attenuated by the material itself. In particular are substantially transparent at least the head portion 3*a* and/or the side wall of the support.

It is observed in particular that at least a side of the support 3 directed in use toward the cameras on board of the device 1 is optically substantially transparent.

Magazine for Supports

In a preferred but non-limiting embodiment, the device 1 object of the present disclosure comprises a magazine for supports. The magazine for supports 3 is configured for containing at least temporarily a plurality of supports 3 arranged in at least a predefined configuration. In an alternative embodiment, this magazine cannot be properly part of the device 1 herein described.

In order to allow to the reader a correct interpretation of the operation of the device 1 herein are described, in relation to at least a support 3, a pick-up position Pp, which is in substantial correspondence of the magazine 1, and an observation position in which the support 3 lies in a correct position for allowing the acquisition of at least an image of itself.

In a preferred but non-limiting embodiment, this magazine is a carousel magazine, having a center and a plurality of retaining stations of supports 3 radially arranged with respect to the center and/or in a substantially perimeter position. Preferably but in a non-limiting extent, the magazine assumes a substantially circular shape. In a preferred but non-limiting embodiment, the magazine is a magazine configured for carrying out a movement of rotation around a predefined rotation axis A, that in the specific embodiment shown in the attached figures is substantially vertical, in order to allow the positioning, alternatively, of at least a first and a second station of said plurality of stations in the pick-up position Pp.

The magazine comprises a plurality of dividing columns that allow to detect and separate the various retaining stations of supports 3. For each retaining station of supports 3, a plurality of supports 3 is arranged as a pile, with a support above the other. The loading of the magazine can occur according to a manual or automatic proceeding.

Cameras Installed on Board of the Device 1

The device 1 object of the present disclosure comprises at least a first camera 6, configured for framing at least a portion of the support 3 from a first observation point P1. In a preferred embodiment, the first observation point P1 is fixed with respect to the frame of the device 1. In detail, the first camera 6 is arranged in such a way to acquire an image of at least a portion of the support 3 from a substantially vertical direction by framing the support 3 substantially in plane view. In an embodiment, the first camera 6 is centered on the axis Y.

In particular, the first camera 6 is installed in a position such that it, in absence of the support 3, frames at least part of the supporting element 2, 2*a*, 2*b*. When the support 3 is positioned above the supporting element 2, 2*a*, 2*b*, part of the supporting element 2, 2*a*, 2*b* results covered by the support 3 therein laid.

In an embodiment, the first camera 6 is configured for integrally framing the support 3, i.e. on the whole area thereof. In another embodiment, the first camera 6 is configured for framing only a portion of the support 3, in particular only a central portion.

The first observation point P1 lies at a height higher with respect to the height at which lies the supporting element 2, 2*a*, 2*b*. Equivalently, the first camera 6 frames, in use, the support 3 from the first side of the supporting element 2, 2*a*, 2*b*.

In an embodiment, the first camera 6 is a dot-matrix camera, for example and non-limiting thereto a CCD-type camera, configured for framing an image of an area of predefined shape, for example substantially rectangular or squared.

The device 1 object of the present disclosure comprises also a second camera 7, configured for framing at least a portion of the support 3 from a second observation point P2. In a preferred embodiment, the second observation point P2 is fixed with respect to the frame of the device 1. In detail, the second camera 7 is arranged so as to acquire an image of at least a portion of the support 3 from an direction oblique with respect to the support 3 and with respect to the vertical line of the support 3. The axis of framing of the second camera 7 is indicated with X, and forms a predefined first angle of framing a with respect to a substantially horizontal axis K. Preferably, but non-limiting thereto, the first angle of framing a is comprised between 10° and 80°, more preferably between 20° and 70°.

In particular, the second camera 7 is installed in a position such that it, in absence of the support 3, frames at least part of the supporting element 2, 2*a*, 2*b*.

In an embodiment, the second camera 7 is configured for integrally framing the support 3. In another embodiment, the second camera 7 is configured for framing only a portion of the support 3, in particular only a central portion.

It is observed that in a specific embodiment the first camera 6 and the second camera 7 are positioned so as to frame only a portion of the support 3 (then, not integrally).

According to a preferred spatial arrangement and orientation that exists between the first camera 6 and the second camera 7, the portion of the support 3 framing from the first camera 6 is different (does not coincide) with respect to the portion of the support 3 framing from the second camera 7.

A particular spatial arrangement and orientation existing between the first camera 6 and the second camera 7 is such that the portion of the support 3 framing by the first camera 6 coincides at least partially, and optionally integrally, with the portion of the support 3 framed by the second camera 7. Therefore, the images acquired by them can be related to a same portion of the biological sample and/or of the support 3. A particular embodiment of the device 1 is such that the first camera 6 is linear (in particular, trilinear) and is configured for framing a portion of the support 3 corresponding to a radius thereof (if the support 3 has circular section in plane view) or half of its size (if the support 3 assumes a generic shape) in correspondence of the framing point, whereas the second camera 7 is linear (in particular, trilinear) and is configured for framing a portion of the support 3 corresponding to its diameter (if the support 3 has circular section in plane view) or the whole of a size thereof (if the support 3 has a generic shape) in correspondence of the framing point.

In a preferred embodiment, the optical installed on at least one among the first camera 6, the second camera 7 and the third camera 8 is characterized by a focal different with respect to the others. The Applicant has conceived an embodiment of the device 1 wherein the first camera 6, the second camera 7 and the third camera 8 have all of them a same resolution, and in particular are all trilinear cameras with resolution of 4096 pixel. Alternatively, the third camera 8 can have a lower resolution with respect to at least one between the first and the second camera. In an embodiment, the third camera is a trilinear camera with resolution of 1936 pixel. However, the first camera 6 and the second camera 7 have an optic with focus higher with respect to the third camera 8; the focal difference is such that with the third camera 8 it is possible to acquire an image of a portion of the support 3 that substantially comprises all the extension of the support 3 itself in correspondence of said portion, whereas with the first camera 6 and with the second camera 7 it is possible to acquire an image of a portion of the support 3 that comprises only part of the extension of the support 3 itself in correspondence of said portion.

If the support 3 is shaped with circular section in plane view, and supposing that the portion of the support 3 framing by the cameras is the substantially diametric one, this means that the first camera 6 and the second camera 7 will only be able to acquire an extension equal to the radius of said diametric portion, whereas third camera 8 will allow the framing of the entire diameter.

This technical feature allows to acquire, optionally simultaneously, one or more images of a portion of the support 3 with two densities of different graphic information; in the above example, in a case (first camera and second camera) the 4096 pixels will be used for acquiring an image of a radius, whereas in the other (third camera 8) for acquiring an image of a diameter.

Then, there is at least an embodiment of the device 1 wherein there are a first camera 6 and a second camera 7, respectively configured for framing a first and a second portion of the support 3, optionally at least partially coinciding.

The second observation point P2 lies at a height higher with respect to the height at which lies the supporting element 2, 2*a*, 2*b*. Equivalently, the second camera 7 frames, in use, the support 3 from the first side of the supporting element 2, 2*a*, 2*b*.

In an embodiment the second camera 7 is a dot-matrix camera, for example and non-limiting thereto a CCD-type camera, configured for framing an image of an area of predefined shape, for example substantially rectangular or squared.

In another non-limiting embodiment, at least one between the first and the second camera 6, 7, and in particular both the first camera 6 and the second camera 7 are linear cameras. A linear camera has sensors in array configured for acquiring a single line of image, for example a line of a 1×1920 pixel or a line of 4096 pixel.

A particular embodiment of the device here described is such that the first and the second camera 6, 7 are of trilinear type; in this case the first camera 6 and the second camera 7 comprise, each one, three linear sensors. Preferably, each of the three linear sensors is configured for specifically receiving an optical radiation of a wavelength, more precisely of a window of wavelengths, distinct with respect to the wavelength, more precisely distinct with respect to the window of wavelengths, of the remaining sensors. This is made possible for example by dyes (types of pigment) present on the silica wafer upon which the sensor is realized. In a specific embodiment, a first of the three sensors is destined to receive the wavelengths of red (R), a second of the three sensors is destined to receive the wavelengths of green (G) and a third of the three sensors is destined to receive the wavelengths of blue (B). An image compensation system is present for compensating the space existing between a sensor and the other.

In other terms, at least one between the first camera 6, the second camera 7 and the third camera 8, when trilinear, comprises a set of three sensors of optical radiation each one configured for receiving optical radiations having frequency or wavelength lying in a receiving window substantially distinct with respect to the receiving window of the other sensors of the triad.

The device 1 object of the present disclosure can also comprise a third camera 8, configured for framing at least a portion of the support 3 from a third observation point P3. In a preferred embodiment, the third observation point P3 is fixed with respect to the frame of the device 1. In detail, the third camera 8 is arranged such as to acquire an image of at least a portion of the support 3 from a direction oblique with respect to the support 3 and with respect to the vertical line of the support 3. The framing axis of the third camera 8 is indicated with Z, and forms a predefined second angle of framing β with respect to a substantially horizontal axis K. Preferably, but non-limiting thereto, the second angle of framing β is comprised between 10° and 80°, more preferably between 20° and 70°.

In an embodiment, the first angle of framing and the second angle of framing are fixed, and are determined by a specific mounting configuration of the cameras on the frame of the device 1. However, the Applicant has conceived an embodiment wherein, even if not during the step of acquisition of the images, the position of at least one between the second camera 7 and the third camera 8, in particular the inclination of at least one between the second camera 7 and the third camera 8, can be adjusted—manually or automatically—on an angle comprised between the ranges [10°-80°] and more preferably [20°-70°].

In particular, the third camera 8 is installed in a position such that it, in absence of the support 3, frames at least part of the supporting element 2, 2*a*, 2*b*.

In an embodiment, the third camera 8 is configured for integrally framing the support 3.

The third observation point P3 lies at a height higher with respect to the height at which lies the supporting element 2, 2*a*, 2*b*. Equivalently, the third camera 8 frames, in use, the support 3 from the first side of the supporting element 2, 2*a*, 2*b*.

In an embodiment, the third camera 8 is a dot-matrix camera, for example and non-limiting thereto a CCD-type camera, configured for acquiring an image of an area of predefined shape, for example substantially rectangular or squared. Alternatively, the third camera 8 is a linear camera (or trilinear); the characteristics for the linear or trilinear camera are above indicated, and therefore not repeated.

It is observed that in an embodiment, the first camera 6, the second camera 7 and the third camera 8 are activated in order to respectively acquire, at least a first, at least a second and at least a third image of a same portion of the biological sample and/or of the support 3.

In order to allow the acquisition of the image, the cameras here described clearly comprise a sensor. Optionally it is preferable that at least one among the first camera 6, the second camera 7 or the third camera 8 can be a camera with an active cooling system or device, operatively arranged in order to cause a cooling of the sensor of the camera; the active cooling device or system is configured for reducing said dark current, and can concur to optimize the quality of acquired images, in particular by reducing the noise thereof.

A metal supporting frame, in particular but non-limiting thereto realized in aluminum, is provided for the purpose of supporting the first camera 6 and/or the second camera 7 and/or the third camera 8 in a predefined and stable position. The supporting frame for the camera is rigidly fixed to a frame on which is installed the supporting element 2, 2*a*, 2*b*. Also this latter frame is realized in metallic material, preferably aluminum.

It is observed that a particular embodiment of the device 1 can comprise even also a first (and unique) camera. In particular, the Applicant has conceived an embodiment of the device 1 that comprises:

- a supporting element 2, 2*a*, 2*b* configured for housing a support 3 for biological samples;
- at least a first camera 6 oriented toward the supporting element 2, 2*a*, 2*b* and configured for framing at least a portion of the supporting element 2, 2*a*, 2*b* and/or, in use, at least a predefined portion of the support 3 when housed on the supporting element 2, 2*a*, 2*b*, from a first observation point P1, wherein the at least a predefined portion of the support 3 comprises, in use, a biological sample.

In this embodiment there is at least a first optical radiation source 10 configured for irradiating at least the predefined portion of the support 3 from a first irradiation direction, in such a way that, in use, at least a portion of the biological sample is irradiated through the optical radiation of the first optical radiation source 10, further details thereof being described in the following chapter. The device 1 is configured for activating the first camera 6 for generating at least a first and a second image of at least part of said portion of the biological sample and/or of said predefined portion of the support 3 through the first camera 6. In this embodiment the first camera 6 is inclined with respect to a direction orthogonal to the support 3 and/or with respect to the at least an upper surface of the biological sample contained in the support 3. There can be another camera, for example the second camera 7, which is configured for acquiring at least another image.

In a non-limiting embodiment, the first camera 6, the second camera 7 and the third camera 8 are configured for directly framing images of at least part of the portion of the biological sample and/or of said predefined portion of the support 3. For the purposes of the present disclosure, for "directly" it is intended that among the first camera 6, or the second camera 7, or the third camera 8, and the biological sample and/or the support 3, there are no interposed elements, in particular mirrors, focusers, lenses, or other means, specifically destined to divert, concentrate or deviate the optical radiation. Thanks to this technical characteristic the following technical effects are obtained:

- the area immediately above the biological sample and/or the support 3 is substantially clear until reaching the height at which is present the above mentioned one or more cameras, or at which is present the optical radiation source;
- the device 1 is maintained simple, and therefore cost-effective to realize, and easier to clean or maintain;
- is guaranteed a high flexibility of positioning and/or relative movement between the cameras and the support 3;
- the quality of the images is improved, since the interposed elements could lead to image distortions or could be subject to micro-vibrations capable of adversely affecting the quality of the acquired images.

Optical Radiation Sources

The device 1 object of the present disclosure comprises also a first optical radiation source 10 configured for lighting a portion of the support 3 from a first irradiation direction, in particular of lighting.

In a non-limiting embodiment, however, the first optical radiation source 10 is configured for lighting all the support 3. It shall then be intended that as "portion" of the support, it can be integrally considered also the support 3.

In a preferred but non-limiting embodiment the first optical radiation source 10 is used for the acquisition of the first image and of the second image respectively through the first camera 6 and the second camera 7.

Where the first optical radiation source 10 irradiates only a part of the support 3 (not integrally), the portion of the support 3 irradiated coincides with the portion of the support 3 framed by the first camera 6 and/or by the second camera 7.

Preferably, but non-limiting thereto, the device 1 object of the present disclosure comprises a second optical radiation source 11, configured for lighting a portion of the support 3 from a second irradiation direction, in particular of lighting. In a non-limiting embodiment, however, the second optical radiation source 11 is configured for lighting all the support 3. It shall then be intended that as "portion" of the support, it can be considered also the support 3 integrally.

Where the second optical radiation source 11 irradiates only a part of the support 3 (not integrally), the portion of the support 3 irradiated coincides with the portion of the support 3 framed by the first camera 6 and/or by the second camera 7.

As it is possible to observe for example from FIG. 1, the first optical radiation source 10 is arranged above the support 3 (and then above the supporting element 2, 2*a*, 2*b*) and lights this support with an irradiation direction, in particular of lighting that detects an acute angle with respect to the plane upon which lies the support 3 itself. The first optical radiation source lights, in use, the support 3 from first side of the supporting element 2, 2*a*, 2*b*.

The second optical radiation source 11 is arranged under the support 3 (and then under the supporting element 2, 2*a*, 2*b*) and lights this support with a direction that detects alternatively an acute angle with respect to the plane upon which lies the support 3 itself, or detects an angle substantially orthogonal with respect to the plane upon which lies the support 3. The second lighting source lights then the support 3 with a beam deriving from the second side of the supporting element 2, 2*a*, 2*b* and in detail passing, at least partially, by the first portion 2*a* of the supporting element itself.

In an embodiment, at least one between the first optical radiation source 10 and the second optical radiation source 11 is a source emitting an optical radiation in the visible domain.

According to the present disclosure, the visible domain comprises optical radiations the wavelengths thereof are substantially comprised in the range 400 nm-700 nm.

Preferably, but non-limiting thereto, the device 1 object of the present disclosure comprises a third optical radiation source 9, configured for lighting at least a portion of the support 3 from a third irradiation direction, in particular of lighting. The third irradiation direction, in particular of lighting is preferably inclined with respect to the first irradiation direction, in particular of lighting and to the second irradiation direction, in particular of lighting.

As preferably and non-limiting thereto shown in FIG. 1*a* and in FIG. 1*b*, the third optical radiation source 9 is arranged above the support 3 (and then above the supporting element 2, 2*a*, 2*b*) and lights this support with an irradiation direction, in particular of lighting that detects an acute angle with respect to the plane upon which lies the support 3 itself. Alternatively, the irradiation direction, in particular of lighting is substantially orthogonal with respect to the plane upon which lies the support 3 itself. The third optical radiation source 9 can be a radiation source emitting an optical radiation in the visible domain.

The third optical radiation source 9 irradiates preferably a portion of the support 3 coinciding, or anyway geometrically superimposable, with the portion of the support 3 framed by the first camera 6 and/or by the second camera 7 and/or by the third camera 8.

In some embodiments, at least one optical radiation source selected among the first, the second and the third, can be a radiating source in the infrared spectrum and/or in the ultraviolet spectrum.

According to the present disclosure, the infrared spectrum comprises radiations whose wavelengths are substantially comprised in the range 700 nm-1000 μm, and that in particular are comprised in the range of the so-called "near" infrared (700 nm-1,4 μm).

According to the present disclosure, the ultraviolet spectrum comprises radiations whose wavelengths are substantially comprised in the range 10 nm-400 nm.

Optionally, at least one among the first, the second and the third optical radiation source is an optical radiation source configured for being tunable in wavelength and in particular capable of emitting through the single or combined action of one or more emitters, optical radiations in the range of the infrared and/or the visible and/or of the ultraviolet as above described.

The intensity of optical radiation of at least one among the first, the second and the third optical radiation source 10, 11, 9, can be manually and/or substantially automated adjusted, for example for facing different translucency levels of the culture medium and/or according to an optical sensitivity of at least one of the cameras the device 1 can be provided therewith.

In detail, the third optical radiation source 9 is configured for emitting substantially a luminous line oriented toward the support 3 itself; in particular it is positioned so as to direct the luminous line along a direction substantially passing by the center of the support 3 itself. The third optical radiation source can be used, together with the associated camera, and in particular with the third camera, as a device destined to allow the three-dimensional processing of the image, in particular in order to detect a height variation of the biological sample. The height detection is carried out, among the other things, by evaluating a luminosity difference acquired by the camera.

In a specific and non-limiting embodiment, the third optical radiation source 9 is a LASER source, and is in particular an optical radiation source that is temporally coherent and spatially coherent. The third optical radiation source 9 is a substantially strongly monochromatic optical radiation source. The bandwidth of the optical radiation of a LASER source is much lower with respect to the one of an incoherent optical source. In a specific embodiment the LASER source emits substantially blue-violet light.

The third camera 8 and the third optical radiation source 9 realize a laser triangulation device which is configured for allowing to detect transparent bacterial and/or viral colonies, barely visible through a conventional optics.

The laser triangulation device is also configured for detecting the profile of colonies and of the surface of the culture medium in the support 3, in such a way that it is possible to detect irregularities of the surface of the culture medium itself due to the presence of colonies, and in such a way that it is possible to detect the mean height of the culture medium with respect to the supporting element 2, 2*a*, 2*b* and/or with respect to the camera for acquiring the images with the correct focal distance, through a mechanic focusing device which will be better described hereinafter.

The device 1 object of the present disclosure comprises a data processing unit operatively connected with the first camera 6, the second camera 7 and the third camera 8. The data processing unit can comprise at least a processor, of general-purpose type, or a processor or an integrated circuit (ASIC) or a FPGA or a Programmable Logic Controller, configured for managing at least the synchronization of the activation of at least one of the optical radiation sources for allowing the acquisition of images of the support 3. Therefore, the data processing unit is also operatively connected with the optical radiation sources.

Through the data processing unit can be actuated different activation combinations between at least one among the first, the second and the third camera 6, 7, 8 and one among the first, the second and the third optical radiation source 10, 11, 9.

Where there are only the first camera 6 and the second camera 7, the data processing unit can be configured for causing an activation of the first optical radiation source 10 in association with the activation of the first camera 6 and of the second camera 7; this means that at least a first and a second image of the support 3, and then of the biological sample therein contained, are acquired through an optical radiation deriving from a single optical radiation source (in this case the first optical radiation source 10, radiating from the above). Alternatively, the data processing unit can be configured for causing an activation of the second optical radiation source 11 in association with the first camera 6 and the second camera 7; this means that at least a first image and a second image of the support 3, and then of the biological sample therein contained, are acquired through an optical radiation deriving from a single optical radiation source (in this case the second optical radiation source 11, radiating from below).

Alternatively, the data processing unit can be configured for causing an activation of the first optical radiation source 10 in association with the activation of the first camera 6 and for causing, in a second time, an activation of the second optical radiation source 11 in association with the activation of the second camera 7, in particular deactivating the first optical radiation source 10 and the first camera 6.

Since the axis of the first camera 6 is inclined with respect to the radiation axis of the first optical radiation source 10 and the axis of the second camera 7 is skewed with respect to the axis of radiation of the second optical radiation source 11, this latter particular configuration allows to acquire images of the support 3, and then of the sample of biological material therein contained, without direct reflection or radiation of the optical radiation source, and then with a higher quality.

Where there are the first camera 6, the second camera 7 and the third camera 8, the data processing unit can be configured for causing an activation of one among the first optical radiation source 10, or the second optical radiation source 11 or the third optical radiation source 9, in association with the activation of at least one among the first camera 6, the second camera 7 and the third camera 8, respectively in order to generate at least a first image, a second image and a third image of at least part of the support 3 and of the biological sample therein contained.

Alternatively, two among the first, the second and the third optical radiation source 10, 11, 9, can be simultaneously activated during the activation of the first camera 6, of the second camera 7 and of the third camera 8.

In another configuration, the data processing unit can be configured for causing an activation of the first optical radiation source 10 in association with the activation of the first camera 6, for causing, in a second time, an activation of the second optical radiation source 11 in association with the activation of the second camera 7, in particular by deactivating the first optical radiation source 10 and the first camera 6, and for causing, in a third time, an activation of the third optical radiation source 9 in association with the activation of the third camera 8, in particular by deactivating the second optical radiation source 11 and the second camera 7, and by maintaining deactivated the first optical radiation source 10 and the first camera 6.

In a non-limiting embodiment, the first optical radiation source 9, the second optical radiation source 11 and the third optical radiation source 10 are configured for irradiating at least part of the biological sample and/or of said predefined portion of the support 3 in a direct way. According to the present disclosure, for "directly" it is intended that between the first optical radiation source 11, the third optical radiation source 10 and the biological sample and/or the support 3, there are not interposed elements, in particular, mirrors, focusers, lenses, or other means, specifically destined to divert, concentrate or deviate optical radiation. Thanks to this technical feature the following technical effects are obtained:

- the area immediately above the biological sample and/or the support 3, or below the central portion 2*a* of the supporting element 2, 2*a*, 2*b*, is substantially clear until reaching the height at which is present the above mentioned one or more cameras, or at which are present one or more optical radiation sources 9, 10, 11;
- the device 1 is maintained simple, and therefore cost-effective to realize, and easier to clean or maintain;
- is guaranteed a high flexibility of positioning and/or relative movement between the optical radiation sources and the support 3;
- the quality of the images is improved, since the interposed elements could lead to image distortions or could be subject to micro-vibrations capable of adversely affecting the irradiation accuracy.

Movement, in Particular Rotation, of the Supporting Element and/or of the Cameras In an embodiment, there is in use a relative movement between at least one among the first camera 6, the second camera 7 and the third camera 8, and the support 3. This relative movement can be made possible by a rotation of the camera (or of the cameras), by maintaining the support 3, and then the supporting element 2, 2*a*, 2*b*, fixed; alternatively it can be made possible by a rotation of the support 2, 2*a*, 2*b* with the camera, or the cameras, installed in a fixed position. This latter embodiment is preferred.

In fact, in a preferred embodiment, the device 1 object of the present disclosure is configured for causing a rotation of the support 3 during the activation of the first camera 6, of the second camera 7 and, when present, of the third camera 8, in such a way that is acquired a plurality of images of the support 3, and then of the biological sample.

The images are acquired with the head portion 3*a* (cover) of the support 3 installed, then by taking a picture of the biological sample through a material that, even if substantially transparent, could have surface defects that cause an alteration of the image.

The fact that at least one among the first camera 6, the second camera 7 and (where present) the third camera 8 acquire a plurality of images with a rotation of the support 3 allows to obtain an overall view of the biological sample from a plurality of points of view allowing to significantly mitigate, if not eliminating, the effects of the interferences of the head portion 3*a*.

Figure 2A:
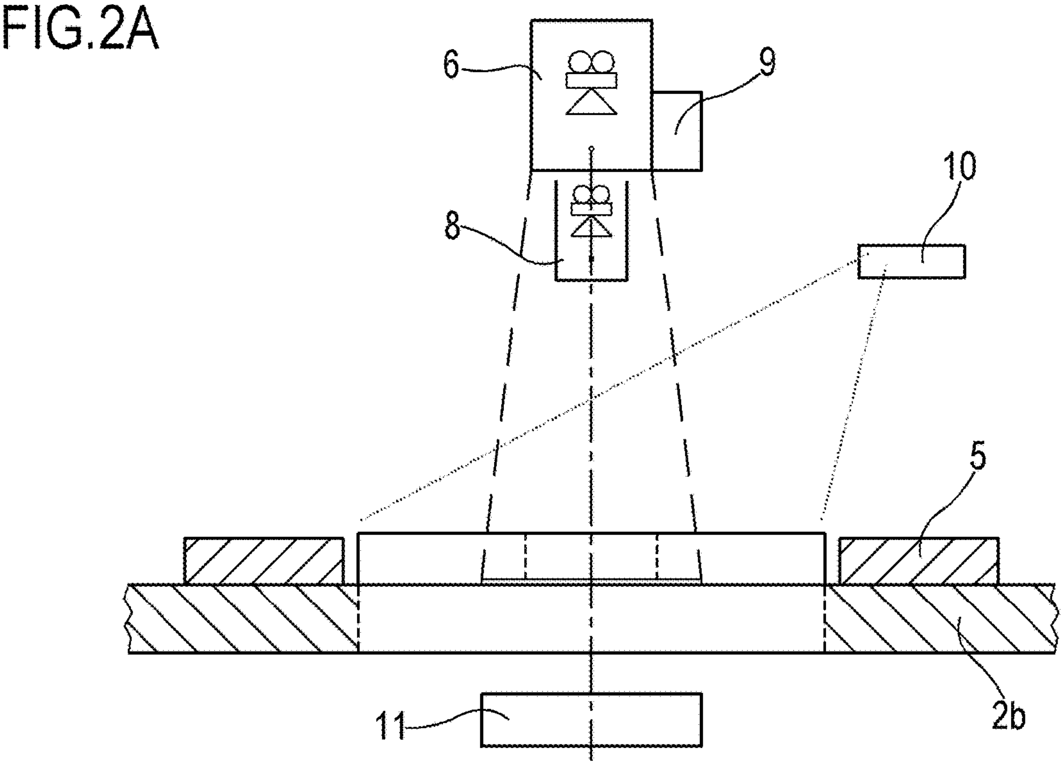
Figure 2B:
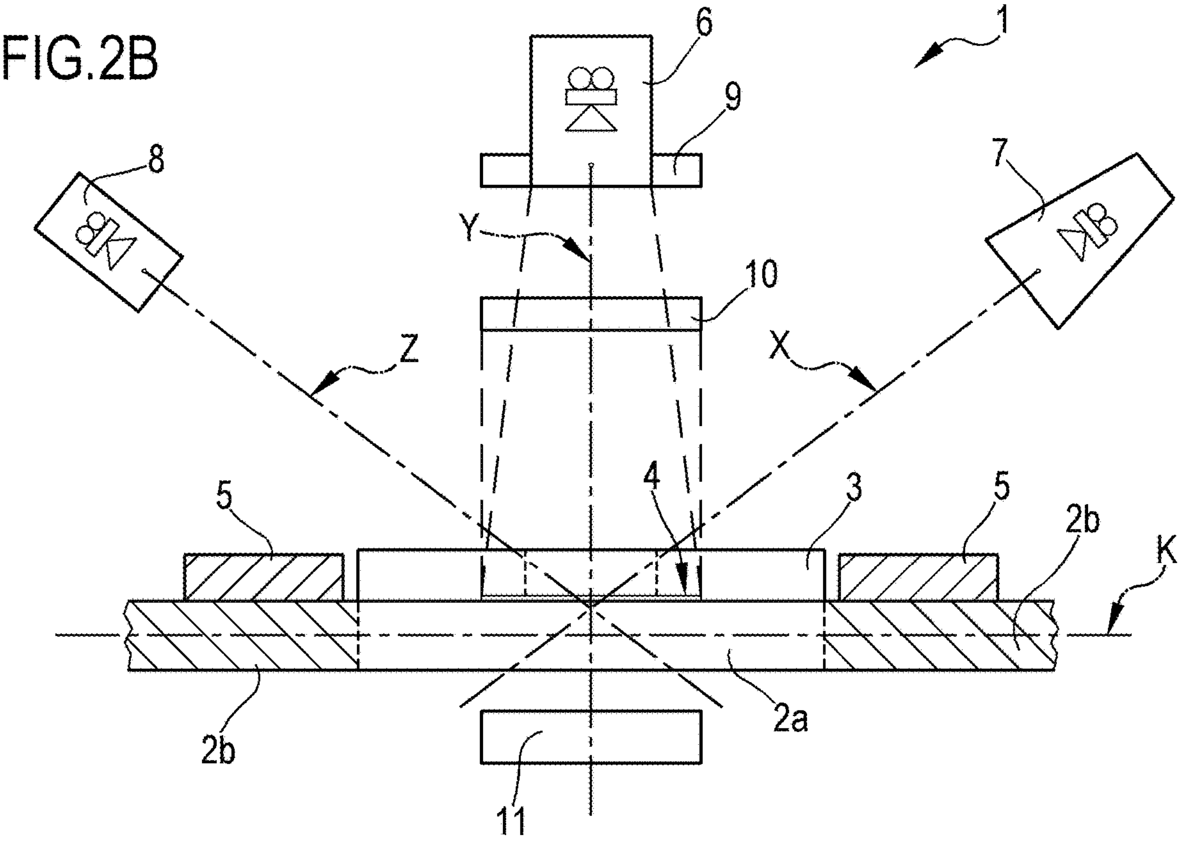

FIGS. 2*a* and 2*b* show a first combination of irradiation (visible and/or non-visible optical radiation), in particular of lighting, and of framing.

At least a portion of the support 3 is vertically framing (i.e., in plane view) by the first camera 6 and is irradiated from above by means of the first optical radiation source 10. As it is possible to observe in FIG. 2*a*, the first optical radiation source 10 is axially misaligned with respect to the first camera 6 and substantially irradiates the whole support 3 from a substantially angulated direction.

In a preferred but non-limiting embodiment, with this first combination of optical radiation and of framing the device 1 activates the first camera 6 for acquiring a first plurality of N images, or more precisely a first set Img(1,*i*) of N images Img(1,1) . . . Img(1,N). The first of the two indexes, indicates precisely the first set of images, the second index indicates the i-th image among the N acquired by means of the first camera 6.

As it will be clearer by reading the following portion of description, in use the N images of the first set Img(1,*i*) refer to a predefined N portions of the support 3. These portions of the support 3 can be partially superimposed or coincident.

During the framing of the N images, the supporting element 2, 2*a*, 2*b* is put in rotation. With a linear camera, it is framed a plurality of images substantially corresponding to a predefined portion of the support 3; preferably, with a substantially linear camera it is framed a plurality of images corresponding to the diametric portion of the support 3 (if circular) or anyway to a central portion of the support 3. This portion comprises preferably a maximum diagonal of the support 3, in such a way to allow the framing of the whole surface during the rotation.

Each i-th image of the N images of the first set Img(1,*i*) of N images corresponds to a predefined rotation angle of the supporting element 2, 2*a*, 2*b* with respect to a reference azimuthal direction considered as direction of start of the rotation. This reference direction for the start of the rotation is defined on the basis of a positional reference, preferably present on the support 3.

Figure 3A:
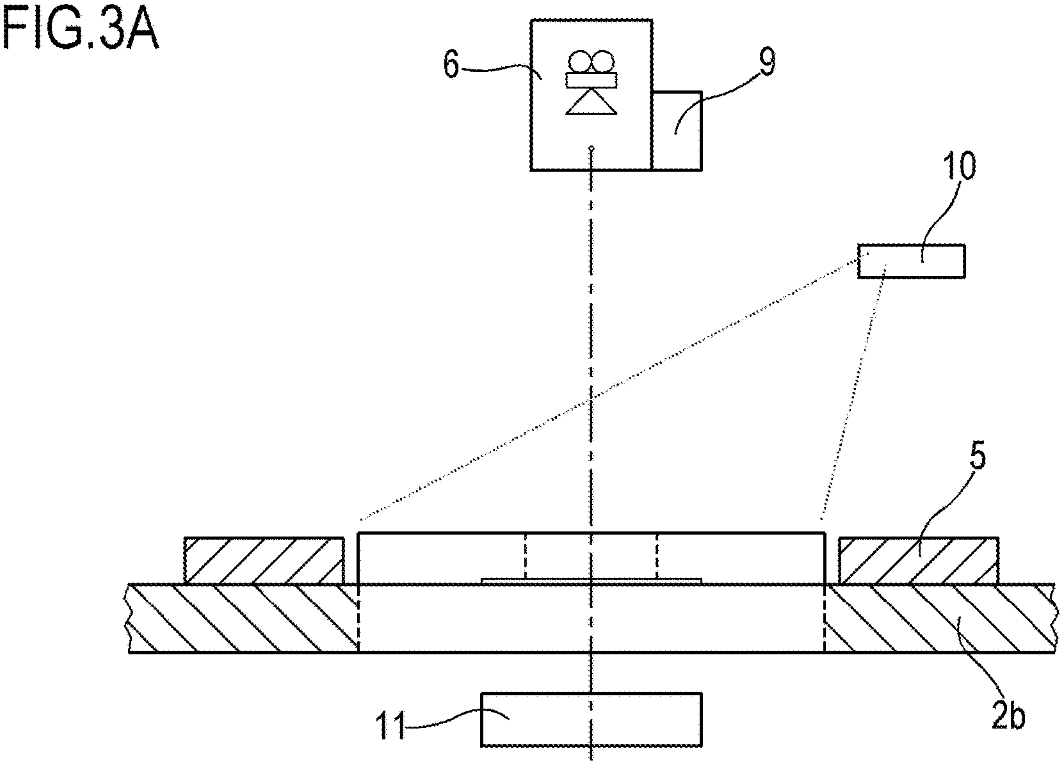
Figure 3B:
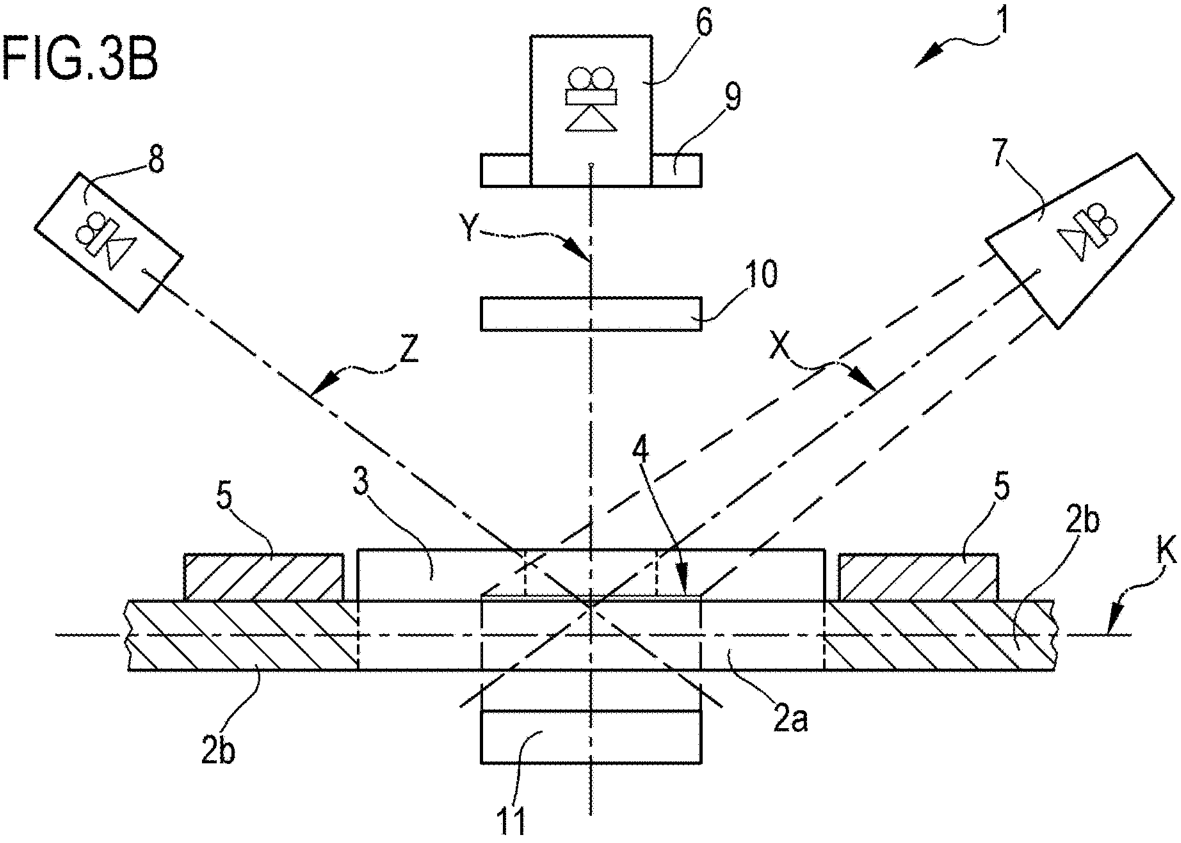

FIGS. 3*a* and 3*b* show a second combination of irradiation (visible and/or non visible optical radiation), in particular of lighting, and of framing.

At least a portion of the support 3 is framed from the above by the second camera 7 and is illuminated from below by means of the second optical radiation source 11. As it is possible to observe in FIG. 3*b*, the second optical radiation source 11 is axially misaligned with respect to the second camera 7 and substantially irradiates the whole support 3 from a substantially axial direction with respect to the rotation axis Y, and that is it irradiates the whole support 3 from a substantially orthogonal with respect to said support 3.

In a preferred but non-limiting embodiment, with this second combination of optical radiation and of framing the device 1 activates the second camera 7 for framing a second set Img(2,*i*) of M images Img(2,1) . . . Img(2,M). The first of the two indexes, indicates precisely the second set of images, the second index indicates the i-th image among the M acquired by means of the second camera 7.

In a preferred but non-limiting embodiment M=N.

During the framing of the M images, the supporting element 2, 2*a*, 2*b* is put in rotation. With a substantially linear camera, it is framed a plurality of images substantially corresponding to a diametral portion of the support 3.

Each i-th image of the M images of the second set Img(2,*i*) corresponds to a predefined rotation angle of the supporting element 2, 2*a*, 2*b* with respect to a reference azimuthal direction considered as direction of start of the rotation.

Concerning the angular increase between each image apply the above indicated considerations.

Figure 4A:
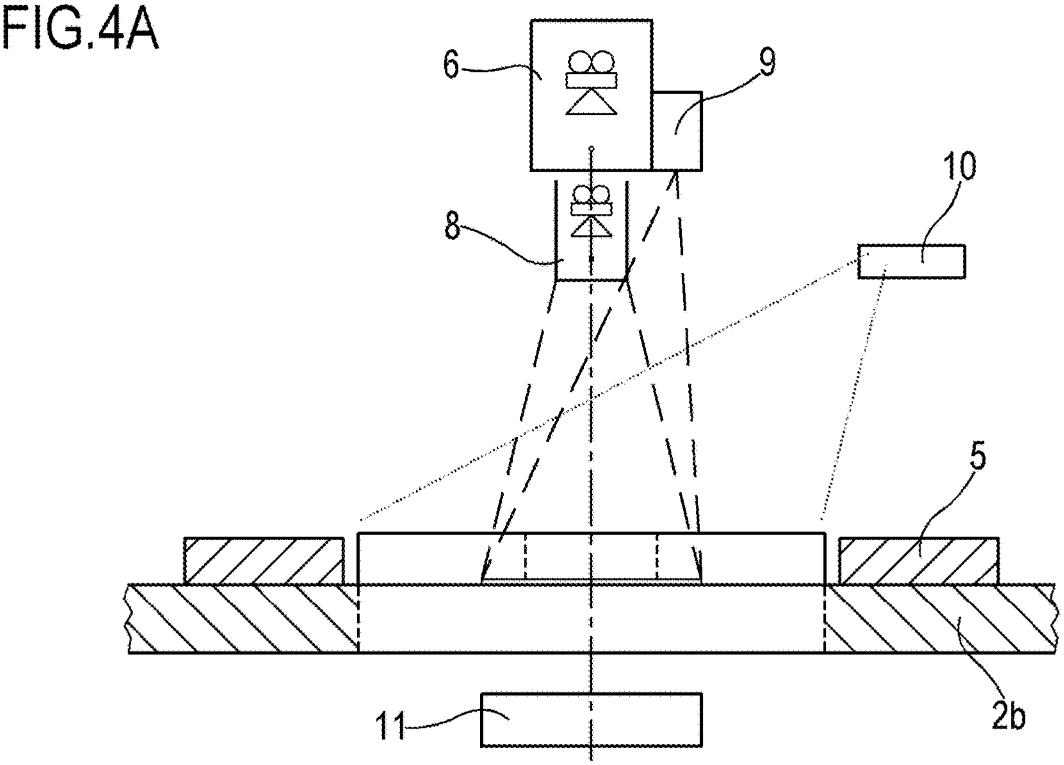
Figure 4B:
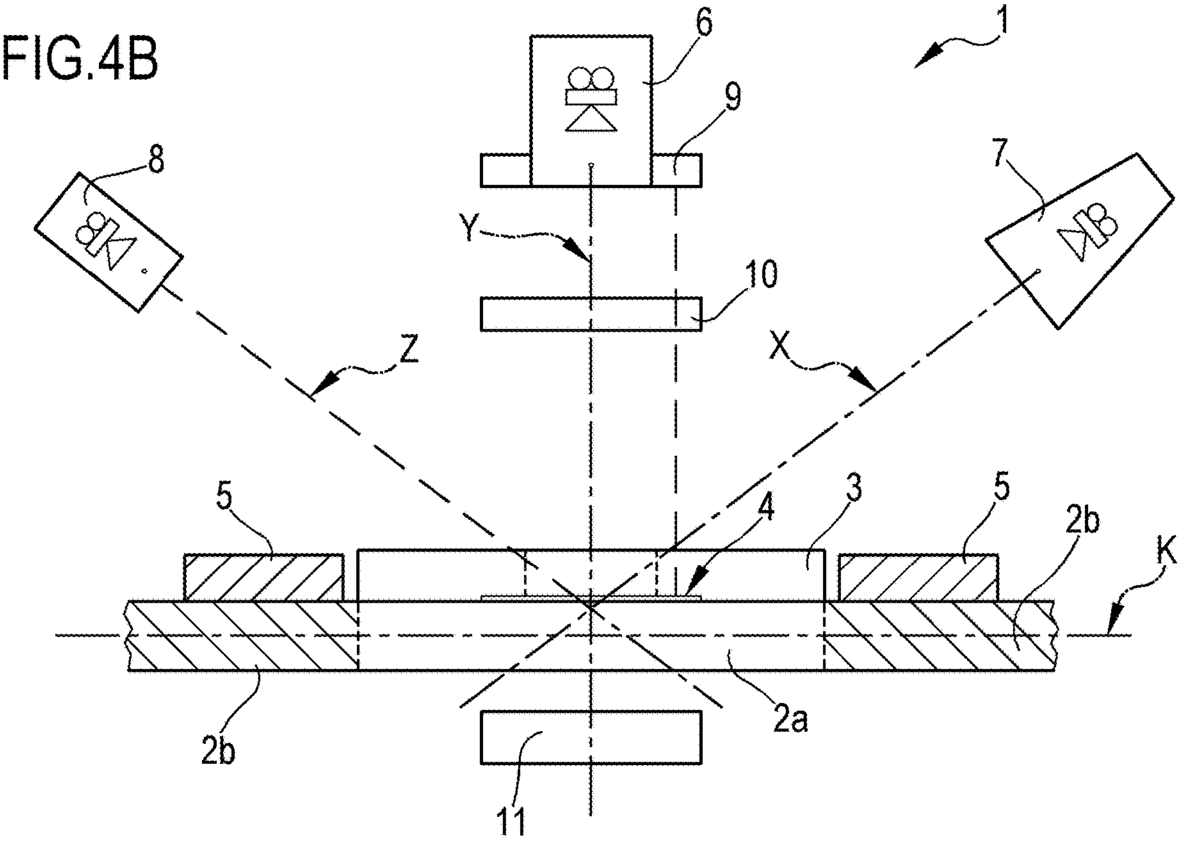

FIGS. 4*a* and 4*b* show a third combination of irradiation (visible and/or non visible optical radiation), in particular of lighting, and of framing.

At least a portion of the support 3 is framed from the above by the third camera 8 and is lit from the above by means of the third optical radiation source 9.

In particular it is observed that the third optical radiation source 9 projects a blade (substantially linear, rectilinear beam of optical radiation), then a very long and narrow beam, of optical radiation, in particular light, along a substantially diametric portion of the supporting element 2, 2*a*, 2*b*. Since in use the support 3 is centered on the supporting element 2, 2*a*, 2*b*, the substantially diametric portion of the supporting element 2, 2*a*, 2*b* coincides in use with the substantially diametral portion of the support 3; in particular this is true when the support 3 shows a substantially discoidal shape.

As it is possible to observe in FIG. 4*b*, the third optical radiation source 9 is axially misaligned with respect to the third camera 8 and lights substantially part of the support 3 from a direction that can be axial or misaligned with respect to the axis Y.

In a preferred but non-limiting embodiment, with this third combination of irradiation and of framing the device 1 activates the third camera 8 for framing a third set Img(3,*i*) of W images Img(3,1) . . . Img(3,W). The first of the two indexes, indicates precisely the third set of images, the second index indicates the i-th image among the W framed by means of the third camera 8.

In a preferred but non-limiting embodiment M=N=W.

During the framing of the W images, the supporting element 2, 2*a*, 2*b* is put in rotation. With a substantially linear camera, it is framed a plurality of images substantially corresponding to a diametric portion of the support 3.

Each i-th image of the W images of the third set Img(3,*i*) corresponds to a predefined rotation angle of the supporting element 2, 2*a*, 2*b* with respect to a reference azimuthal direction considered as direction of start of the rotation.

Figure 5A:
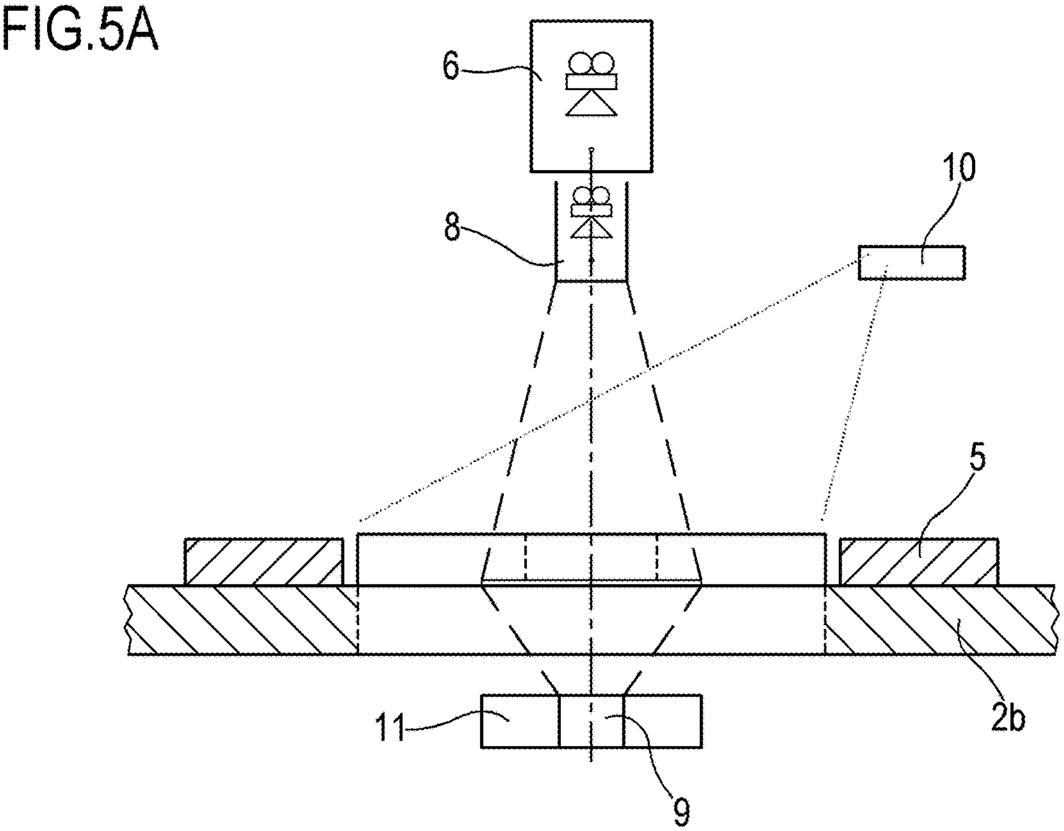
Figure 5B:
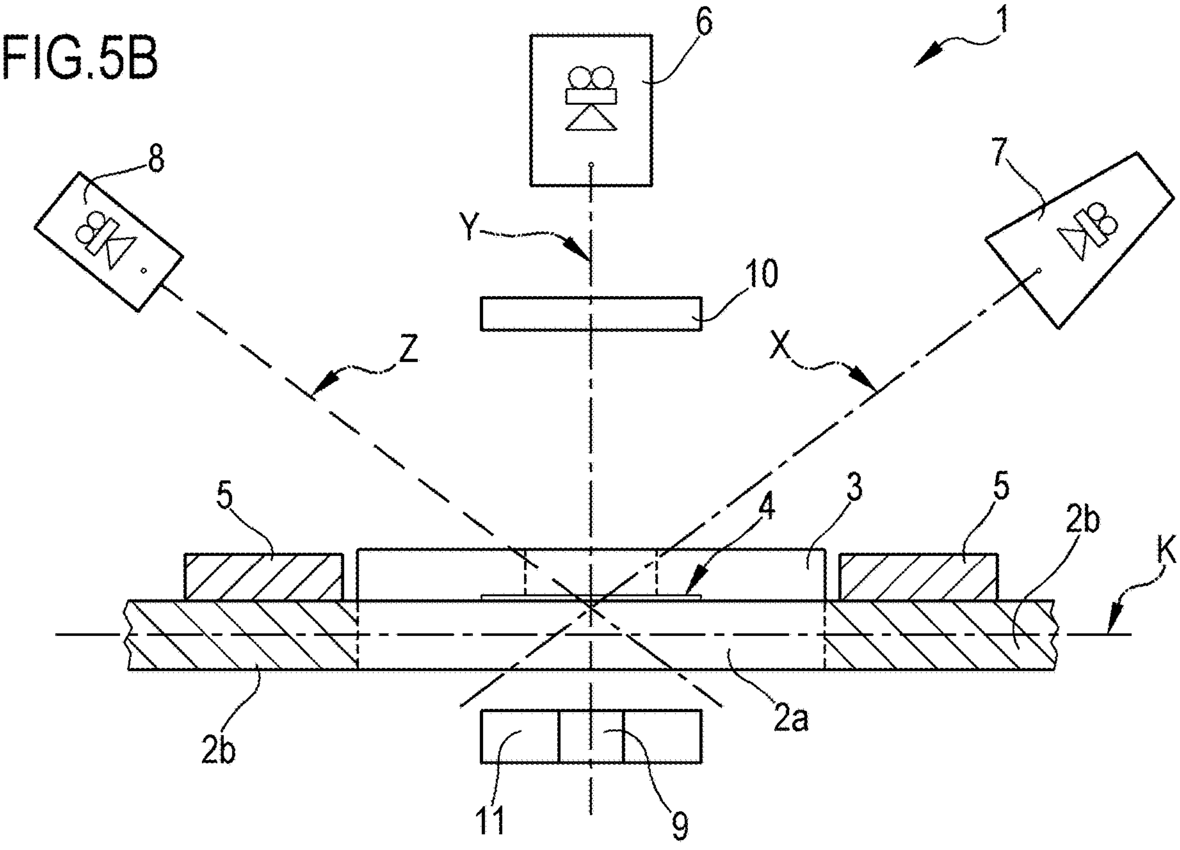

FIGS. 5*a* and 5*b* show a fourth combination of irradiation (visible and/or non-visible optical radiation), in particular of lighting, and of framing. This fourth combination of irradiation can be considered as an alternative to the third combination of irradiation.

At least a portion of the support 3 is framed from above by the third camera 8 and is lit by means of the third optical radiation source 9. However, differently from FIGS. 4*a* and 4*b*, the third optical radiation source 9 is positioned under the supporting element 2, 2*a*, 2*b*.

In particular it is observed that the third optical radiation source 9 projects a blade, then a very long and narrow beam, of optical radiation, in particular light, along a substantially diametric portion of the support 3.

The third optical radiation source 9 is axially misaligned with respect to the third camera 8 and lights substantially part of the support 3 from an axial direction with the axis Y.

With this fourth combination of irradiation and of framing the device 1 activates the third camera 8 for framing a third set Img(3,*i*) of W images Img(3,1) . . . Img(3,W). The first of the two indexes, indicates precisely the third set of images, the second index indicates the i-th image among the W framed by means of the third camera 8.

In a preferred but non-limiting embodiment M=N=W.

During the framing of the W images, the supporting element 2, 2*a*, 2*b* is put in rotation. With a substantially linear camera, it is framed a plurality of images substantially corresponding to a diametric portion of the support 3.

Each i-th image of the W images of the third set Img(3,*i*) corresponds to a predefined rotation angle of the supporting element 2, 2*a*, 2*b* with respect to a reference azimuthal direction considered as direction of start of the rotation.

Figure 6:
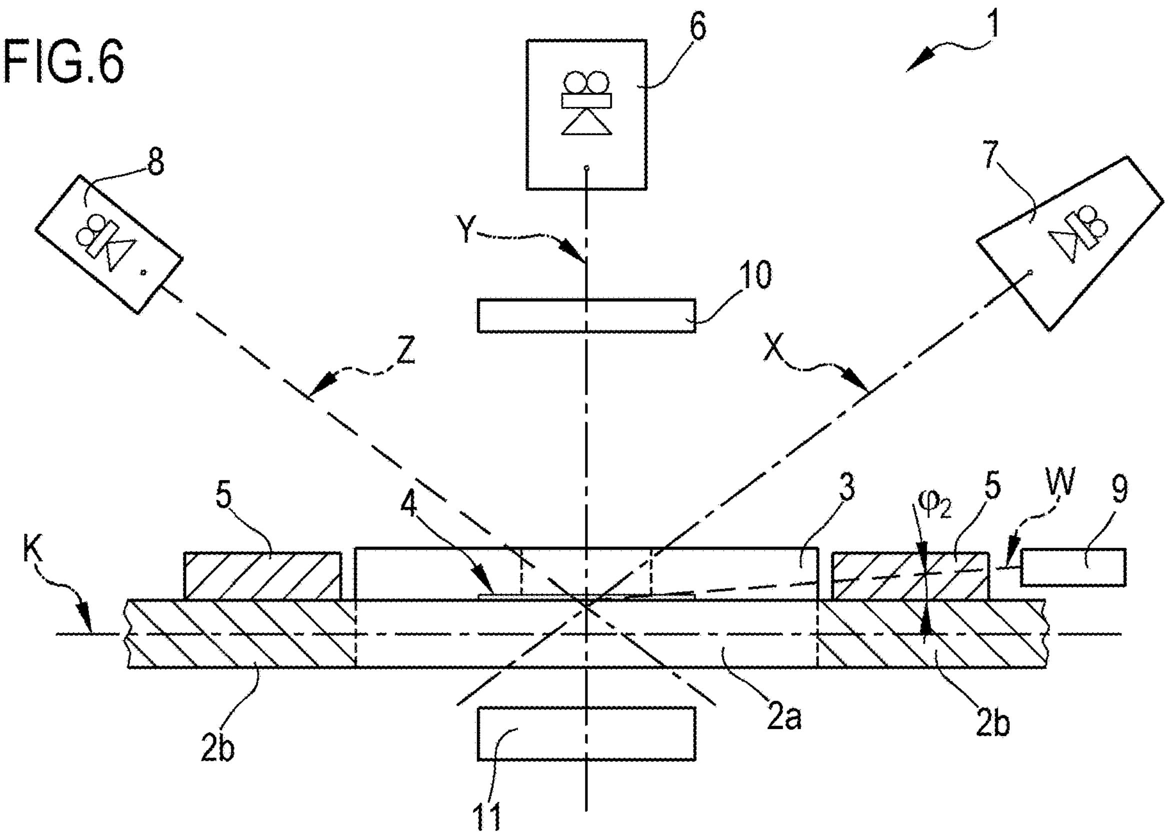
FIG. 6 shows a sectional view of part of the device object of the present disclosure, wherein it is represented a fifth combination of irradiation direction, in particular of lighting and of framing of said portion of the support.

FIG. 6 shows a fifth combination of irradiation (visible and/or non-visible optical radiation), in particular of lighting, and of framing. This fifth combination of irradiation can be considered as an alternative to the third combination of irradiation and to the fourth combination of irradiation.

At least a portion of the support 3 is framed from above by the third camera 8 and is lit from above by means of the third optical radiation source 9. However, an angle φ2 of irradiation, measured with respect to the axis K or on an axis parallel to the axis K, and then with respect to a plane parallel to the plane upon which lies the supporting element 2, 2*a*, 2*b*, is very reduced, and is in the range of a few degrees. In this embodiment the irradiation of the support 3 in particular when closed, takes place through a side wall of the support 3.

In particular it is observed that the third optical radiation source 9 projects a blade, then a very long and narrow beam, of optical radiation, in particular light, along a substantially diametric portion of the support 3.

The third optical radiation source 9 is axially misaligned with respect to the third camera 8.

In a preferred but non-limiting embodiment, with this fifth combination of irradiation and of framing the device 1 activates the third camera 8 for framing a third set Img(3,*i*) of W images Img(3,1) . . . Img(3,W). The first of the two indexes, indicates precisely the third set of images, the second index indicates the i-th image among the W framed by means of the third camera 8.

In a preferred but non-limiting embodiment M=N=W.

During the framing of the W images, the supporting element 2, 2*a*, 2*b* is put in rotation. With a substantially linear camera, it is framed a plurality of images substantially corresponding to a diametric portion of the support 3.

Each i-th image of the W images of the third set Img(3,*i*) corresponds to a predefined rotation angle of the supporting element 2, 2*a*, 2*b* with respect to a reference azimuthal direction considered as direction of start of the rotation.

Figure 7:
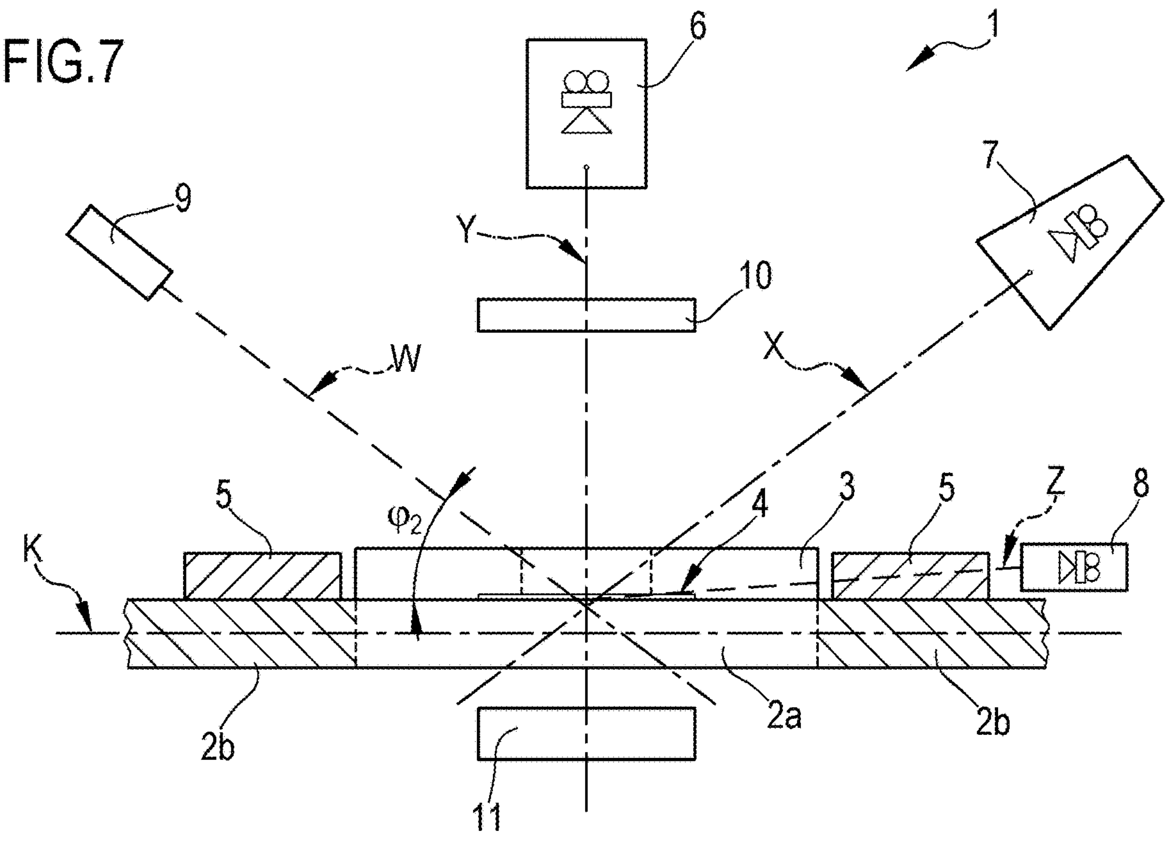
FIG. 7 shows a sectional view of part of the device object of the present disclosure, wherein it is represented a sixth combination of irradiation direction, in particular of lighting and of framing of said portion of the support.

FIG. 7 shows a sixth combination of irradiation (visible and/or non visible optical radiation), in particular of lighting, and of framing. This sixth combination of irradiation can be considered dual with respect to the fifth one, since the position of the camera and of the optical radiation source are inverted with respect to the latter.

At least a portion of the support 3 is framed from above by the third camera 8 and is lit from above by means of the third optical radiation source 9. However, an angle φ2 of irradiation, measured with respect to the axis K or on an axis parallel to the axis K, and then with respect to a plane parallel to the plane upon which lies the supporting element 2, 2*a*, 2*b*, is significantly larger with respect to the fifth combination of irradiation; the angle of framing, measured always with respect to the axis K, and then with respect to a plane parallel to the plane upon which lies the supporting element 2, 2*a*, 2*b*, is reduced, and is in the range of a few degrees. In this embodiment the framing of the support 3 in particular when closed, takes place through a side wall of the support 3.

In particular it is observed that the third optical radiation source 9 projects a blade, then a very long and narrow beam, of optical radiation, in particular light, along a substantially diametric portion of the support 3.

The third optical radiation source 9 is axially misaligned with respect to the third camera 8.

In a preferred but non-limiting embodiment, with this sixth combination of irradiation and of framing the device 1 activates the third camera 8 for framing a third set Img(3,*i*) of W images Img(3,1) . . . Img(3,W). The first of the two indexes, indicates precisely the third set of images, the second index indicates the i-th image among the W framed by means of the third camera 8.

In a preferred but non-limiting embodiment M=N=W.

During the framing of the W images, the supporting element 2, 2*a*, 2*b* is put in rotation. With a substantially linear camera, it is framed a plurality of images substantially corresponding to a diametric portion of the support 3.

Each i-th image of the W images of the third set Img(3,*i*) corresponds to a predefined rotation angle of the supporting element 2, 2*a*, 2*b* with respect to a reference azimuthal direction considered as direction of start of the rotation.

The above is also valid if the supporting element 2, 2*a*, 2*b* is arranged in a configuration fixed on the device 1, and is instead present an auxiliary frame upon which at least the first camera 6, and preferably at least one between the second camera 7 and the third camera 8, are installed in order to rotate with respect to the supporting element 2, 2*a*, 2*b*.

Positional References and Synchronization of the Supporting Element With One or More of the Cameras It has been written that each i-th image of the N, M, W images of the first, second and third set of images corresponds to a predefined rotation angle of the supporting element 2, 2*a*, 2*b* with respect to a reference azimuthal direction considered as direction of start of the rotation. This reference direction for the start of the rotation is defined on the basis of a positional reference, preferably present on the support.

In fact, in an embodiment the support 3 shows an identification tag.

In an embodiment wherein the support 3 is a Petri dish provided with one or more side walls defining a side surface, the identification tag is arranged in substantial correspondence of a predefined portion of its side surface. In particular, the side tag is arranged on the outer side surface of the support 3.

Alternatively the identification tag can be arranged in correspondence of a bottom wall of the support 3, comprising graphic and/or alphanumeric elements. Even alternatively, the identification tag can be arranged on a cover of the support 3.

This identification tag allows to identify an azimuthal reference area and allows to understand which is the rotation along the azimuthal plane of the support 3 with respect to the supporting element 2, 2*a*, 2*b*. The azimuthal plane is an orthogonal plane with respect to the axis Y. The identification tag realizes then the positional reference of the support 3 on the supporting element 2, 2*a*, 2*b*.

Furthermore, a specific and non-limiting embodiment of the supporting element 2, 2*a*, 2*b* provides the presence of a reference that protrudes above the supporting element; this reference, in an embodiment, assumes a substantially circumference sector profile, and shows a wall, in use substantially directed toward the support 3, of a substantially reflecting type. In an embodiment it extends for a circumference arch lower than 90°, preferably comprised between 20° and 60° and more preferably comprised between 30° and 50°. In use, the support 3 is deposited on the supporting element 2, 2*a*, 2*b* in such a way to have the identification tag substantially aligned to said reference. In an embodiment this allows the reading of the tag or the check of the azimuthal aligning on the reference, also from above. A particular embodiment of the device 1 herein described can be provided with a mirror that allows to carry out the reading of the tag or the check of the azimuthal aligning from above. In an embodiment, this mirror is positioned laterally with respect to the supporting element 2, 2*a*, 2*b*, and shows a reflecting surface inclined with respect to the plane upon which lies the support 3, for example inclined of angle preferably equal to 45°, in such a way that a projection of the reflection occurs along an almost vertical axis.

A correct identification of the azimuthal aligning allows to maintain the reference of the position of possible areas of growth of bacteria or viruses on the culture medium, even where the support 3 shall undergo photographic acquisitions in subsequent moments therein.

The tag allows then to identify said reference azimuthal direction considered as direction of start of the rotation.

It is observed also that even if in use the support 3 is rigidly retained on the supporting element 2, 2*a*, 2*b*, the rotation of the support 3 around the axis Y corresponds to an angularly equal rotation of the supporting element 2, 2*a*, 2*b* around the axis Y.

The device 1 also comprises an electronic synchronization device, configured for allowing to synchronize the rotation of the supporting element 2, 2*a*, 2*b* with the time instant of acquisition of each (i-th) image of the N images of the first set Img(1,*i*), i=1 . . . N of N images Img(1,1) . . . Img(1,N). In an embodiment this electronic synchronization device is operatively connected the rotation motor of the supporting element 2, 2*a*, 2*b* and is also is operatively connected-directly or indirectly—with each of the first, second and third camera 6, 7, 8. In an embodiment, the electronic synchronization device comprises an encoder that acts in synchronization between the motor and one or more among the first camera 6, the second camera 7, the third camera 8.

Given a set of N images, the first image framed by the first camera 6 will correspond always to a zero angle of rotation with respect to said reference azimuthal direction considered as direction of start of the rotation, the second image framed by the first camera 6 will correspond always to a predefined angular increase Δ with respect to al said zero angle, the third image framed by the first camera 6 will correspond always to a predefined angular increase Δ with respect to the second image and so on. Therefore, by repeating then in different moments (for example, with a one day distance) the acquisition of the N images of the first set Img(1,*i*), i=1 . . . N of N images Img(1,1) . . . Img(1,N) with the first camera 6, there will be the certainty that the i-th image framed in a first time instant (in the example, the day before) will be angularly corresponding to the i-th image framed in the second time instant (in the example, the day after).

In an embodiment, the predefined angular increase Δ varies according to the combination of irradiation (in particular, lighting)/camera considered, but in a preferred embodiment the predefined angular increase Δ is kept for all the combinations of irradiation (in particular, lighting)/camera in such a way that the i-th image of a set of images can be compared with an i-th image itself of another set of images obtained with a different combination between irradiation (in particular, lighting) and camera.

Figure 11:
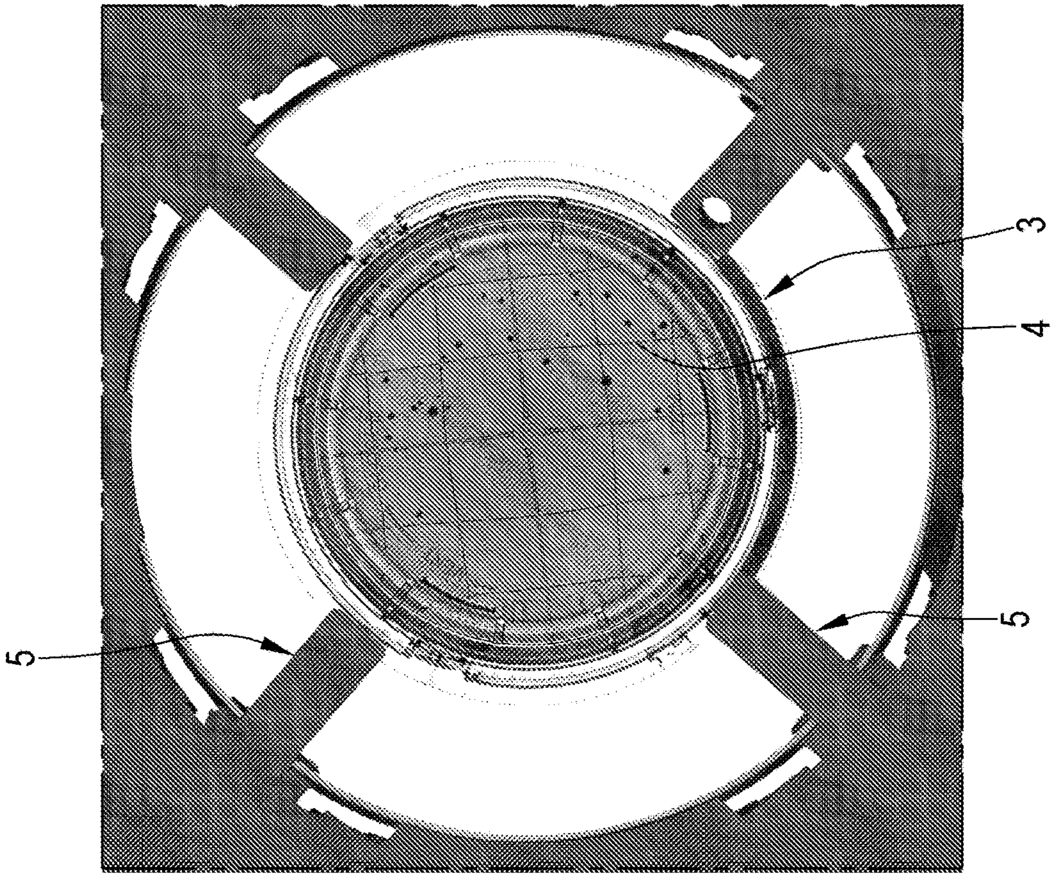
FIG. 11 shows a picture of a support for biological samples obtained by framing said support from a direction from above and inclined with respect to a direction of rotation of the support and along a first framing way, from an inner portion toward an outer portion.

For maintaining a positional reference also in relation to the rotation of the supporting element 2, 2*a*, 2*b*, in an embodiment one among the four pushers 5 can have a marking, for example a hole, that can be identified by at least one among the first, the second and the third camera 6, 7, 8 in such a way that it can be established a positional relation, in particular azimuthal, between the support 3 and the supporting element 2, 2*a*, 2*b*. This hole is visible in FIGS. 9, 10, 11.

Acquisition of Images in Proximity of the Edge of the Support 3, and Mitigation of Meniscus Effects The Applicant has conceived a specific and non-limiting embodiment of the device 1 conceived for reducing the negative effects of acquisition of images from directions inclined in proximity of the edge of the support 3. Generally, the Applicant has conceived a device 1 for observing and for acquiring images of biological samples comprising:

- a supporting element 2, 2*a*, 2*b* configured for housing a support 3 for biological samples;
- at least a first camera 6 oriented toward the supporting element 2, 2*a*, 2*b* and configured for framing at least a portion of the supporting element 2, 2*a*, 2*b* and/or, in use, at least a predefined portion of the support 3 when housed on the supporting element 2, 2*a*, 2*b*, from a first observation point P1 and at least along a first inclined main direction of observation, wherein the predefined portion of the support 3 comprises, in use, a biological sample;
- at least a first optical radiation source 10 configured for irradiating at least said predefined portion of the support 3 from a first irradiation direction, in such a way that, in use, at least a predefined portion of the biological sample is irradiated through the optical radiation of the first optical radiation source 10;
- an actuator, in particular a motor, configured for moving the supporting element 2, 2*a*, 2*b* and the support 3 therein housed with respect to at least the first camera 6 and/or for moving the first camera with respect to the supporting element 2, 2*a*, 2*b* and to the support 3 when therein housed.

The device 1 is configured for activating at least the first camera 6 and the actuator for generating, preferably during the movement of the supporting element 2, 2*a*, 2*b* and of the support 3 and/or of the first camera 6 by the actuator, at least a first main image and at least a first auxiliary image relative to a same first predefined portion of said support 3 or of said biological sample.

The first main image is acquired at least by the first camera 6 along said first main direction of observation and the first auxiliary image is acquired from an auxiliary direction of observation coplanar to the first direction of observation and symmetrically arranged with respect to a vertical axis perpendicular to a horizontal plane of the supporting element 2, 2*a*, 2*b* and/or of the support 3 for biological samples.

A so general embodiment of the device 1 corresponds to an equivalent method for observing and acquiring images of biological samples.

In an embodiment, the device 1 comprises also an actuator, in particular a motor, configured for moving the first optical radiation source 10, optionally in synchrony with the first camera 6 or with said support 2, 2*a*, 2*b*. This actuator can be the same used for moving the first camera 6 or the supporting element 2, 2*a*, 2*b* or alternatively be a different actuator. In this latter case there will be then a first actuator configured for moving the first camera 6 or with said support 2, 2*a*, 2*b* and a second actuator for moving the first optical radiation source 10.

In a first embodiment, the device 1 comprises one only (first) camera 6, and the support 3 is rotated around a substantially vertical axis Y.

In this case the only (first) camera 6 is arranged in such a way to frame an image of at least a portion of the support 3 from a direction oblique with respect to the support 3 and with respect to the vertical of the support 3. The axis of framing of the first camera 6 is indicated with Z, and forms a predefined first angle of framing a with respect to a substantially horizontal axis K. Preferably, but non-limiting thereto, the first angle of framing α is comprised between 10° and 80°, more preferably between 20° and 70°.

Therefore the first main direction of observation is inclined with respect to a zenithal plane of said supporting element 2, 2*a*, 2*b* and is inclined with respect to an azimuthal plane of said supporting element 2, 2*a*, 2*b* and/or is inclined with respect to a plane on which lies said supporting element 2, 2*a*, 2*b* and is inclined with respect to an orthogonal plane with respect to the plane upon which lies said supporting element 2, 2*a*, 2*b*.

In an embodiment, the first angle of framing is fixed, and is determined by a specific mounting configuration of the cameras on the frame of the device 1. However the Applicant has conceived an embodiment wherein, even if not during the step of acquisition of the images, the position of the first camera 6, in particular the inclination of the first camera 6, can be adjusted—manually or automatically—on an angle comprised in the ranges [10°-80°] and more [20°-70°].

With the first camera 6 and, where present, through the second camera 7 and, where present, the third camera 8, can be acquired detailed views of the biological material sample even if this is in substantial contact to or proximity of the side wall of the support 3.

Figure 8:
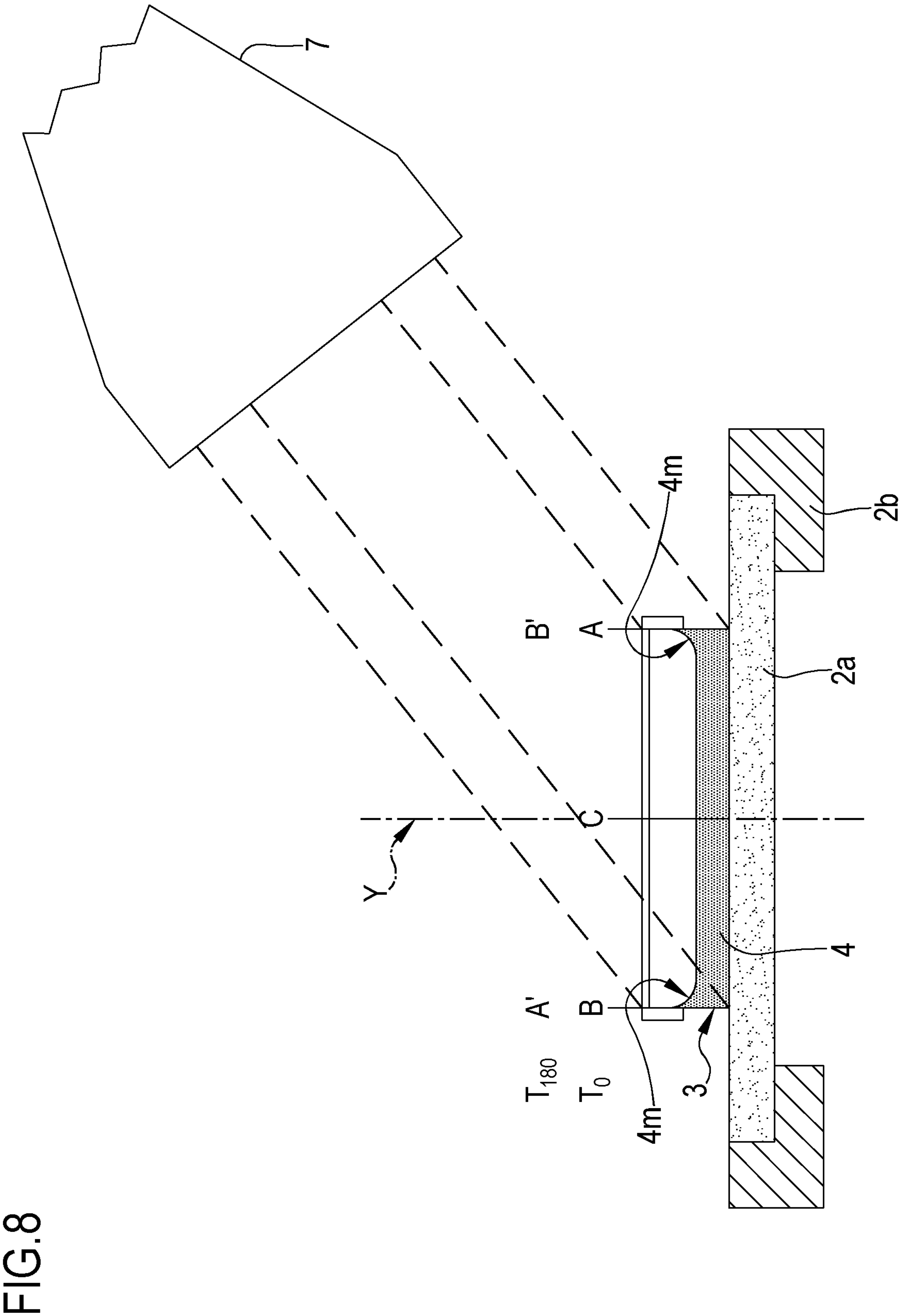
FIG. 8 shows a sectional view of part of the device object of the present disclosure wherein it is visible a specific framing direction from above, inclined with respect to a rotation axis of the support, between a first time instant and a second time instant.

As shown in detail in FIG. 8, where in particular the biological sample is substantially liquid, it will tend to form a meniscus with the side wall of the support 3. The observation of the biological sample along a direction substantially inclined with respect to the vertical, if carried out without the rotation of the support 3, shows a shadow portion in correspondence of the portion of biological sample nearest to the second camera 7, precisely due to the presence of the meniscus 4*m*. In FIG. 8 this shadow portion is substantially the one on the right, in the biological sample. According to the present disclosure it is observed that the meniscus 4*m* can be of the negative type, i.e. locally detecting a concavity directed upwards (preferably, directed toward a direction at least partially opposed with respect to the direction of the weight force), or positive, i.e. locally detecting a concavity directed downwards, and i.e. with a convexity directed upwards (preferably, then, the convexity is directed towards a direction at least partially opposed with respect to the direction of the weight force). Through the rotation of the support 3, this negative effect is cancelled.

With specific regard to the menisci and the curvature assumed by the culture medium within the support 3, the Applicant has observed that as the diameter of the support 3 varies, or more generally as the size of the support 3 varies, several conditions can occur, among which: the presence of a meniscus with convexity directed upwards in correspondence of the edges of the support 3 (junction between the bottom wall and the side wall) with concomitant lowering of the height of the culture medium (upward concavity) in correspondence of the central portion of the support 3, or—on the contrary—presence of a negative meniscus with concavity directed upwards in correspondence of the edges of the support 3 (junction between the bottom wall and the side wall) and convexity directed upwards in substantial correspondence of the central portion of the support 3.

In FIG. 8 are indicated the letters A, B, and C, that respectively detect a first end, a second end, and a center, of the support 3. At time T0, the support 3 lies in a first spatial configuration non rotated with respect to the second camera 7, the first end A is the one nearest to the second camera 7 and the second end B is the most remote one with respect to the second camera 7.

Through the letters A, B, C are defined:

a first geometric radius AC;

a second geometric radius CB;

a geometric diameter AB.

The first and the second geometric radius AC, CB detect respectively a first portion and a second portion of the support 3, and these portions are juxtaposed (in correspondence of center C), counterposed and aligned, and include a common point (the point C) which represents the center of the support 3.

In a subsequent time instant, indicated in figure as T180, the support 3 lies in a second spatial configuration rotated with respect to the first spatial configuration, and in detail rotated by 180° around the axis Y. Consequently, at time T180, the first end A (indicated in the upper row as A') is the most remote with respect to the second camera 7 and the second end B (indicated in the upper row as B') is the closest to the second camera 7. At time T180, the right meniscus which could have caused a shadow area is now to the left in the image, and the portion of biological sample therein corresponding can be advantageously photographed. Between the time T0 and the time T180 can elapse a user-defined time or can be fixed and predetermined in the step of designing of the device 1; for example and non-limiting thereto 1 s or 2 s or 3 s (angular speed of rotation of the support 3 on the axis Y by 180°/s, 90°/s, 60°/s).

This means that in an embodiment, through the second camera 7 and/or through the third camera 8 (and, then, through a camera inclined with respect to the axis Y) it is possible to generate a dual set of images Img(2,*i*) with i=1 . . . M in the following manner:

- a first time the set of images Img(2,*i*) with i=1 . . . M is acquired by photographing a geometric radius proximal to the camera to which we refer;
- a second time the set of images Img(2,*i*) with i=1 . . . M is acquired by photographing a geometric radius distal to the camera to which we refer.

Referring specifically to FIG. 8, this means that, for example considering the second camera 7, a dual set of images Img(2,*i*) with i=1 . . . M is generated in the following manner:

- a first time, the set of images Img(2,*i*) with i=1 . . . M is acquired by photographing a geometric radius AC;
- a second time, the set of images Img(2,*i*) with i=1 . . . M is acquired by photographing a geometric radius CB.

Referring specifically to FIG. 8, the geometric radius AC detects the proximal geometric radius and the geometric radius CB detects the distal geometric radius.

The fact that in the specific embodiment herein described it is expressed that the sets of images Img(2,*i*) with i=1 . . . M are acquired by photographing a geometric radius does not preclude the possibility of acquiring the sets of images Img(2,*i*) with i=1 . . . M by photographing geometric integer diameters and then, where necessary or desired, electronically excluding part of said diameter.

This means that the first time, the set of images will see the meniscus formed by the culture medium in a substantially "covering" or proximal position with respect to the second camera 7; the second time the set of images will see the meniscus formed by the culture medium in a substantially "visible", or distal, position with respect to the second camera 7.

The above implies that imagining holding still the support 3 in relation to the camera, the first main image can correspond to an image of a diameter AB of the support 3 wherein A is the point most proximal to the first camera 6, and the auxiliary image can correspond to an image of a diameter BA of the support 3 wherein B is the point most proximal to the first camera 6.

Figure 9:
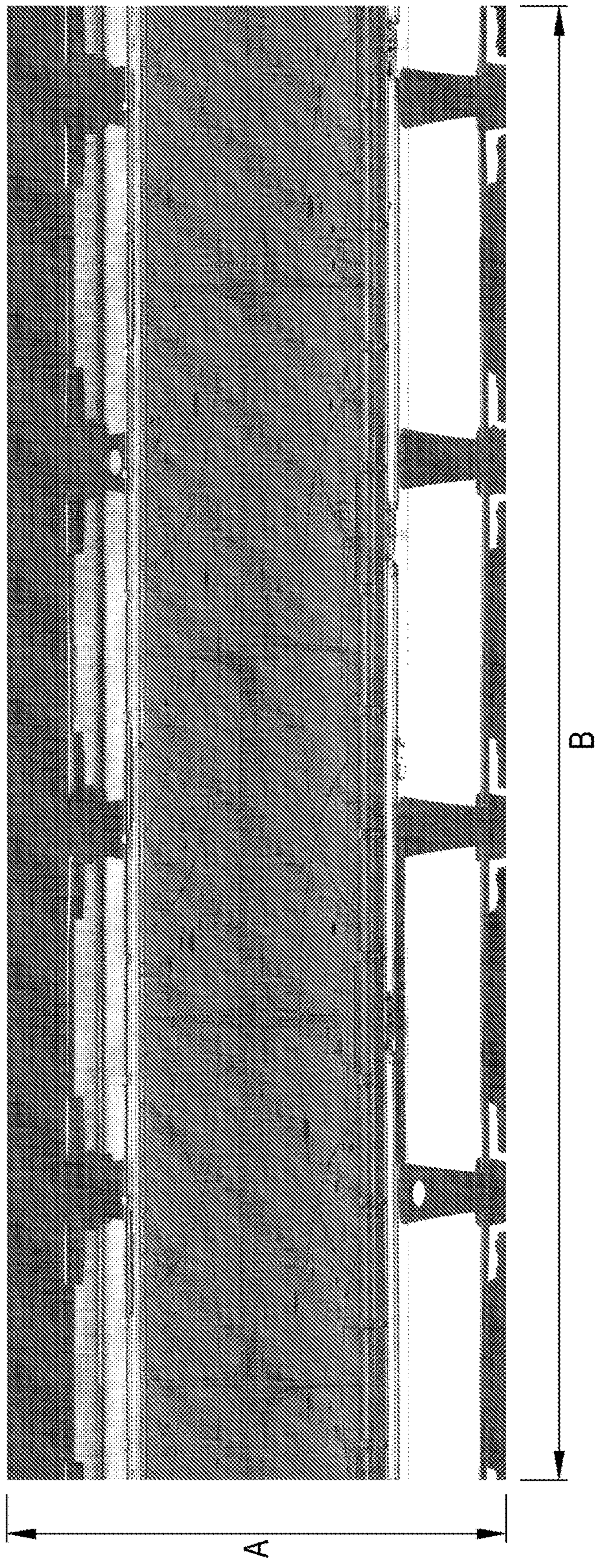
FIG. 9 shows a linear picture of a support for biological samples obtained by juxtaposing a plurality of substantially linear images of part of the support for biological samples, said plurality of images being framing by a camera among the plurality of cameras of the device.
Figure 10:
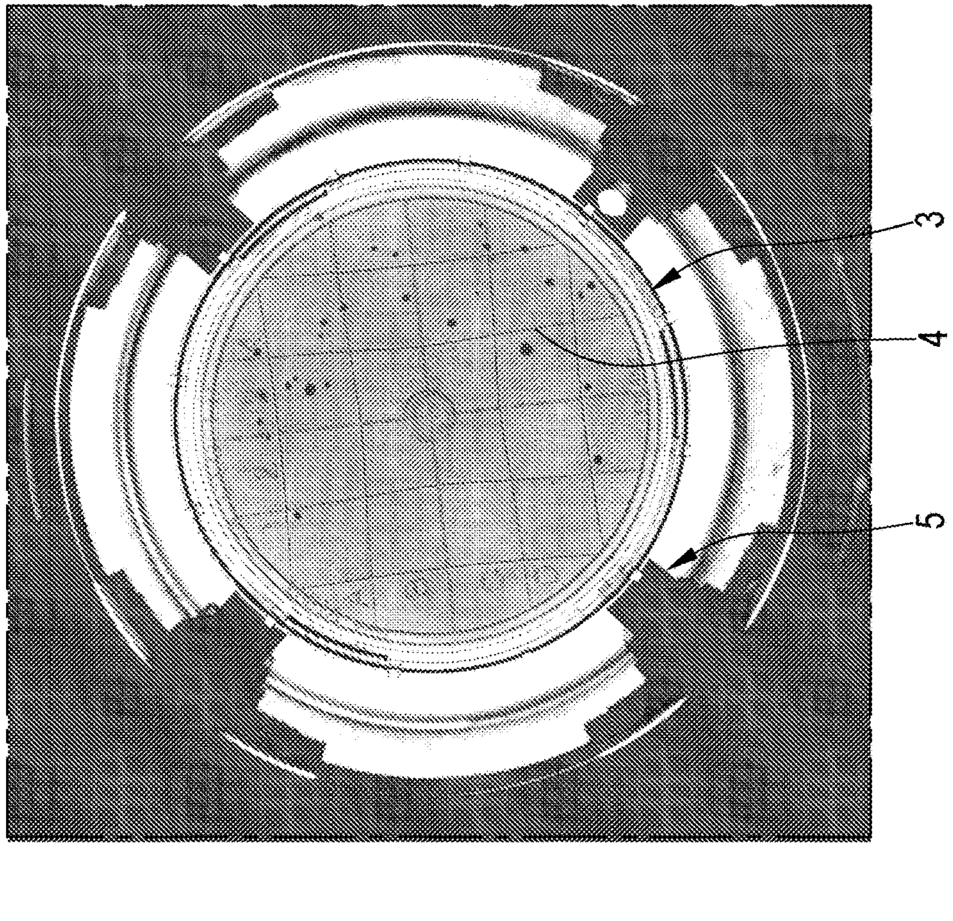
FIG. 10 shows a picture of a support for biological samples obtained by framing said support from a direction from above and inclined with respect to a direction of rotation of the support and along a first framing way, from an outer portion toward an inner portion.

FIG. 9 shows a graphical representation of an intermediate image, obtained by juxtaposing the plurality of images of a set of images acquired by means of one between the first and the second camera. Since the images of the set of images are acquired by means of a rotation of the support 3, a checkerboard grid present on the support 3 is represented with curves in the image in FIG. 9. The intermediate image is used, as will be better described hereinafter, for generating one or more reconstructed images.

In FIG. 9, for example, the point C can correspond to a central portion of the image along the axis A, and the point A to an end of the image of the support 3 along the axis A.

In another embodiment the movement of the support 3 is not carried out by rotation, but by translation, in particular through a step of linear translation of the supporting element 2, 2*a*, 2*b* to which the support 3 is constrained. This can be in particular useful where the support 3 is not circular shaped.

In an embodiment this implies that the support 3 is translated, preferably linearly, and during its translation is acquired a first main image. Subsequently the support 3 is rotated and translated again. The rotation can be for example by 180°, or by 360°.

A synchronization device, operatively connected with an actuator for the movement of the supporting element 2, 2*a*, 2*b*, allows to generate an auxiliary image of the support 3 in the same position, but in the opposite way. By doing so, two images are generated, a first main image of a segment AB of the support 3 (such a segment, particularly if the support 3 is circular, is a diameter) and a first auxiliary image of a segment BA of the support 3.

The Applicant has conceived another embodiment wherein the supporting element 2, 2*a*, 2*b* is maintained fixed, and is the first camera 6 to move, in particular to rotate or translate (preferably linearly) with respect to the supporting element 2, 2*a*, 2*b* and then, in use with respect to the support 3.

Another embodiment of the device 1 object of the present disclosure is such that both the first camera 6 and the supporting element 2, 2*a*, 2*b* move, generating a reciprocal movement wherein, simultaneously, two actuators respectively move the first camera 6 and the supporting element 2, 2*a*, 2*b*. The above-described conditions apply.

The Applicant has finally conceived another embodiment wherein there are two cameras that, preferably simultaneously, generate said first main image and the first auxiliary image at a substantially same time instant. Said main and auxiliary image can be any of the images described herein, generated through one of the cameras described herein.

In a specific embodiment there are in particular the first camera 6, with the above-described characteristics and a second camera 7 oriented toward the supporting element 2, 2*a*, 2*b* and configured for framing at least the portion of the supporting element 2, 2*a*, 2*b* and/or, in use, at least the predefined portion of the support 3 when housed on the supporting element 2, 2*a*, 2*b*, from a second observation point P2 and at least along the auxiliary direction of observation inclined. In particular, the device 1 is configured for generating the first main image through the first camera 6 and the first auxiliary image through the second camera 7.

In use, therefore, there is a step of observation of the support 3 through the first camera 6 and the second camera 7, from—respectively—a first observation point (P1) and a second observation point (P2) and, always respectively, along the main direction of observation (first camera 6) and an auxiliary direction of observation (second camera 7) which are both inclined.

In use, the functioning of the device 1 determines a step of generation of images wherein the first main image is generated through the first camera 6 and the first auxiliary image is generated through the second camera 7, preferably wherein the first main image and the first auxiliary image are generated in a substantially same time instant.

In this case, for allowing to reconstruct the image of the support 3 as a whole, it is not anymore necessary a rotation of the support 3, but is sufficient a translation, in particular a linear translation, for acquiring, through a plurality of main images and a corresponding plurality of auxiliary images, the whole image of the support 3 so as to eliminate the negative effects deriving from a single framing point.

Creation of the Reconstructed Image

Figure 12:
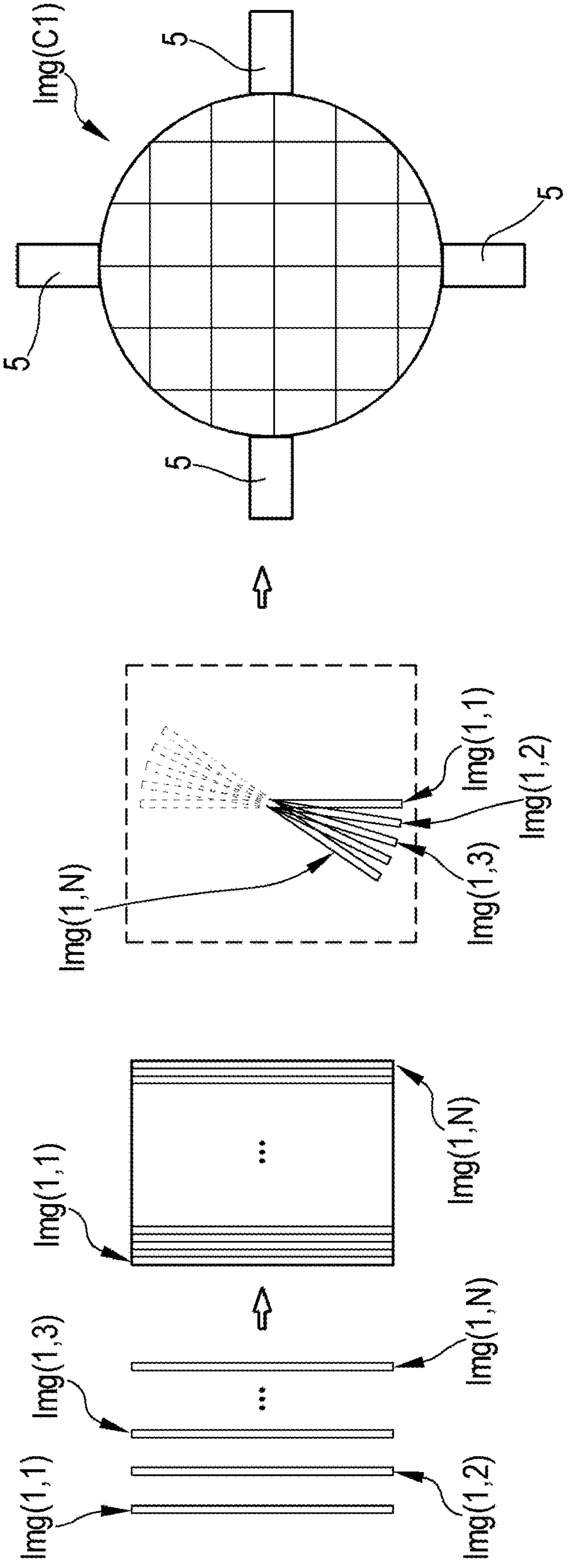
FIG. 12 shows a representative drawing of the generation of an intermediate image and of a subsequent reconstructed image obtained by rotation of a plurality of images acquired by one or more cameras.

Reference is made to FIG. 12 to describe a procedure preferably automated and carried out via software for generating a reconstructed image that, starting from a plurality of linear images, graphically represents substantially the framed object, in this case the support 3, in the form that it actually has.

The device 1 object of the present disclosure comprises a data processing unit that is designed and/or programmed for generating at least a reconstructed image Img(C1) deriving from an electronic processing of the plurality of images of at least one among the first, the second and the third set of images.

The device 1 object of the present disclosure is in particular configured for regenerating, starting from the plurality of images being part of at least one among the first, the second and the third set of images, a reconstructed image Img(C1) the aspect thereof substantially represents the one of the plane view of the support 3.

Since the images of the first set of images Img(1,*i*), with i=1 . . . N are obtained from a rotation of the support 3, the composite image is generated with a software processing that combines in rotation at least part of the N images Img(1,1) . . . Img(1,N) of the at least a first set Img(1,*i*), i=1 . . . N of N images.

In detail, this software rolls the intermediate image around a rotation point that is arranged in a predefined portion of the intermediate image, in particular around the center of the intermediate image itself and/or around the center of the support (3) and/or in correspondence of a substantially central portion of the biological sample of said support (3), preferably but non-limiting thereto at the beginning of the side of the intermediate image itself. This rotation point corresponds to an end point of one of the N images of the first set of images. Being each of said N images a linear image, the end point is taken along the direction of maximum extension of the image itself, i.e. on the line along which the image develops itself. This software, then, carries out the rolling of the intermediate image with transformation from a polar reference system to a Cartesian reference system.

In an embodiment, therefore, the software rolls the intermediate image containing the images Img(1,*i*), with i=1 . . . N of the first set of images juxtaposed to each other by an angle of 360° (round angle) starting from a position of rotation start. The rotation takes place preferably electronically considering, then via software or through appropriated control unit, a rotation axis orthogonal with respect to the plane to which refer the images, then to the plane upon which lies the support 3.

In an embodiment, the software processes the intermediate image in the following way. When the intermediate image shown in FIG. 9 has been generated by a camera capable of integrally framing a substantially diametric portion of the support 3, the extension along the axis A of the portion of the support shown detects a diameter. The extension along the axis B detects the development deriving from the juxtaposition of many diametric images along the axis B, until a complete rotation of the support 3. The axis B is considered juxtaposition axis of the images of each set.

The software in this case subdivides the intermediate image in a first sub-image and in a second sub-image, ideally in correspondence of half extension of the intermediate image along the axis A. This half extension of the intermediate image detects the center point of the support 3.

For carrying out the detection of the center of the support 3, before proceeding with the acquisition of the images it is carried out a step of preventive calibration, by means of dime.

The step of preventive calibration allows to detect a number Δpix of pixel which differentiate half of the image along the axis A with respect to the effective center of the support 3 and/or with respect to the axis of the camera that frames from a substantially orthogonal direction with respect to the rotation axis of the supporting element 2, 2*a*, 2*b*. Assuming that the extension of the image along the axis A is equal to 4096 pixel (and then half image would correspond to the 2048° pixel) due to an imperfect centering of the support 3 on the rotation axis the step of preventive calibration can determine that the center of the support 3 is offset by 14 pixels, then Δpix=14. Therefore, only ideally the first sub-image and the second sub-image show an equal number of pixel. In the majority of practical cases, the first sub-image and the second sub-image show, along the axis A, different extensions.

Assuming that the extension along the axis B of the intermediate image is of 12000 pixel, it would result that the first sub-image would show the extension of 4096−Δpix×12000 pixel and the second sub-image would show the extension of 4096+Δpix×12000 pixel.

It is defined, through the software, a rotation point on the "central" portion of the intermediate image. As "central" it is intended according to the above. The central rotation point on the intermediate image lies, then, on a side (along the axis B, or juxtaposition axis) of each sub-image, and the rolling occurs by centering all the single images originally juxtaposed on the central point and proceeding step by step with a progressive rotation up to 360°, thus until obtaining a reconstructed image that allows viewing the support 3 as it is in reality.

When the intermediate image has, instead, been generated by a camera capable of partially framing a substantially diametric portion of the support 3, the extension along the axis A of the portion of the support shown detects a radius. The extension along the axis B detects the development resulting from the juxtaposition of many images of radius along the axis B, until a complete rotation of the support 3. In this case, there is no need to subdivide the intermediate image into a first sub-image and into a second sub-image, and the rolling takes place directly on one side of the intermediate image. Clearly, in this case, it is not possible to generate two points of view.

The Applicant observes that it has been conceived a particular embodiment of the device 1 that comprises only one camera, and that in detail comprises:

- a supporting element 2, 2*a*, 2*b* configured for housing a support 3 for biological samples;
- at least a first camera 6 oriented toward the supporting element 2, 2*a*, 2*b* and configured for framing at least a portion of the supporting element 2, 2*a*, 2*b* and/or, in use, at least a predefined portion of the support 3 when housed on the supporting element 2, 2*a*, 2*b*, from a first observation point P1, wherein said predefined portion of the support 3 comprises, in use, a biological sample;
- at least a first optical radiation source 10 configured for irradiating at least said predefined portion of the support 3 from a first irradiation direction, in such a way that, in use, at least a predefined portion of the biological sample is irradiated through the optical radiation of the first optical radiation source 10;
- an actuator, in particular a motor, configured for rotating the supporting element 2, 2*a*, 2*b* and the support 3 therein housed in use, around a rotation axis Y, preferably centered on the supporting element 2, 2*a*, 2*b* and/or on the support 3, and/or for rotating at least said first camera 6 with respect to said supporting element 2, 2*a*, 2*b* and to said support 3 therein housed;

the device 1 being configured for activating at least the first camera 6 and the actuator for generating, preferably during the actuation in rotation of the supporting element 2, 2*a*, 2*b* and of the support 3, and/or of the first camera 6 carried out by the actuator:

- at least a first plurality or first set Img(1,*i*), i=1 . . . N of N images Img(1,1) . . . Img(1,N) of predefined N portions of the support 3, wherein each image of the first plurality or first set Img(1,*i*), i=1 . . . N of N images Img(1,1) . . . Img(1,N) is acquired in correspondence of at least a predetermined detection angular position, optionally fixed, and of a respective and rotation angle thereof of the supporting element 2, 2*a*, 2*b* and of the support 3 with respect to a starting angular position.

Other embodiments of the above device 1 optionally show one or two additional cameras, which correspond to the second camera 7 and the third camera 8; the description of characteristics of said cameras is not repeated so as not to cause undue lengthening of the present description.

Other embodiments of the above device 1 can optionally show one or more additional optical radiation sources, which correspond to the second optical radiation source 11 and to the third optical radiation source 9.

The characteristics of the above mentioned first camera are described before and therefore are not again here indicated. It is observed in particular that the first camera 6, in this specific embodiment, can be arranged in such a way to have a framing axis inclined with an acute angle with respect to the plane upon which lies the supporting element 2, 2*a*, 2*b* and/or the support 3. This acute angle can be comprised in the range [10°-80°], more preferably comprised in the range [20°-70°].

In an embodiment, the device 1 object of the present disclosure is configured for generating, through the above-described process:

- a first reconstructed image Img(C1) from the first set of images Img(1,*i*), with i=1 . . . N acquired with the first camera 6;
- a second reconstructed image Img(C2) from the second set of images Img(2,*i*), with i=1 . . . M acquired with the second camera 7;
- a third reconstructed image Img(C3) from the third set of images Img(3,*i*), with i=1 . . . W acquired with the third camera 8.

It has been previously described that through the second camera 7 and/or the third camera 8 a dual set of images can be generated in the following manner:

- a first time the set of images is acquired by photographing the geometric radius AC;
- a second time the set of images is acquired by photographing the geometric radius CB.

With respect to the second camera 7, the geometric radius AC is a proximal radius, whereas the geometric radius CB is a distal radius.

In a specific and non-limiting embodiment, with the cameras inclined with respect to the axis Y, then with the second camera 7 and with the third camera 8, are generated, for each camera, two reconstructed images Img (Ci) (i=1;2), a first one thereof is generated from the intermediate image generated with the proximal geometric radii of the support 3 and a second one thereof is generated from the intermediate image generated with the distal geometric radii of the support 3.

In a specific and non-limiting embodiment, then, after the acquisition of the images through the first, the second and the third camera, are generated the following reconstructed images:

- a first reconstructed image Img(C1) deriving from the combination of activation of the first camera 6 and of the first optical radiation source 10;
- a second reconstructed image Img(C2) deriving from the combination of activation of the first camera 6 and of the second optical radiation source 11;
- a third and a fourth reconstructed image Img(C3), Img (C4) deriving, each one, from the combination of activation of the second camera 7 and of the first optical radiation source 10, respectively considering said proximal (third reconstructed image Img(C3)) and distal (fourth reconstructed image Img(C4) geometric radii;
- a fifth and a sixth reconstructed image Img(C5), Img(C6) each one, from the combination of activation of the second camera 7 and of the second optical radiation source 11, respectively considering said proximal (fifth reconstructed image Img(C5)) and distal (sixth reconstructed image Img(C6)) geometric radii;
- a seventh, eighth, nineth and tenth reconstructed image Img(C7), Img(C8), Img(C9), Img(C10), deriving from the combination of the third camera 8 and of the third optical radiation source 9, respectively considering:
  - only variations of height of the culture medium, and considering proximal (seventh reconstructed image Img(C7) and distal (eighth reconstructed image Img (C8) geometric radii;
  - only variations of luminosity of the culture medium, and considering proximal (nineth reconstructed image Img(C9)) and distal (tenth reconstructed image Img(C10) geometric radii.

In particular, this means that, above the images framed by the at least a camera, and in particular by the third camera, at least an image (whether it is an raw, intermediate or reconstructed image) is an electronic image containing indicative data of a height variation of a culture medium with respect to a predefined reference height, and at least an image (again, whether it is an raw, intermediate or reconstructed image) is an electronic image containing indicative data of a variation of intensity of reflection or diffusion of optical radiation of at least part of the biological sample (in particular, of the culture medium and/or of a microorganism colony, in particular fungi, preferably molds and yeasts, and/or a bacterial and/or viral colony) and/or of the support 3 with respect to a reference intensity value of reflection and/or diffusion of the optical radiation (this value, can also be zero intensity).

In a preferred and non-limiting embodiment the reconstructed images (in particular each of the ten reconstructed images) are processed through a colony counting software which is configured and specifically destined to provide at least an electronic data containing a number of bacterial and/or viral colonies detected in each one of the processed images. The counting software combines the information of the different images previously acquired. For avoiding counting the colonies two times, it takes into account the coordinates of the colonies on the various images and counts one time the colonies of which the coordinates are coinciding. In particular, the software associates the acknowledgement of each colony a bidimensional coordinate on the image, and can for example and optionally associate a flag of presence of a colony on one or more bidimensional coordinates of the image. Working on a plurality of images, the software carries out a comparison of flags on the bidimensional coordinates.

The colony counting software can be integrated, then executed by the data processing unit of the device 1, or can be a software carried out by an outer computer with respect to the device 1, and this computer receives as input said reconstructed images.

It is observed that the generation of ten reconstructed images Img(C1)-Img(C10) defines the completion of a cycle of acquisition of images through the three cameras. Since some embodiments of the device 1 object of the present disclosure and equivalently some embodiments of the method here described can use also a single camera and/or optical radiation source, appears then clear that the cycle of acquisition of images, in those cases, will not necessarily comprise the generation of ten images, and in particular will not necessarily comprise the generation of ten reconstructed images.

However, preferably, when the device 1 has more than one camera and/or has more than one optical radiation source, during the cycle of acquisition of images the movement of the supporting element 2, 2*a*, 2*b* and in particular the rotation of the supporting element 2, 2*a*, 2*b* around the axis Y will be maintained continuously active.

Optical Characteristics of Camera Lenses

In a preferred, but non-limiting, embodiment, at least the second camera 7 and, optionally the third camera 8, show an objective configured for correcting perspective and/or focus distortions deriving from the angle (first angle of framing $\alpha$, in the case of the second camera 7, and second angle of framing $\beta$ in the case of the third camera 8), assumed by the camera with respect to the horizontal axis K, and thus to correct those perspective and/or focus distortions that derive from the fact that the first observation point P1 and the second observation point P2 are points of observation that form an acute angle with respect to the plane upon which lies the supporting element 2, 2*a*, 2*b*.

The objective operates according to the Scheimpflug's condition; the Scheimpflug's rule or condition affirms that, for an optical system, the focal planes of the objective and of the subject meet on a same straight line. It is possible to compensate for a loss of focus between two portions of an image, one closer and one more distant, by tilting the axis of the objective with respect to the axis of the sensor and with respect to the plane of the image. In an embodiment, the objective of the second camera 7 and, where present, of the third camera 8, is an objective of a decentrable or tilting type, which allows the inclination of its optical axis with respect to the focal plane. Thanks to this aspect, the nearest and remotest portions of the support 3, and thus of the biological sample, can be kept correctly focused in the acquisition of a single image. In a preferred embodiment, in use the decentering or tilting of the objective is kept fixed during the operational use; this means that the device is not conceived to be adjusted in decentering or tilting during the acquisition of images. The correct level of decentering or tilting is carried out during the step of setting-up of the device 1, and a step of correction of perspective and/or focus distortions is carried out before the activation of at least one among the first camera 6, the second camera 7 and the third camera 8 and/or before the generation of at least one among the first image, the second image, the third image and/or the main image and/or the auxiliary image here described.

Since the angular relationship between the cameras non-aligned with the axis Y and the supporting element 2, 2*a*, 2*b* is defined and fixed, the adjustment of the decentrable or tilting objective can be advantageously carried out only during the step of realization or installation of the machine; typically, there is no need of adjusting during the framing of the images, since during the rotation the supporting element 2, 2*a*, 2*b* is maintained well fixed on a same plane.

It is observed in particular that the first camera 6, being aligned with the axis Y, does not need a decentrable and/or tilting objective. Anyway, it is important that the at least a camera that is not aligned to the axis Y has a decentrable and/or tilting objective for operating according to the Scheimpflug's condition. The greater is the area of the support 3 and the more important is the out-of-focus compensation that an objective operating according to the Scheimpflug's condition allows.

Preferably, but non-limiting thereto, the first camera 6 shows a telecentric type of optics, capable of strongly mitigating, and for practical purposes substantially canceling, image distortions and/or perspective errors.

In another embodiment, also the second camera 7 has a telecentric type of optics and/or with an objective operating with the Scheimpflug condition.

Focusing Device

The present disclosure also refers to a device 1 which comprises a focusing device, configured for optimizing the focusing of the biological sample when framed by the first camera 6 and/or by the second camera 7 and/or, when present, by the third camera 8.

In particular it is here described a device 1 for observing and for acquiring images of biological samples comprising:

- a supporting element 2, 2*a*, 2*b* configured for housing a support 3 for biological samples;
- at least a first camera 6 oriented toward the supporting element 2, 2*a*, 2*b*, wherein said first camera 6 is configured for framing at least a portion of the supporting element 2, 2*a*, 2*b* and/or, in use, at least a predefined portion of the support 3 when housed on the supporting element 2, 2*a*, 2*b*, from a first observation point P1;
- at least a first optical radiation source 10 configured for irradiating at least said predefined portion of the support 3 from a first irradiation direction, in such a way that, in use, at least a portion of the biological sample is irradiated through the optical radiation of the first optical radiation source 10;
- a focusing device, configured for causing, in use, a variation of a distance existing between said first camera 6 and the supporting element 2, 2*a*, 2*b* and, when therein housed, the support 3,
- wherein said variation of distance determines an optimization of the focusing of the biological sample contained in the support 3.

In a preferred but non-limiting embodiment, the focusing device is configured for causing, in use, a variation of a distance between the first camera 6 and/or the second camera 7 and/or the third camera 8 and the supporting element 2, 2*a*, 2*b*. Preferably, the variation of distance is a micrometric variation. This allows causing a very accurate focusing variation.

In an embodiment, the focusing device comprises a servomechanism configured for causing a movement of the supporting element 2, 2*a*, 2*b*; with the movement of the supporting element 2, 2*a*, 2*b* relatively to at least one between the first camera 6, the second camera 7 and, where present, the third camera 8, said focusing variation is obtained. Preferably, this servomechanism comprises an electric motor, in particular a stepper motor.

In a preferred embodiment, the movement of the supporting element 2, 2*a*, 2*b* with respect to one or more cameras takes place along the axis Y; in particular, in an embodiment the supporting element is raised or lowered, with one linear translation, to place the image of the biological sample in focus. The movement of the supporting element 2, 2*a*, 2*b* is controlled by the processing unit. In an embodiment, the movement of the supporting element 2, 2*a*, 2*b* along the axis Y, occurs before the acquisition of the images of at least part of the support 3. This means that in an embodiment, the method for observing biological samples provides firstly a step of focusing which comprises a relative movement between the supporting element 2, 2*a*, 2*b* and the first camera 6 and/or the second camera 7 and/or the third camera 8 so as to cause a variation of distance that allows to determine the correct focusing of the biological sample; subsequently, where necessary, are acquired the various images of the at least part of the support 3. In particular, the step of putting into rotation the supporting element 2, 2*a*, 2*b* for causing a rotation of the support 3 around the axis Y takes place after said focusing and then occurs after the movement of the supporting element 2, 2*a*, 2*b* along said axis Y. In another embodiment, an adjustment of the focusing as above described can be carried out between an acquisition of an image and another, in particular between the activation of the first camera 6 and the activation of the second camera 7 and/or between the activation of the second camera 7 and the activation of the third camera 8 in such a way to make it possible to carry out the fine adjustments as a function of the distance and/or of the angulation assumed between each specific camera and the supporting element 2, 2*a*, 2*b*.

Even if in principle, the focusing could be obtained also by moving the cameras and/or the optical radiation sources and maintaining fixed the height assumed by the supporting element 2, 2*a*, 2*b*; however, the previously described solution appears to be more effective in terms of constructive simplicity and achievable focusing accuracy.

The focusing device is configured and specifically destined for being activated before the step of acquisition of the images through the at least one among the first, the second and the third camera 6, 7, 8. In an embodiment, the focusing device is activated one time, before the step of acquisition of the first, of the second and of the third set of images Img(1,1) . . . Img(1,N), Img(2,1) . . . Img(2,M), Img(3,1) . . . Img(3,W). In an alternative embodiment, the device 1 is configured for activating the focusing device in such a way that the focusing is adjusted specifically for each of the three cameras; this means that a first focusing is carried out before the putting into rotation of the supporting element 2, 2*a*, 2*b* for the acquisition of the first set of images Img(1,1) . . . Img(1,N) with the first camera 6, and occurs a subsequent (and second) time after the completion of the acquisition of the first set of images and before the putting into rotation of the supporting element 2, 2*a*, 2*b* for the acquisition of the second set of images Img(2,1) . . . Img(2,M) with the second camera 7. A focusing takes place then a subsequent (and third) time after the completion of the acquisition of the second set of images and before the putting into rotation of the supporting element 2, 2*a*, 2*b* for the acquisition of the third set of images Img(3,1) . . . Img(3,W) with the third camera 8.

Temperature and/or Humidity Control (Condensation) During the Acquisition of Images The device 1 here described can be provided with a device configured and specifically destined for detecting the temperature in substantial correspondence of the surface of the support 3 or of a portion of space surrounding the support 3. This device integrates at least a temperature sensor. This temperature sensor is of known type, and its technical characteristics are not then described. In a specific embodiment the device of temperature detection is activated at least when the support 3 lies on the supporting element 2, 2*a*, 2*b*.

In an embodiment, the device 1 is configured for optically analyzing a surface of the support 3, in particular if closed, and is configured for interrupting the transport of the support 3 toward the observation position P2 and/or on the supporting plane when the presence of condensation occurs. The check of the presence of condensation can be for example and non-limiting thereto carried out by means of a check of a level of reflection or diffusion of optical radiation, in particular a level of reflection or diffusion of light, along at least one direction not coinciding with the direction of propagation of the optical radiation, and optionally along a plurality of directions not coinciding with the direction of propagation of the optical radiation.

Thanks to this aspect, the acquisition of images of adequate quality is ensured and the acquisition of images of poor quality is avoided, which could lead for example to false positive or false negative results with respect to the presence of bacterial colonies or other microorganisms.

In an embodiment, should the presence of condensation be detected, the device 1 is configured for actuating the motion device 15, 5 in a substantially automated way for transporting the at least a support 3 toward the transport station without acquisition of images, thus without rotating the supporting element 2, 2*a*, 2*b* and/or without activating the camera (or the cameras, if present in a number greater than one). In an embodiment, the control of the presence of condensation can be carried out before the deposit of the support 3 on the supporting element 2, 2*a*, 2*b* and/or before the focusing. In an alternative embodiment, the control of the presence of condensation can be carried out after the deposit of the support 3 on the supporting element 2, 2*a*, 2*b*.

In a specific and non-limiting embodiment, the device 1 is configured for acquiring at least the first set of images Img(1,1) . . . Img(1,N), and preferably also the second and the third set of images Img(2,1) . . . Img(2,M) and Img(3,1) . . . Img(3,W) at a temperature substantially equal to the temperature at which the support 3 is retained in incubation in an incubator. This incubator can be part of the device 1 or be operatively associated with the device 1.

To these purposes the device 1 can comprise a conditioner configured for heating and/or cooling a portion of the device 1 substantially next to the observation position P2, in such a way that it is possible to acquire images of the support 3 and of the biological sample therein contained as much as possible without causing a formation of condensation. The conditioner is then operatively connected to the device of temperature detection and operates for causing a variation of the temperature of the support 3 or of an outer environment portion to the support 3 but in proximity of the support 3 itself. In an embodiment, the conditioner is activated at least when the support 3 is positioned on the supporting element 2, 2*a*, 2*b*; the conditioner can be however activated also under other conditions.

The acquisition of images under temperature conditions substantially equal to those of incubation limits the alteration of microorganisms in the support 3.

Analysis of Images

The device object of the present disclosure is configured for carry out a differential analysis between two distinct images of said biological sample, preferably between two distinct images of said biological sample acquired by means of a single camera selected among said first camera 6, said second camera 7 or said third camera 8.

In an embodiment, the device object of the present disclosure is configured for carrying out a differential analysis between at least a first and a second image of a biological sample, in order to determine the possible formation and/or development of bacterial and/or viral colonies.

The differential analysis is carried out by a software that is executed by the data processing unit of the device 1 itself or by a computer software that is in use operatively connected with the device 1.

In detail, in an embodiment, the differential analysis is carried out between a first reconstructed image and a second reconstructed image, and can be carried out, for example:

- on a pair of reconstructed images (or intermediate), framed by means of a same camera and in particular by means of a same combination of camera and optical radiation source (in this case it will be a first and a second reconstructed image, or intermediate, framed at significantly different times, for example each 12 hours);
- on a pair of reconstructed images (or intermediate) framed by means of cameras and/or different optical radiation sources (in this case the time of framing of images can be substantially the same for both reconstructed or intermediate images).

Preferably, the software has portions of software code that allow to define a threshold (brightness threshold, for example) and the differential analysis of images is carried out taking into account said threshold to provide in output an electronic data of presence and/or number and/or numerosity of one or more colonies of bacteria or viruses.

The differential analysis allows to mitigate the negative effects for example of a cover of the support 3 or, more generally, of a not perfect surface transparency of the support 3; in fact, because of said not perfect surface transparency, when framing images of a biological sample, also because of graphic and/or alphanumeric marks present on the bottom of the support 3, it is unfortunately possible that artifacts given by the not complete uniformity of the surface can occur. Because of possible defects or characters present or printed on the body of the support 3, particularly on the cover and/or the bottom, some colonies may in fact be visible only in one of the two images used for said differential analysis.

Since the support 3 is rotated by means of a rotation of the supporting element 2, 2*a*, 2*b*, in a preferred embodiment it is observed that for carrying said differential analysis before it is defined a predefined starting position, in particular a starting angular position, for the support 3. The reference is given in this case again by the identification tag, the reading thereof is carried out as previously described.

It is observed that the differential analysis allows to avoid opening the support 3, and consequently allows to reduce the risk of contamination of the culture medium, that would be present if the support 3 is opened, and allows to safely treat supports 3 containing highly contagious samples, precisely because an appropriate accuracy and reliability of identification can be obtained without the need to open the support 3 itself.

In an embodiment, the device 1 is configured for identifying at least a suspected region of growth of a bacterial and/or viral culture. This suspected region is herein referred to as Reg(i), with i indicating the region number. The identification is done by means of the previously mentioned software. In an embodiment, this software is configured for processing at least a portion of the image, in particular of a reconstructed image Img(C) (first reconstructed image Img (C1), second reconstructed image Img(C2) or third reconstructed image Img(C3)) for identifying one or more regions of suspected growth of said bacterial and/or viral culture.

The software is configured for carrying out a differential electronic processing of portions of images, in particular on pixels or groups of pixels clustered according to predefined algorithms, and in particular for carrying out the electronic processing by means of a neural network, in particular by means of a feed-forward or u-net type neural network for example, and more in particular a convolutional type neural network, in order to be able to reliably determine whether an actual presence or growth of a microorganism colony, in particular fungi, preferably molds and yeasts, and/or a bacterial and/or viral colony has been obtained, and in order to provide an electronic data indicative at least of a presence or absence of said at least one colony.

The processing of the mentioned portion of image follows a step of neural network training, which is not here described being defined in known literature.

Having defined as T1 a first time instant wherein is generated an image, in particular a first reconstructed image Img(C1), and defined as T2 a second, subsequent, time instant wherein is generated another image, in particular a second reconstructed image Img(C2) and defined a time Ti wherein it is generated an i-th image, in particular an i-th reconstructed image Img(Ci), the software can be configured for processing through the neural network each i-th image starting from the first, for each time instant, and providing in output, for each time instant, an i-th electronic data indicative of a presence or at least a percentage of prediction of presence or growth of a microorganism colony, in particular fungi, preferably molds and yeasts, and/or a bacterial and/or viral colony.

Motion Device of the Support for Biological Samples

The device 1 object of the present disclosure comprises a motion device 15, 5 destined to move at least a support 3. This motion device comprises a centering device, configured for retaining the support 3 in an observation position P2 on the supporting element 2, 2*a*, 2*b* and/or for determining a movement of the support 3 on the supporting element 2, 2*a*, 2*b* in order to force the achievement of the observation position P2 from the support 3. In particular, it is observed that said movement of the support 3 on the supporting element is substantially minimal, destined to optimize a centering already partially carried out through a translator, in particular through a grippers translator.

In an alternative embodiment, the translator is of substantially pneumatic type, in particular a translator configured for exerting at least temporarily a vacuum in correspondence of a surface of the support 3.

The grippers translator, which is provided with a first and a second clamp, is configured and specifically destined to deposit the at least a support 3 on the supporting element 2, 2*a*, 2*b*.

The first and the second clamp are reciprocally movable between a first configuration in which the first and the second clamp are positioned at a first distance and a second configuration in which the first and the second clamp are positioned at a second distance lower with respect to the first distance. With “first and second clamp” and “reciprocally movable”, it is intended to be included a specific embodiment wherein one of the two clamps is movable, whereas the second is fixed.

In a preferred but non-limiting embodiment, the movement of the grippers translator can occur through an actuator, in particular a motor, and more in particular an electric motor. In this case, always preferably, the grippers translator can comprise a suitable encoder for determining the position of the first and of the second clamp. Alternatively, in another embodiment, the grippers translator can comprise an actuation device or system of pneumatic type.

The first and the second clamp are configured for geometrically pairing with at least part of the support 3; in particular the first and the second clamp show a contact portion whose shape follows the one of part of the support 3 or which is anyway suitable to firmly retain the support 3. In the specific embodiment shown in the attached figures, the support 3 shows a substantially discoidal body and then the first and the second clamp show a contact portion arched and defining, in its entirety, a circumference arch profile. In an embodiment, the contact portion of at least one between the first and the second clamp is specifically configured for adapting to the outer shape of at least part of the support 3. For example this particular configuration can allow the clamps to adapt to different side profiles of the support 3, which according to the specific type can assume different diameters (for example 60 mm or 90 mm). The presence of a contact portion whose shape follows (or is configured for automatically adapting so as to follow) the one of part of the support 3, allows to develop the contact between the clamp and the support 3 along a surface sufficiently great in such a way to allow a good retaining, also in case of quick movement, and with low thrust force per area unit against the support 3. This reduces also the risk of deformation of the support 3.

In particular, in a preferred embodiment, the second distance corresponds to a size of the support 3. In the attached figures the supports 3, even if of different sizes, are substantially discoidal and for this reason they have a circular transversal section. Therefore, in a preferred but non-limiting embodiment, said second distance corresponds to the diameter of the support 3. The first configuration is a releasing configuration of the at least a support 3, in which the first and the second clamp are configured for releasing the support 3. The second configuration is a grasping configuration of the at least a support 3, in which the at least a support 3 is retained between the first and the second clamp.

In the specific embodiment of the attached figures, the centering device comprises four pushers 5. However this number is not be intended as limiting, since generally the centering device can comprise at least one pusher 5 movable between at least a first and a second position. In particular:

- the first position is a position in use spaced with respect to the support 3,
- the second position is a position in use substantially in contact with the support 3.

In particular, the first position can be a backward position, whereas the second position can be a forward position.

The at least one pusher 5, or as it will be better clarified hereinafter, the plurality of pushers, slides substantially leaning on the supporting element 2, 2*a*, 2*b*.

The centering device in particular comprises at least a first pair of pushers 5 movable along respectively a first and a second direction bent to each other; in particular the pushers of the mentioned first pair of pushers 5 can be aligned on a single straight line or direction but are movable in a first and a second way opposite to each other, oriented i.e. substantially at 180° the one with respect to the other. The pushers of the first pair of pushers move on a same plane. In particular, this plane is a horizontal plane. When there is a second pair of pushers 5, also these pushers will move on a same plane. In particular, all the four pushers can move on a same plane. It is observed that a particular embodiment of the centering device comprises an odd number of pushers.

The pushers are positioned in particular as follows:

- the first pair of pushers 5 comprises a first and a second pusher counterposed, i.e. that move along two ways opposite the one with respect to the other in approaching and in moving away;
- the second pair of pushers 5 comprises a first and a second pusher counterposed, i.e. that move along two ways opposite the one with respect to the other in approaching and in moving away.

A preferred embodiment of the device 1 object of the present disclosure presents the centering device provided with two pairs of pushers 5 configured such that the second pair of pushers is oriented at 90° with respect to the first pair of pushers. This means that one (in particular, each) pusher of the first pair of pushers 5 lies between two pushers of the second pair of pushers 5. This particular configuration allows to retain the support 3 along two diameters substantially orthogonal the one with respect to the other and allows an efficient retaining of the support 3 on the supporting element even when this supporting element is moved at high speed.

Should in use the support 3 be deposited in position not centered on the supporting element 2, 2*a*, 2*b*, and in particular not centered on the first portion 2*a* of the supporting element 2, 2*a*, 2*b*, at least one of the pushers 5 will enter into contact before the others with a side wall of the support 3 and will determine a sliding on the supporting element 2, 2*a*, 2*b*, causing a translation thereof that can be, for example, substantially linear.

In the first position the distal portions of the four pushers 5 touch a first ideal circumference, having a first diameter; in the second position, the distal portion of the four pushers 5 touch a second ideal circumference, having a second diameter lower with respect to the first diameter. This means that in an embodiment, when in the first position, the four pushers 5 present a same distance from the center of the supporting element 2, 2*a*, 2*b* detected by the axis Y. In the second position the four pushers 5 present a same distance (lower with respect to the distance assumed when in the first position) from the center of the supporting element 2, 2*a*, 2*b*. The maintaining of an equal first and second distance with respect to the center of the supporting element 2, 2*a*, 2*b* when in the first and second position, is a technical characteristic valid also for the embodiments wherein it is present a single pair of pushers 5.

It is observed that in a preferred but non-limiting embodiment, the grippers translator 15 is configured for housing at least part of the pusher 5.

At least one between said first and second clamp comprises a recess configured for allowing to house at least part of the pusher 5 and for allowing a relative movement of translation, in particular of axial translation, between the pusher 5 and the respective clamp. In the specific embodiment shown in the attached figures, the first and the second clamp comprise the recess.

In an embodiment, when actuated, the four pushers 5 two by two counterposed and arranged orthogonal in pairs move in a substantially simultaneous way. The simultaneous movement occurs with concordance of position and/or configuration; this means that all the pushers 5 are alternatively in the first position (first configuration) or in the second position (second configuration).

The stroke of the at least one pusher 5, or when present of the plurality of pushers, is determined according to the sizes and/or to the shape of the support 3. This, in an embodiment is carried out as follows: according to the dimensional data acquired through the optical reader, the device 1 actuates in an automatic way the movement of the pushers 5 such as to determine a stroke between the first and the second position that is function of the shape and/or size of the support 3. Alternatively, at least one among the pushers 5 can be provided with or operatively associated to a contact sensor configured for causing the stop when arrived in substantial contact with the support 3.

At least an actuator, or a plurality of actuators, can be used for causing, in use, the movement of the at least one pusher. In an embodiment, this actuator, or at least an actuator and the plurality of actuators comprises a motor, in particular electric. Alternatively, the actuator can be an actuator of pneumatic type.

It is then clear that to the object of the present disclosure can be applied additions, modifications or variants obvious for an expert in the art without exiting from the scope of the attached claims.

The invention claimed is:

1. Device for observing and for acquiring images of biological samples comprising:

- a supporting element configured for housing a support for biological samples;
- at least a first camera, said first camera being a linear camera oriented toward the supporting element and configured for framing at least a portion of the supporting element and/or, in use, at least a predefined portion of the support when housed on the supporting element, from a first point of observation, wherein said predefined portion of the support comprises, in use, a biological sample;
- at least a first optical radiation source configured for irradiating at least said predefined portion of the support from a first irradiation direction, in such a way that, in use, at least a predefined portion of the biological sample is irradiated through the optical radiation of the first optical radiation source;
- an actuator, optionally a motor, configured for rotating the supporting element and of the support housed therein in use, around a rotation axis, preferably centered on the supporting element and/or on the support, and/or for rotating at least said first camera with respect to said supporting element and said support housed therein;

the device being configured for activating at least the first camera and the actuator to generate, preferably during the rotational actuation of the supporting element and of the support, and/or of the first camera carried out by the actuator:

at least a first plurality or first set of N images of N predefined portions of the support, wherein each image of the first plurality or first set of N images is acquired in correspondence of at least a predetermined, optionally fixed, angular detection position and a respective and proper angle of rotation of the supporting element and of the support with respect to a starting angular position;

said device being configured for generating at least a first intermediate image obtained by juxtaposing at least part of the N images of the first set of N images;

the first set of N images comprising N linear images, the first intermediate image being obtained by juxtaposing at least part of the N images of the first set of N images along a direction orthogonal with respect to a direction of maximum extension of each of the N linear images.

2. Device according to claim 1, wherein the predetermined angular detection position is a linear portion and/or corresponds to at least a portion of a radius or a diameter of the support or to a radius or a diameter of the support and/or wherein each of said N predefined portions of the support each corresponds to at least a portion of a radius or a diameter of the support or to a radius or a diameter of the support and/or wherein the predefined portion of the support is a central portion of the support and/or wherein the first camera is configured for framing a central portion of the supporting element, said central portion of the support being a radial or diametric portion and/or wherein said central portion of the supporting element is a radial or diametric portion.

3. Device according to claim 1, wherein the linear camera is a trilinear camera.

4. Device according to claim 1, configured for generating at least a first reconstructed image, said first reconstructed image being obtained, in use, by combining in rotation at least part of the N images of the at least a first set of N images, optionally the reconstructed image being obtained from a combination in rotation of the N images on a round angle.

5. Device according to claim 4, wherein the first reconstructed image is obtained by transforming, preferably by rolling up, the first intermediate image around a rotation point arranged at the center of the intermediate image itself and/or at the center of the support and/or in correspondence of a central portion of the biological sample of said support or at a side or end portion of a first sub-image of said intermediate image and corresponding to an end point or an intermediate point of one of the N images of the first set of N images, and wherein said end point is an end point along the direction of maximum extension of one of said N images of the first set of N images.

6. Device according to claim 1, comprising a synchronization device configured for synchronizing a rotation between the supporting element and at least said a first camera, in such a way that for each image of the first set of N images corresponds a respective predefined angle of rotation of the supporting element and/or of the support with respect to a reference position, optionally a reference azimuthal angular position.

7. Device according to claim 1, comprising a motion device configured for moving at least a support between a pick-up position, and a predetermined observation position on the supporting element, wherein the motion device comprises a centering device, configured for determining a movement of the support on the supporting element in order to determine the achievement of the predetermined observation position by the support and/or to retain said support in the predetermined observation position on the supporting element, and wherein the centering device comprises at least a pusher movable between at least a first and a second position, the centering device comprising at least a first releasing configuration wherein the at least a pusher is spaced with respect to the support and a second retaining configuration wherein the at least a pusher touches the support and retains the support in said observation position.

8. Method for observing and for acquiring images of biological samples comprising:

a step of observing a support containing a biological sample wherein the support is positioned on a supporting element configured for housing a support, wherein, in the step of observing said support, a first camera, being a linear camera and being oriented toward the supporting element, frames at least a portion of the supporting element and/or at least a predefined portion of the support, when housed on the supporting element, from a first point of observation;

a step of irradiating the support, comprising activating at least a first optical radiation source and irradiating with said at least a first optical radiation source at least said predefined portion of the support from a first irradiation direction, in such a way to irradiate at least a predefined portion of the biological sample through the optical radiation of the first optical radiation source;

a step of activating at least an actuator or motor, wherein said actuator or motor is connected to the supporting element, said step of activating said at least an actuator determining a rotation of the supporting element and the support housed therein in use, around a rotation axis, preferably centered on the supporting element and/or on the support, and/or wherein said actuator or motor is connected to the first camera, said step of activating said at least an actuator determining a rotation of said first camera with respect to said supporting element and said support therein housed;

a step of generating, after the activation of the at least a first camera and of the actuator, at least a first plurality or first set of N images of N predefined portions of the support, comprising acquiring each image of the first plurality or first set of N images in correspondence of at least a predetermined angular detection position, optionally fixed, and of a respective and proper angle of rotation of the supporting element and of the support with respect to an angular starting position, said step of generating preferably taking place during the activation of said actuator determining the rotation of the supporting element and of the support, and/or of the first camera;

the method comprising a step of generating at least a first intermediate image comprising a juxtaposition of at least part of the N images of the first set of N images, the first set of N images comprising N linear images, the step of generating the intermediate image comprising juxtaposing at least part of the N images of the first set of N images along a direction orthogonal with respect to a direction of maximum extension of each of the N linear images.

9. Method according to claim 8, wherein the predetermined angular detection position is a linear portion and/or corresponds to at least a portion of a radius or a diameter of the support or to a radius or a diameter of the support and/or wherein each of said N predefined portions of the support corresponds each to at least a portion of a radius or a diameter of the support or to a radius or to a diameter of the support and/or wherein the predefined portion of the support is a central portion of the support and/or wherein the first camera is configured for framing a central portion of the supporting element, said central portion of the support being a radial or diametric portion and/or wherein said central portion of the supporting element is a radial or diametric portion.

10. Method according to claim 8, wherein the at least a first camera is a trilinear camera.

11. Method according to claim 8, comprising a step of generating at least a first reconstructed image, obtained by combining in rotation at least part of the N images of the at least a first set of N images, optionally the reconstructed image being obtained from a combination in rotation of the N images of the first set of N images on a round angle.

12. Method according to claim 11, wherein the step of generating the at least a first reconstructed image comprises a transformation, preferably a rolling up, of the intermediate image with transformation from a polar reference system to a Cartesian reference system, said transformation comprising rolling up the intermediate image around a rotation point arranged in a predefined portion of the intermediate image, said predefined portion corresponding to an end point or an intermediate point of one of the N images of the first set of N images.

13. Method according to claim 8, comprising a step of synchronizing the rotation of the supporting element with at least the first camera, and wherein in the step of generation of the first set of N images, each image of the first set of N images is generated in correspondence of a respective predefined angle of rotation of the supporting element and/or of the support with respect to a reference position, optionally a reference azimuthal angular position.

14. Method according to claim 8, comprising a step of moving at least a support for biological samples by means of a motion device, the step of movement comprising a movement of the at least a support between a pick-up position and an observation position on the supporting element;

the method comprising a step of actuating a centering device of the motion device determining a retaining of the support in said observation position on the supporting element and/or determining a movement of the support on the supporting element in order to determine the achievement of the observation position by the support;

the step of actuating the centering device comprising actuating at least a pusher movable between at least a first and a second position, the step of actuating the centering device comprising moving the at least a pusher between a first releasing configuration wherein said at least a pusher is spaced with respect to the support and a second retaining configuration wherein the at least a pusher touches the support and retains the support in said observation position.

15. Device for observing and for acquiring images of biological samples comprising:

a supporting element configured for housing a support for biological samples;

at least a first camera, being a linear camera and being oriented toward the supporting element and configured for framing at least a portion of the supporting element and/or, in use, at least a predefined portion of the support when housed on the supporting element, from a first point of observation, wherein said predefined portion of the support comprises, in use, a biological sample;

at least a first optical radiation source configured for irradiating at least said predefined portion of the support from a first irradiation direction, in such a way that, in use, at least a predefined portion of the biological sample is irradiated through the optical radiation of the first optical radiation source;

an actuator, optionally a motor, configured for rotating the supporting element and of the support housed therein in use, around a rotation axis, preferably centered on the supporting element and/or on the support, and/or for rotating at least said first camera with respect to said supporting element and said support housed therein;

the device being configured for activating at least the first camera and the actuator to generate, preferably during the rotational actuation of the supporting element and of the support, and/or of the first camera carried out by the actuator:

at least a first plurality or first set of N images of N predefined portions of the support, wherein each image of the first plurality or first set of N images is acquired in correspondence of at least a predetermined, optionally fixed, angular detection position and a respective and proper angle of rotation of the supporting element and of the support with respect to a starting angular position;

said device comprising of a motion device configured for moving at least a support between a pick-up position and a predetermined observation position;

wherein the motion device comprises a centering device configured to determine a movement of the support on the supporting element to determine the achievement of said predetermined observation position by said support and to retain said support in the predetermined observation position on the supporting element;

said centering device comprises at least a pusher movable between a first position and a second position;

the centering device comprising at least a first releasing configuration wherein the at least a pusher is spaced with respect to the support and second retaining configuration wherein the at least a pusher touches the support and retains the support in said observation position.

16. The device according to claim 15, wherein said device is configured for generating at least a first intermediate image obtained by juxtaposing at least part of the N images of the first set of N images;

the first set of N images comprising N linear images.

17. The device according to claim 15, comprising a synchronization device configured for synchronizing a rotation between the supporting element and at least said a first camera, in such a way that for each image of the first set of N images corresponds a respective predefined angle of rotation of the supporting element and/or of the support with respect to a reference position, optionally a reference azimuthal angular position.

* * * * *